US011949168B2

(12) United States Patent
Abdelmonem et al.

(10) Patent No.: US 11,949,168 B2
(45) **Date of Patent: *Apr. 2, 2024**

(54) METHOD AND SYSTEM FOR DRIVING POLARIZATION SHIFTING TO MITIGATE INTERFERENCE

(71) Applicant: ISCO International, LLC, Schaumburg, IL (US)

(72) Inventors: Amr Abdelmonem, Northbrook, IL (US); Anthony Teillet, Trabuco Canyon, CA (US); Richard Loy Smith, Jr., Dallas, TX (US); David E. Urbasic, Saint Charles, IL (US); Richard David Peacock, Marengo, IL (US); Andre F. A Fournier, Marietta, GA (US); Guenadi Miliavski, Naperville, IL (US)

(73) Assignee: ISCO International, LLC, Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/303,749

(22) Filed: Apr. 20, 2023

(65) Prior Publication Data

US 2023/0318175 A1 Oct. 5, 2023

Related U.S. Application Data

(63) Continuation of application No. 17/859,639, filed on Jul. 7, 2022, now Pat. No. 11,670,847, which is a (Continued)

(51) Int. Cl.
*H01Q 3/02* (2006.01)
*H01Q 3/12* (2006.01)
(Continued)

(52) U.S. Cl.
CPC ............. *H01Q 3/12* (2013.01); *H01Q 3/2694* (2013.01); *H01Q 5/392* (2015.01); *H01Q 25/001* (2013.01)

(58) Field of Classification Search
CPC .. H01Q 3/00; H01Q 3/02; H01Q 3/04; H01Q 3/08; H01Q 3/12; H01Q 3/26;
(Continued)

(56) References Cited

U.S. PATENT DOCUMENTS

| | | | | |
|---|---|---|---|---|
| 2,605,413 A * | 7/1952 | Alvarez | .................. | H01Q 3/32 343/822 |
| 2,978,702 A | 4/1961 | Pakan | | |

(Continued)

FOREIGN PATENT DOCUMENTS

| | | | |
|---|---|---|---|
| CN | 1864302 A | 11/2006 |
| CN | 202523820 U | 11/2012 |

(Continued)

OTHER PUBLICATIONS

International Search Report & Written Opinion for PCT/US2023/015540 dated Jun. 14, 2023, 15 pp.

(Continued)

*Primary Examiner* — Tho G Phan
(74) *Attorney, Agent, or Firm* — Guntin & Gust, PLC; Kenneth S. Kwan

(57) ABSTRACT

Aspects of the subject disclosure may include, for example, a motorized drive assembly that includes a motor and a drive assembly, where the drive assembly has an axle configured to be disposed through a rotatable substrate of a polarization shifter for a dual-polarized radiating element, the axle being further configured to fasten, at a first end of the axle, to a support structure of the polarization shifter, wherein, when the motorized drive assembly is assembled to the polarization shifter, the motor is controllable to impart rotational
(Continued)

202 forces, via movement of the axle, to the polarization shifter to effect polarization adjusting for the dual-polarized radiating element. Other embodiments are disclosed.

20 Claims, 61 Drawing Sheets

Related U.S. Application Data continuation of application No. 17/709,741, filed on Mar. 31, 2022, now Pat. No. 11,476,574.

(51) Int. Cl.

*H01Q 3/26* (2006.01)
*H01Q 5/392* (2015.01)
*H01Q 25/00* (2006.01)

(58) Field of Classification Search

CPC ........ H01Q 3/2694; H01Q 5/39; H01Q 5/392; H01Q 19/00; H01Q 25/00; H01Q 25/001

See application file for complete search history.

(56) References Cited

U.S. PATENT DOCUMENTS 3,093,824 A 6/1963 Ammerman
3,656,166 A 4/1972 Klopach et al.
3,718,935 A 2/1973 Ranghelli et al.
3,827,051 A 7/1974 Foldes
4,222,017 A 9/1980 Foldes
4,434,426 A * 2/1984 Gaglione ................. H01Q 3/36 333/24.3
4,723,321 A 2/1988 Saleh
5,015,053 A 5/1991 Johnson
5,068,667 A 11/1991 Mizoguchi
5,929,820 A 7/1999 Caulfield et al.
5,940,044 A 8/1999 Smith
6,072,439 A 6/2000 Ippolito et al.
6,111,542 A 8/2000 Day et al.
6,201,801 B1 3/2001 Dent
6,310,585 B1 10/2001 Marino
6,380,903 B1 4/2002 Hayes et al.
6,621,465 B2 9/2003 Teillet et al.
6,631,277 B2 10/2003 Berg et al.
6,703,974 B2 3/2004 White et al.
6,704,557 B1 3/2004 Krishnamurthy et al.
6,717,555 B2 4/2004 Teillet et al.
6,801,160 B2 10/2004 Henderson et al.
6,801,790 B2 10/2004 Rudrapatna
6,960,650 B2 11/2005 Pulst et al.
6,998,908 B1 2/2006 Sternowski
7,023,398 B2 4/2006 Gottl et al.
7,123,194 B2 10/2006 Park et al.
7,196,674 B2 3/2007 Timofeev et al.
7,346,134 B2 3/2008 Smith
7,365,695 B2 4/2008 Thomas et al.
8,023,984 B2 9/2011 Jin et al.
8,072,384 B2 12/2011 Morrow
8,134,511 B2 3/2012 Koh et al.
8,238,318 B1 8/2012 Negus
8,289,218 B2 10/2012 Payne
8,954,023 B2 2/2015 Hillstrom et al.
8,976,072 B2 3/2015 Lenormand et al.
9,219,508 B1 12/2015 Veysoglu et al.
9,271,185 B2 2/2016 Abdelmonem et al.
9,313,680 B2 4/2016 Galeev et al.
9,472,852 B2 10/2016 Oshea et al.
9,531,482 B2 12/2016 Sobczak et al.
9,548,775 B2 1/2017 Smith
9,571,176 B2 2/2017 Desclos et al.
9,590,313 B2 3/2017 Jan et al.
9,712,259 B2 7/2017 Sobczak et al.
9,762,297 B2 9/2017 Lee et al.
9,800,355 B1 10/2017 Lee et al.
9,806,413 B1 10/2017 Chukka et al.
9,847,571 B2 12/2017 Bit-Babik et al.
9,887,467 B2 2/2018 Aryanfar
9,929,886 B2 3/2018 Amadjikpe et al.
9,960,500 B2 5/2018 Song et al.
9,972,918 B2 5/2018 Lin et al.
10,027,036 B2 7/2018 Schmidt et al.
10,056,675 B1 8/2018 Dybdal
10,116,048 B2 10/2018 Mielke et al.
10,454,185 B1 10/2019 Moran et al.
10,468,781 B1 11/2019 Paulsen et al.
10,530,033 B2 1/2020 Moriguchi
10,581,163 B2 3/2020 Schmutzler et al.
10,608,859 B2 3/2020 Matitsine et al.
10,652,835 B2 5/2020 Tacconi et al.
10,777,894 B2 9/2020 McMichael
10,862,518 B1 12/2020 Abadie et al.
10,868,350 B2 12/2020 Oppenlaender et al.
10,868,609 B1 12/2020 Kossin et al.
10,958,312 B2 3/2021 Pollman et al.
10,971,815 B1 4/2021 West et al.
11,025,472 B2 6/2021 Matitsine et al.
11,038,549 B1 6/2021 Harley et al.
11,158,956 B2 10/2021 Le
11,177,582 B2 11/2021 Seo
11,239,886 B2 2/2022 Pollman et al.
11,289,799 B2 3/2022 Everest et al.
11,296,429 B2 4/2022 Biancotto et al.
11,316,258 B2 4/2022 Junttila
11,329,387 B2 5/2022 Da Silveira et al.
11,336,028 B2 5/2022 Shen et al.
11,342,668 B2 5/2022 Chen et al.
11,349,530 B2 5/2022 Frenger et al.
11,349,581 B1 5/2022 Dybdal et al.
11,360,396 B2 6/2022 Bauerschmidt et al.
11,363,678 B2 6/2022 Rosenschild et al.
11,411,323 B2 8/2022 Wu et al.
11,437,701 B2 9/2022 Rai et al.
11,451,274 B2 9/2022 El-Keyi et al.
11,509,071 B1 11/2022 Abdelmonem et al.
11,509,072 B1 11/2022 Abdelmonem et al.
11,515,652 B1 11/2022 Abdelmonem et al.
11,594,821 B1 2/2023 Abdelmonem et al.
11,600,920 B2 * 3/2023 Udagave .................. H01Q 3/36
11,626,667 B1 4/2023 Abdelmonem et al.
11,670,847 B1 * 6/2023 Abdelmonem .......... H01Q 3/12 343/702
11,705,940 B2 7/2023 Abdelmonem et al.
2002/0193071 A1 12/2002 Waltho
2003/0162566 A1 8/2003 Shapira et al.
2004/0082335 A1 4/2004 Hirayama et al.
2004/0106436 A1 6/2004 Ochi et al.
2005/0226353 A1 10/2005 Gebara et al.
2005/0239403 A1 10/2005 Karabinis
2006/0014491 A1 1/2006 Cleveland et al.
2006/0202906 A1 9/2006 Okubo et al.
2007/0020224 A1 1/2007 Vetter et al.
2007/0060059 A1 3/2007 Kim et al.
2007/0080868 A1 4/2007 Hwang et al.
2007/0205955 A1 9/2007 Korisch et al.
2008/0062062 A1 3/2008 Borau et al.
2008/0150799 A1 6/2008 Hemmi et al.
2008/0253308 A1 10/2008 Ward et al.
2008/0280571 A1 11/2008 Rofougaran et al.
2009/0040127 A1 2/2009 Williams
2009/0189820 A1 7/2009 Saito et al.
2009/0224995 A1 9/2009 Puente et al.
2010/0304680 A1 12/2010 Kuffner et al.
2010/0311353 A1 12/2010 Rabinovich et al.
2011/0057849 A1 3/2011 Naym et al.
2011/0059694 A1 3/2011 Audic
2011/0069633 A1 3/2011 Schmidt et al.
2011/0116569 A1 5/2011 Vaughan et al.
2011/0134001 A1 6/2011 Sakata et al.
2011/0150118 A1 6/2011 Asplund et al.
2011/0171922 A1 7/2011 Kim et al.
2012/0063529 A1 3/2012 Choi et al.
2012/0108178 A1 5/2012 Lee et al.
2012/0188137 A1 7/2012 Lalezari

(56) References Cited

U.S. PATENT DOCUMENTS

2012/0229232 A1 9/2012 Mahon et al.
2013/0157601 A1 6/2013 O'Keeffee et al.
2014/0022125 A1 1/2014 Zhu et al.
2014/0035698 A1 2/2014 Schadler et al.
2014/0035792 A1 2/2014 Schadler et al.
2014/0097987 A1 4/2014 Worl et al.
2014/0191924 A1 7/2014 Payne et al.
2014/0236546 A1 8/2014 Payne
2014/0274094 A1 9/2014 Abdelmonem et al.
2015/0015372 A1 1/2015 Hara et al.
2015/0092621 A1 4/2015 Jalloul et al.
2015/0108210 A1 4/2015 Zhou
2015/0156642 A1 6/2015 Sobczak et al.
2015/0195001 A1 7/2015 Barker et al.
2015/0200709 A1 7/2015 Negus et al.
2015/0340875 A1 11/2015 Prasad
2015/0351103 A1 12/2015 Kim et al.
2016/0036505 A1 2/2016 George et al.
2016/0087348 A1 3/2016 Ko et al.
2016/0088572 A1 3/2016 Bi et al.
2016/0112111 A1 4/2016 Bull
2016/0126633 A1 5/2016 Keller et al.
2016/0142229 A1 5/2016 Bevan et al.
2016/0254595 A1 9/2016 Sobczak et al.
2016/0380690 A1 12/2016 Jidhage
2017/0077612 A1 3/2017 Aryanfar
2017/0077616 A1 3/2017 Corum et al.
2017/0085398 A1 3/2017 Liu
2017/0093048 A1 3/2017 Chen et al.
2017/0156119 A1 6/2017 Neves et al.
2017/0237484 A1 8/2017 Heath et al.
2017/0353929 A1 12/2017 Tacconi et al.
2018/0034164 A1 2/2018 Jang et al.
2018/0083368 A1 3/2018 Teillet et al.
2018/0167148 A1 6/2018 Vannucci et al.
2018/0176802 A1 6/2018 Rosenhouse et al.
2018/0219636 A1 8/2018 Gale et al.
2019/0007078 A1 1/2019 Tsui et al.
2019/0052381 A1 2/2019 Abdelmonem
2019/0074864 A1 3/2019 Henry et al.
2019/0074865 A1 3/2019 Henry et al.
2019/0103309 A1 4/2019 Lin
2019/0103909 A1 4/2019 Bengtsson et al.
2019/0165822 A1 5/2019 Chen
2019/0212699 A1 7/2019 Waldern et al.
2019/0222329 A1 7/2019 Abdelmonem
2019/0273315 A1 9/2019 Hu et al.
2019/0273326 A1 9/2019 Sanford et al.
2019/0334636 A1 10/2019 Li et al.
2019/0372237 A1 12/2019 Yman et al.
2019/0393598 A1 12/2019 Logothetis et al.
2020/0052388 A1 2/2020 Jang et al.
2020/0136247 A1 4/2020 Al et al.
2020/0145032 A1 5/2020 Ayala et al.
2020/0185825 A1 6/2020 Palud
2020/0236630 A1 7/2020 Tacconi et al.
2020/0321697 A1* 10/2020 Zimmerman .......... H01Q 21/26
2020/0373663 A1 11/2020 Xu
2021/0028829 A1 1/2021 Rios
2021/0098896 A1 4/2021 Wang et al.
2021/0127284 A1 4/2021 Abdelmonem et al.
2021/0175622 A1* 6/2021 Jing ........................ H02P 27/08
2021/0226315 A1 7/2021 Liu
2021/0227400 A1 7/2021 Jia
2021/0320413 A1 10/2021 Wu et al.
2021/0344122 A1 11/2021 Kaistha et al.
2021/0359406 A1 11/2021 Yang et al.
2022/0006167 A1 1/2022 P
2022/0037753 A1 2/2022 Tang et al.
2022/0069463 A1 3/2022 Abdelmonem et al.
2022/0069853 A1 3/2022 Abdelmonem et al.
2022/0069855 A1 3/2022 Abdelmonem et al.
2022/0069865 A1 3/2022 Abdelmonem et al.
2022/0069897 A1 3/2022 Abdelmonem et al.
2022/0069898 A1 3/2022 Abdelmonem et al.
2022/0069927 A1 3/2022 Abdelmonem et al.
2022/0109977 A1 4/2022 Zander et al.
2022/0123821 A1 4/2022 Sakhnini et al.
2022/0131269 A1 4/2022 Choi et al.
2022/0200139 A1 6/2022 Ryu et al.
2022/0209428 A1 6/2022 Raghavan et al.
2022/0279520 A1 9/2022 Tsui et al.
2022/0311477 A1 9/2022 Sun et al.
2022/0320756 A1 10/2022 Hassan et al.
2022/0321241 A1 10/2022 Bennett et al.
2022/0322321 A1 10/2022 Dai et al.
2022/0352942 A1 11/2022 Kalantari et al.
2022/0365224 A1 11/2022 Rose et al.
2023/0318174 A1 10/2023 Abdelmonem et al.
2023/0318197 A1 10/2023 Abdelmonem et al.
2023/0318198 A1 10/2023 Abdelmonem et al.
2023/0327708 A1 10/2023 Abdelmonem

FOREIGN PATENT DOCUMENTS

CN 108631055 A 10/2018
CN 209910515 U 1/2020
CN 209963261 U 1/2020
CN 112103653 A 12/2020
CN 213637748 U 7/2021
CN 113451764 A 9/2021
CN 113922101 A 1/2022
WO 2009120237 A1 10/2009
WO 2020064914 A1 4/2020

OTHER PUBLICATIONS

Amendment Under Article 34/Response to Written Opinion for PCT/US2021/046881 filed Jun. 16, 2022, 16 pages.
Amendment Under Article 34 / Response to Written Opinion filed for PCT/US2021/046807 dated Jun. 15, 2022, 19 pages.
PCT/US2021/046804, Amendment under Article 34 and response to Written Opinion, filed May 31, 2022, 19 pages.
PCT/US2021/046804, International Preliminary Report on Patentability, dated Sep. 13, 2022, 31 pages.
"Amendment Under Article 34 / Response to Written Opinion", for application No. PCT/US2021/046806, dated Feb. 8, 2022, 8 pages.
"International Preliminary Report", for Application PCT/US2021/046805, dated Mar. 9, 2023, 9 pgs.
"International Preliminary Report on Patentability", For Application PCT/US2021/046807, dated Aug. 20, 2021, 28 Pages.
"International Preliminary Report on Patentability", for Application No. PCT/US2021/46881, dated Feb. 17, 2023, 25.
"International Preliminary Report on Patentability", PCT/US2021/046872, dated May 4, 2022, 12 pgs.
"International Search Report and Written Opinion", for Application No. PCT/US2021/046875, dated Nov. 23, 2021, 10 pages.
"International Search Report and Written Opinion", for Application No. PCT/US2021/046872, dated Nov. 23, 2021, 13 pages.
"International Search Report and Written Opinion", for Application No. PCT/US2021/46805, dated Nov. 8, 2021, 15 pages.
"International Search Report and Written Opinion", for Application No. PCT/US2021/46881, dated Dec. 3, 2021, 12 pages.
"International Search Report and Written Opinion", for Application No. PCT/US2021/046804, dated Dec. 3, 2021, 14 pages.
"International Search Report and Written Opinion", For Application No. PCT/US2021/046807, dated Dec. 3, 2021, 15 pages.
"International Search Report and Written Opinion", PCT/US2023/015534, dated Apr. 19, 2023, 4 pages.
"International Search Report and Written Opinion", for Application No. PCT/US2021/046806, dated Nov. 8, 2021, 9 pages.
"Notification of Transmittal of International Preliminary Report on Pa tentability", PCT/US2021/046875, dated May 2, 2022, 16 pages.
"Notification of Transmittal of International Preliminary Report on Pa tentability", PCT/US2021/046875, dated May 2, 2022, 16 pgs.
"Notification of Transmittal of International Preliminary Report on Patentability", PCT/US2021/046806 dated May 4, 2022, May 4, 2022, 16 pages.

(56) References Cited

OTHER PUBLICATIONS

"PCT/US2021/046872—Article 34 Amendment", dated Feb. 10, 2022, 8 pgs.
"PCT/US2021/046875—Article 34 Amendments", dated Apr. 13, 2022, 8 pgs.
"PCT/US2023/015538", International Search Report, dated Apr. 17, 2023, Apr. 17, 2023, 6 pgs.
"Examination Report for India Application No. 202347019825", dated Sep. 12, 2023, 7 Pages.
"International Search Report and Written Opinion", Appln. No. PCT/US2023/023403, dated Sep. 15, 2023, 10 pages.
"International Search Report and Written Opinion for PCT/US2023/023402", dated Sep. 15, 2023, 11 Pages.
"International Search Report and Written Opinion for PCT/US2023/023405", dated Sep. 18, 2023, 10 Pages.

* cited by examiner

100

200

202

In a -45 degree position

500

222d

| Reading | RF Det Voltage | | | | |
|---|---|---|---|---|---|
| 1 | 2.6 | 2.5 | 2.4 | 2.6 | 2.7 |
| 2 | 1.2 | 1.0 | 1.3 | 1.1 | 1.3 |
| 3 | 2.3 | 2.2 | 2.4 | 2.4 | 2.4 |

520a
520b
520c

520

FIG. 5I

| Segment | Average Power | | | | | | | |
|---|---|---|---|---|---|---|---|---|
| | Freq A | | | ABS | Freq B | | | ABS |
| 1 | 2.56 | 1.18 | 2.34 | 0.77 | 2.6 | 2.5 | 2.4 | 0.1 |
| 2 | 0.5 | 0.5 | 0.7 | 0.9 | 0.6 | 0.5 | 0.7 | 0.95 |
| 3 | 2.3 | 2.2 | 2.4 | 0.1 | 2.3 | 2.2 | 2.4 | 0.1 |
| 4 | 2.4 | 2.5 | 2.5 | 0.05 | 2.4 | 2.5 | 2.5 | 0.05 |
| 5 | 2.6 | 2.7 | 2.9 | 0.25 | 2.6 | 2.7 | 2.9 | 0.25 |
| 6 | 2.6 | 2.5 | 2.4 | 0.1 | 2.6 | 2.5 | 2.4 | 0.1 |
| 7 | 2.0 | 2.2 | 2.1 | 0.3 | 2.0 | 2.2 | 2.1 | 0.3 |
| 8 | 2.6 | 2.7 | 2.9 | 0.25 | 2.6 | 2.7 | 2.9 | 0.25 |
| 9 | 2.5 | 2.6 | 2.6 | 0.1 | 2.5 | 2.6 | 2.6 | 0.1 |
| 10 | 2.4 | 2.7 | 2.9 | 0.35 | 2.4 | 2.7 | 2.9 | 0.35 |
| 11 | 2.5 | 2.4 | 2.4 | 0.1 | 2.5 | 2.4 | 2.4 | 0.1 |
| 12 | 2.8 | 2.6 | 1.3 | 0.7 | 2.8 | 2.6 | 1.3 | 0.7 |
| 13 | 2.4 | 2.3 | 2.4 | 0.1 | 2.4 | 2.3 | 2.4 | 0.1 |
| 14 | 2.3 | 2.5 | 2.5 | 0.1 | 2.3 | 2.5 | 2.5 | 0.1 |
| 15 | 2.5 | 2.7 | 2.9 | 0.3 | 2.5 | 2.7 | 2.9 | 0.3 |
| 16 | 2.4 | 2.7 | 2.9 | 0.35 | 2.4 | 2.7 | 2.9 | 0.35 |

522

FIG. 5J

METHOD AND SYSTEM FOR DRIVING POLARIZATION SHIFTING TO MITIGATE INTERFERENCE

CROSS REFERENCE TO RELATED APPLICATIONS

This application is a continuation of and claims priority to U.S. patent application Ser. No. 17/859,639, filed on Jul. 7, 2022, which is a continuation of and claims priority to U.S. patent application Ser. No. 17/709,741, filed on Mar. 31, 2022 (now U.S. Pat. No. 11,476,574). All sections of each of the aforementioned are incorporated herein by reference in their entirety.

FIELD OF THE DISCLOSURE

The subject disclosure relates to driving polarization shifting for radiating elements to mitigate or avoid interference/passive intermodulation (PIM).

BACKGROUND

The deployment of fifth generation (5G) networks has made component requirements for cellular systems more stringent and sophisticated. In addition to capacity, throughput, latency, speed, and power consumption requirements, there is a need for multiple wireless services, bands, and networks to coexist and operate without impacting one another. Antennas are a key component in all wireless networks, whether on the base station side or the handset side. Antenna designs have evolved over the past twenty years to meet the increasingly complex requirements of cellular standards. For example, almost all antennas now have multiple functions that create conflicting antenna design requirements. This antenna design evolution needs to continue to meet the growing demands of 5G networks as well as future demands of higher generation networks.

BRIEF DESCRIPTION OF THE DRAWINGS

Reference will now be made to the accompanying drawings, which are not necessarily drawn to scale, and wherein:

FIG. 51 shows an example radiating element column voltage reading table in accordance with various aspects described herein.

FIG. 5J shows an example radiating element column position table in accordance with various aspects described herein.

DETAILED DESCRIPTION

Figure 1A:
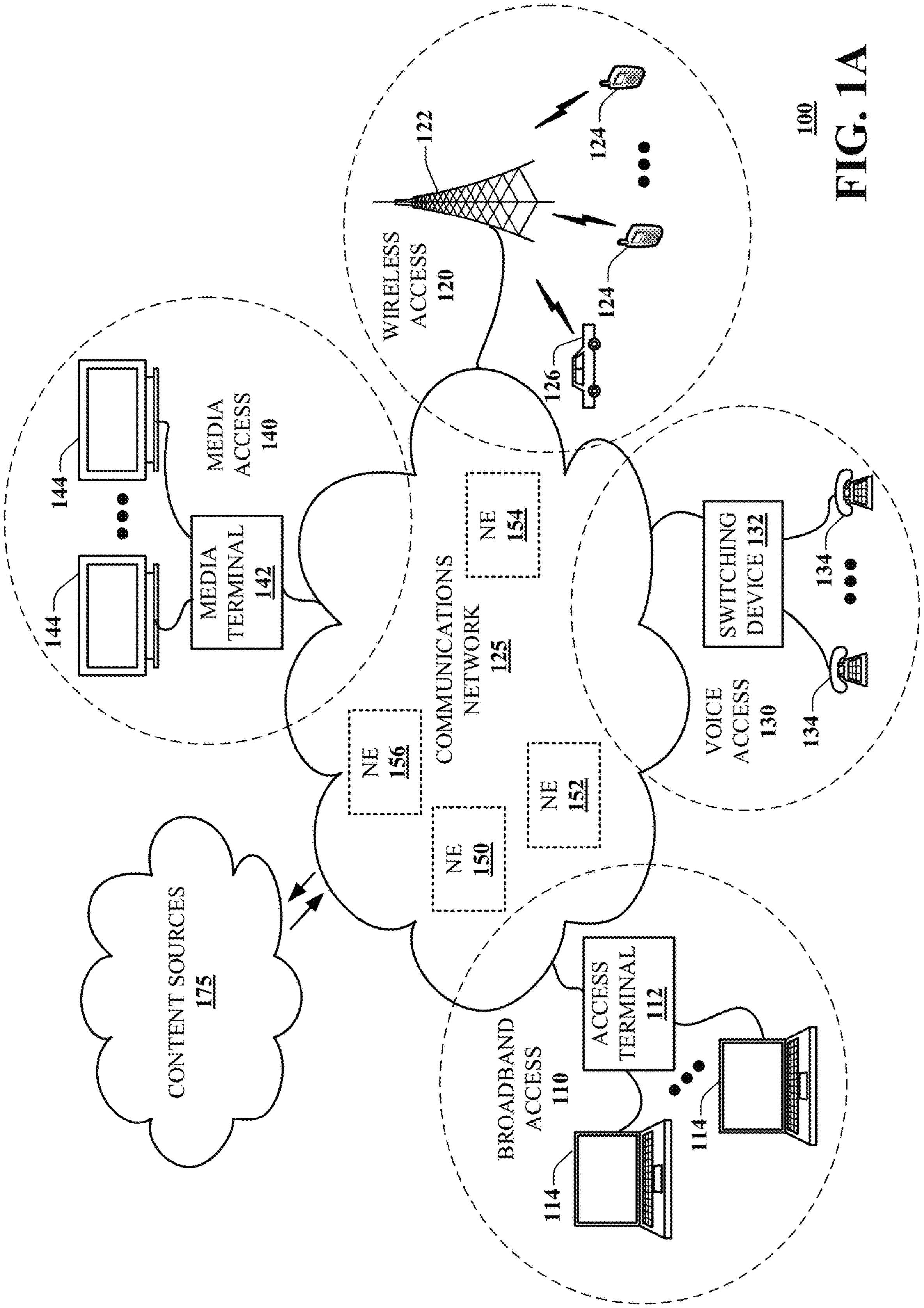
FIG. 1A is a block diagram illustrating an exemplary, non-limiting embodiment of a communications network in accordance with various aspects described herein.

Early antennas were mostly single-input, single-output (SISO), but currently, the majority are multiple-input, multiple-output (MIMO). MIMO is a key antenna technology for wireless communications in which multiple antennas are used at both the source (transmitter) and the destination (receiver), where the antennas at each end of the communication circuit are combined to enhance data speed. In MIMO, each spatial stream is transmitted from a different radio/antenna in the same frequency channel as the transmitter. The receiver receives each stream on each of its identical radios/antennas, and reconstructs the original streams.

The first MIMO specifications appeared in 3rd Generation Partnership Project (3GPP) standards at the tail end of the 3G Universal Mobile Telecommunications System (UMTS) era, but it was of limited use as it was not built into the design from the beginning. It was only with the introduction of Long-Term Evolution (LTE) in 2008 that MIMO started to be mainstream. The goal of MIMO is to increase data rates by sending multiple data streams at the same time in the same frequency, known as spatial multiplexing. In a single antenna system, one cannot send multiple streams of data, but with MIMO, the signals transmitted from each antenna take different paths to the receivers. By applying the right mix of each data stream to each transmit antenna, the signals received at each receiving antenna only “see” one of the original data streams. In effect, MIMO systems use a combination of multiple antennas and multiple signal paths to gain knowledge of the communications channel. By using the spatial dimension of a communications link, MIMO systems can achieve significantly higher data rates than traditional SISO channels.

In a communication system, a main objective for a communication channel is to increase signal to interference plus noise ratio (SINR). Let’s take a 2×2 MIMO case as an example. For the same total transmitted power, the signal power has to be shared between the two transmitters, reducing SINR by 3 dB. This implies that MIMO gains over SISO is achieved when the SINR of the channel gets higher than is necessary to support the maximum SISO data rate. Such high SINR conditions occur when the user is near the cell center, or when interference from adjacent cells is low. When practical field deployments are taken into account, in a typical urban macro environment, it is estimated that 2×2 MIMO only provides approximately 20% gain over SISO. The 2×2 MIMO configuration can be increased by adding more antennas at each end of the link. In the original 3GPP Release 8 LTE standard in 2008, 2× and 4× operation was specified, and 8×8 was added later in Release 10. As the number of antennas increases, it becomes less likely that the channel will support orthogonal transmission paths. These orthogonal paths are known as Eigenmodes.

Physically, an antenna can include radiating elements (or antenna elements (AEs)) arranged in interconnected columns and sharing the same radio frequency (RF) connector. Most low frequency bands (e.g., 600 megahertz (MHz) up to 2.5 gigahertz (GHz)) antennas in the marketplace today are multi-band (two or more bands), with each band having its own remote electronic/electrical tilt for separate optimization capability. The radiating elements can also be combined into an antenna array capable of creating multiple, steerable beams by utilizing a beamforming feed network (e.g., a butler matrix feed). Antennas for high frequency bands or millimeter (mm) waves are usually integrated with the receiver.

An antenna’s radiation has a pattern (power distribution) in the horizontal direction (an azimuth direction) and a pattern in the vertical direction usually referred to as the elevation. Antennas comprise a number of radiating elements, which may each be an orthogonally-polarized element pair, such as a dipole (e.g., a crossed-dipole) with certain properties and a particular structure. Radiating elements can be arranged in columns, and antennas that have multiple columns can form arrays. While each radiation array may have its own radiation pattern, the RF effect of the entire array can depend on the spacing, phase shifts, and amplitude variations between its radiating elements. Together, these three variables can be used to describe the array factor pattern. Multiplying the array factor pattern and the element pattern can yield the overall radiation pattern of the array antenna and define the far field.

There are various types of radiating antenna elements, such as those with wire and aperture elements that include dipole and monopole elements. Aperture elements can also include slot elements. Some designs incorporate combinations of both types and can also be built over printed circuit boards (PCBs) or micro strip patches. Each antenna element has a radiation pattern, usually referred to as an element pattern, whose characteristics are determined by the overall design of the element. Some or all of the principles, embodiments, and/or aspects described herein can apply equally to the various types of antennas.

A dipole radiating element transmits electromagnetic waves that result in radiation around it. Near the dipole antenna, the radiated energy is oscillating as it is flowing outwards. At any instant of time, the magnetic field is “behind” the electric field by half of a period (or half of the wavelength). The near field is composed of two regions: the reactive near field and the radiating near field (also called the Fresnel zone or region). In the far-field region (also called the Fraunhofer zone or region), the field components are transverse to the radial direction of the antenna. The far-field E (electric) and H (magnetic) strength decrease by inverse law 1/r, where r is the distance from the antenna. Embodiments described herein define and account for a new region between/overlapping the Fresnel region and the Fraunhofer region, namely an “intermediate” (or intermediate-field) region.

The subject disclosure describes, among other things, illustrative embodiments of polarization shifting devices and systems for interference/PIM mitigation or avoidance. The subject disclosure also describes embodiments for detecting interference/PIM and controlling polarization shifting for radiating elements to mitigate or avoid the interference/PIM. The subject disclosure further describes embodiments for driving polarization shifting for radiating elements to mitigate or avoid interference/PIM.

In various embodiments, polarization shifting (or adjusting) may include performing one or more (e.g., mechanical) adjustments to one or more components included in, or associated with, an antenna system. The one or more components may include radiating elements (which may, e.g., include crossed-dipole antenna elements, MIMO-type antenna elements, and/or other types of radiating elements) of the antenna system, or more generally, any structural portion of radiating elements, such as, for example, feed port(s), ground/base plane(s), and/or the like. As one example, one or more embodiments may involve controlling physical movements of one or more radiating elements of one or more antennas based on the detected interference/PIM.

In embodiments where interference/PIM mitigation or avoidance involves physical movements of radiating elements, the interference/PIM mitigation or avoidance system can do so by causing radiating elements to be physically rotated (e.g., without adjusting or moving an antenna housing). This can include, for example, causing radiating elements in a first column of radiating elements to be rotated by a certain amount in a certain direction (e.g., from a default polarization configuration, such as +45/−45 degrees, to a different polarization configuration, such as a +30/−60 degree orientation or the like) and either keeping radiating elements in a second column of radiating elements unchanged or causing radiating elements in the second column to be rotated by a certain amount in a certain direction, which may provide a polarization adjusting (e.g., mixing) effect where signals are projected in a different set of axes. This may result in one polarization receiving the interference/PIM and the other column receiving little to none of the interference/PIM, thereby enabling mitigation or avoidance of the interference/PIM (e.g., via selective signal/antenna extraction/usage).

In one or more embodiments, interference/PIM mitigation or avoidance may involve controlling the physical movements of radiating elements by additionally, or alternatively, causing the radiating elements to be shifted along a radial axis of the antenna (e.g., without adjusting or moving an antenna housing). This can include, for example, causing radiating elements in a first column of radiating elements to be shifted or displaced by a certain amount in a first direction along the radial axis, and either leaving radiating elements in a second column of radiating elements unmoved or causing radiating elements in the second column to be shifted or displaced by a certain amount in a second direction opposite the first direction, which may result in phase shifts between signals associated with the radiating elements in the first column and signals associated with the radiating elements in the second column. This may similarly result in one column or polarization receiving the interference/PIM and the other column or polarization receiving little to none of the interference/PIM, thereby enabling mitigation or avoidance of the interference/PIM (e.g., via selective signal/antenna extraction/usage).

In some embodiments, the interference/PIM mitigation or avoidance system may be integrated in a radio (e.g., a remote radio head (RRH) or a remote radio unit (RRU)), and may be configured to effect some or all of the polarization shifting/adjusting described herein. In certain embodiments, the interference/PIM mitigation or avoidance system may be integrated in an antenna system (e.g., as part of smart antenna functionality), and may be configured to effect some or all of the polarization shifting/adjusting functionality (and/or phase shifting/delaying functionality) described herein independently of a radio (e.g., an RRH or an RRU) and/or based on commands from the radio.

In various embodiments, polarization shifting/adjusting may be effected by additionally, or alternatively, performing (e.g., electronic) processing on signals associated with radiating elements. In such embodiments, signal processing operations may be performed that define polarizations/projections or radiation patterns for signals associated with the various radiating elements, which may provide the aforementioned polarization adjusting (e.g., mixing) effect where signals may be projected in a different set of axes. This may similarly result in some radiating elements receiving the interference/PIM and other radiating elements receiving little to none of the interference/PIM, thereby enabling mitigation or avoidance of the interference/PIM (e.g., via selective signal/antenna extraction/usage). In certain embodiments, the processing may be implemented in cases where the antennas are integrated with a radio (e.g., an RRH or an RRU). For example, as described herein, such processing may be implemented in MIMO antennas, where the radio has access to each radiating element in each column/row of the antenna via a respective controller/transceiver.

In various embodiments, the interference/PIM mitigation or avoidance system may additionally, or alternatively, include, or be implemented, in one or more RF devices (e.g., RF circuits or the like) configured to perform polarization shifting/adjusting by altering/combining, in the RF domain, phase(s) and/or amplitudes of signals to be transmitted and/or signals that are received. The polarization shifting/adjusting can be based on the level(s)/characteristic(s) of determined PIM combination(s) that need to be addressed.

In certain exemplary embodiments described herein, the polarization shifting/adjusting can be additionally, or alternatively, provided by configuring or adapting one or more properties of certain radiating elements of an antenna (e.g., without adjusting or moving an antenna housing). In one or more embodiments, different shapes (or combination(s) of shapes), dimensions, electrical/magnetic properties, or a combination thereof may be selected or defined for radiating elements of a first set (or column) of radiating elements of an antenna relative to radiating elements of a second set (or column) of radiating elements of the antenna. As an example, the structure of each of a selected set of radiating elements of an antenna system may be altered (e.g., shifted, folded, bypassed, and/or the like). As another example, the structure of each of a selected set of radiating elements of an antenna system may be substituted with a different structure. By virtue of the difference in properties between the first and second columns of radiating elements (which can, for example, provide a polarization adjusting effect), the amount of interference/PIM that is received, or whether interference/PIM is received at all, may be selectively controlled. For example, this may similarly result in some radiating elements receiving the interference/PIM and other radiating elements receiving little to none of the interference/PIM, thereby enabling mitigation or avoidance of the interference/PIM (e.g., via selective signal/antenna extraction/usage).

In various embodiments, the interference/PIM mitigation or avoidance system may include hardware and/or software components (which may, for example, be integrated in the antenna or located externally to the antenna) configured to effect polarization shifting/adjusting by performing signal conditioning of uplink signals in a manner that (partially or fully) cancels interference/PIM therefrom.

It is to be appreciated and understood that the various embodiments that provide polarization shifting/adjusting (for example, by performing adjustments for component(s) associated with an antenna system, such as radiating elements, structural portions of radiating elements, etc., by processing of signals associated with radiating elements, by defining of different (e.g., structural) properties for different sets of radiating elements of antenna(s), etc.) and/or signal conditioning to mitigate, avoid, or cancel detected interference/PIM may be combined in any manner and used together in any way (e.g., physical rotation of radiating elements and processing of signals associated with radiating elements may be performed together; physical shifting of radiating elements, signal conditioning, and defining of different structural properties for different sets of radiating elements may be performed together; etc.).

In some implementations, in the various embodiments in which adjustments are made for component(s) associated with an antenna system (e.g., adjustments for structural portion(s) of radiating elements, physical rotation/shifting of radiating elements, etc.) and/or processing of signals associated with radiating elements is performed, some or all of these adjustments and/or signal processing may be performed automatically—e.g., by one or more smart detection/mitigation/cancellation devices, systems, and/or algorithms—based on the detected interference/PIM.

In other implementations, in the various embodiments in which adjustments are made for component(s) associated with an antenna system (e.g., adjustments for structural portion(s) of radiating elements, physical rotation/shifting of radiating elements, etc.) and/or processing of signals associated with radiating elements is performed, some or all of these adjustments and/or signal processing may be performed manually—e.g., by one or more operators or administrators in light of the detected interference/PIM. In such implementations, one or more preset conditions or settings (e.g., relating to particular adjustments, such as rotation angles, shifting displacement values, polarizations/projections, etc.) may be available for user selection, and may, when selected, cause the appropriate polarization shifting/adjustments to be effected accordingly.

Based on an analysis of known or likely interference/PIM levels, characteristics, and/or combinations, proper selection of polarization shifting/adjusting parameters/values, phase shifts, and/or the like may be determined and utilized to manipulate antenna systems. By providing polarization shifting/adjusting (e.g., via adjustments to structural portion (s) of radiating elements of the antenna system, physical rotation/shifting of radiating elements of the antenna system, processing of signals associated with radiating elements, and/or defining of different (e.g., structural) properties for different sets of radiating elements), as described herein, downlink signals can be manipulated or otherwise influenced in a way that minimizes or reduces the amount of interference/PIM that is received in the uplink, which can improve overall uplink performance and coverage. The principle of orthogonality between the different modes of transmission can also be taken into account, where interference/PIM source(s) minimally interact with transmissions, thereby reducing the level of interference/PIM detected/received by a communications system.

In exemplary embodiments, various techniques described herein, including methods for polarization shifting/adjusting and the like, can be exploited in time-division duplex (TDD) systems and/or frequency-division duplex (FDD) systems to relax, loosen, or otherwise decrease the number of system implementation requirements, such as those relating to guard times/bands in TDD and frequency separation in FDD.

One or more aspects of the subject disclosure include a motorized drive assembly. The motorized drive assembly may include a motor and a drive assembly. The drive assembly may have an axle configured to be disposed through a rotatable substrate of a polarization shifter for a dual-polarized radiating element, the axle being further configured to fasten, at a first end of the axle, to a support structure of the polarization shifter, wherein, when the motorized drive assembly is assembled to the polarization shifter, the motor is controllable to impart rotational forces, via movement of the axle, to the polarization shifter to effect polarization adjusting for the dual-polarized radiating element.

One or more aspects of the subject disclosure include a linear drive assembly. The linear drive assembly may include a carrier coupled to a motor via a threaded rod, a linkage fastened to the carrier, and an axle disposed through a rotatable substrate of a polarization shifter for an orthogonally-polarized element pair, the axle being fastened, at a first end of the axle, to a support structure of the polarization shifter, wherein the motor provides forces, via the threaded rod, the carrier, the linkage, and the axle, to the polarization shifter to effect polarization shifting for the orthogonally-polarized element pair.

One or more aspects of the subject disclosure include a system. The system may include a polarization shifter comprising a rotatable substrate, an element substrate, a radiating element residing on the element substrate, and an antenna support structure fixedly coupled to the element substrate. The system may further include a motor coupled to a rod, a carriage coupled to the motor via the rod, a linkage secured to the carriage, and an axle disposed through the rotatable substrate, the axle being secured, at a first end of the axle, to the antenna support structure, wherein the motor is configured to drive the rod to effect polarization shifting for the radiating element.

Other embodiments are described in the subject disclosure.

Referring now to FIG. 1A, a block diagram is shown illustrating an example, non-limiting embodiment of a system 100 in accordance with various aspects described herein. For example, system 100 can facilitate, in whole or in part, providing or effecting of polarization shifting for radiating elements to mitigate or avoid detected interference/PIM. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communications network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 1B:
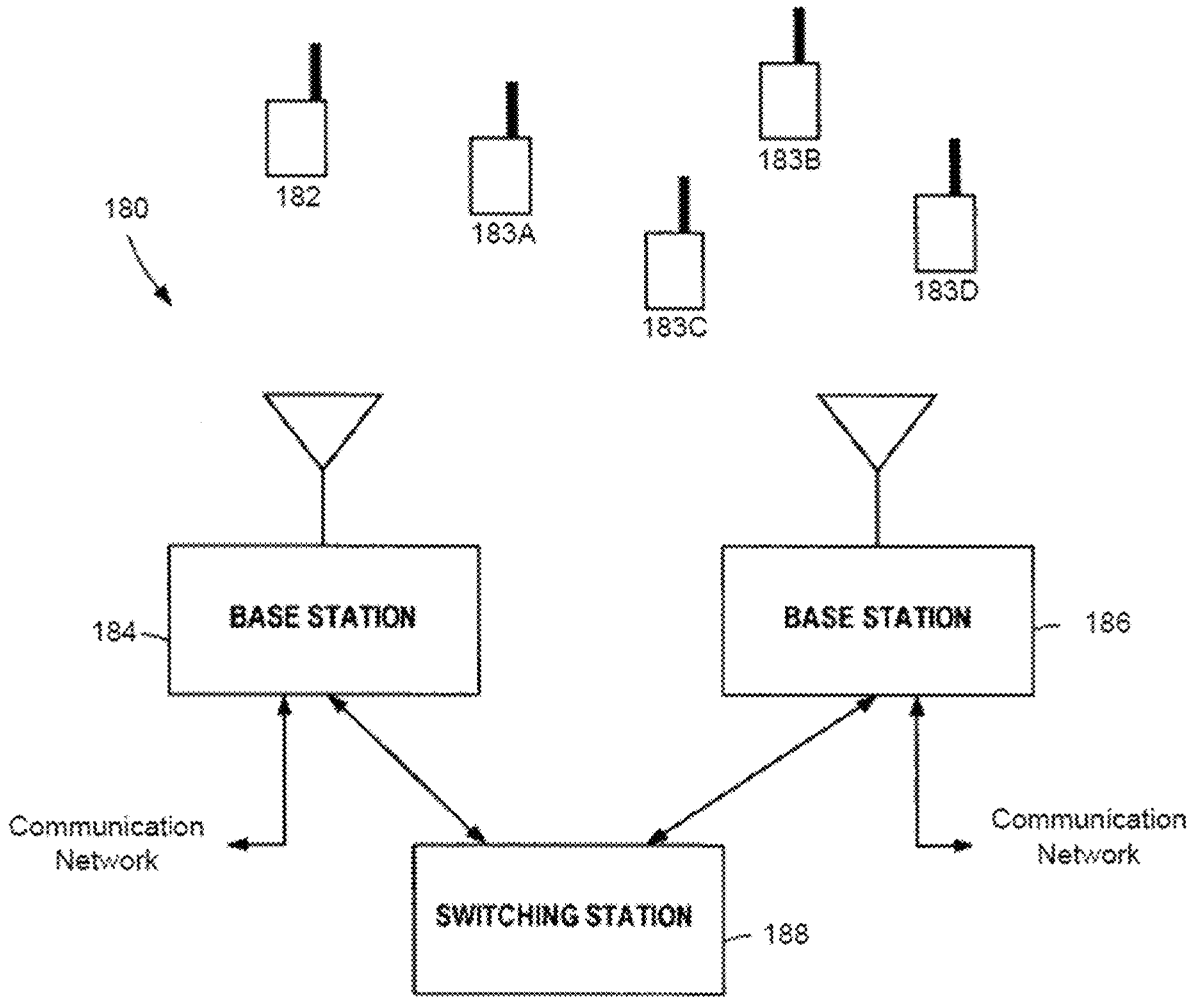
FIG. 1B depicts an exemplary, non-limiting embodiment of a communications system functioning within, or operatively overlaid upon, the communications network of FIG. 1A in accordance with various aspects described herein.

FIG. 1B depicts an exemplary, non-limiting embodiment of a telecommunication communications system 180 functioning within, or operatively overlaid upon, the communications network 100 of FIG. 1A in accordance with various aspects described herein. For example, system 180 can facilitate, in whole or in part, providing or effecting of polarization shifting for radiating elements to mitigate or avoid detected interference/PIM. As shown in FIG. 1B, the telecommunication system 180 may include mobile units 182, 183A, 183B, 183C, and 183D, a number of base stations, two of which are shown in FIG. 1B at reference numerals 184 and 186, and a switching station 188 to which each of the base stations 184, 186 may be interfaced. The base stations 184, 186 and the switching station 188 may be collectively referred to as network infrastructure.

During operation, the mobile units 182, 183A, 183B, 183C, and 183D exchange voice, data or other information with one of the base stations 184, 186, each of which is connected to a conventional land line communication network. For instance, information, such as voice information, transferred from the mobile unit 182 to one of the base stations 184, 186 is coupled from the base station to the communication network to thereby connect the mobile unit 182 with, for example, a land line telephone so that the land line telephone may receive the voice information. Conversely, information, such as voice information may be transferred from a land line communication network to one of the base stations 184, 186, which in turn transfers the information to the mobile unit 182.

The mobile units 182, 183A, 183B, 183C, and 183D and the base stations 184, 186 may exchange information in either narrow band or wide band format. For the purposes of this description, it is assumed that the mobile unit 182 is a narrowband unit and that the mobile units 183A, 183B, 183C, and 183D are wideband units. Additionally, it is assumed that the base station 184 is a narrowband base station that communicates with the mobile unit 182 and that the base station 186 is a wideband digital base station that communicates with the mobile units 183A, 183B, 183C, and 183D.

Narrow band format communication takes place using, for example, narrowband 200 kilohertz (KHz) channels. The Global system for mobile phone systems (GSM) is one example of a narrow band communication system in which the mobile unit 182 communicates with the base station 184 using narrowband channels. Alternatively, the mobile units 183A, 183B, 183C, and 183D communicate with the base station 186 using a form of digital communications such as, for example, code-division multiple access (CDMA), Universal Mobile Telecommunications System (UMTS), 3GPP Long Term Evolution (LTE), or other next generation wireless access technologies. CDMA digital communication, for instance, takes place using spread spectrum techniques that broadcast signals having wide bandwidths, such as, for example, 1.2288 megahertz (MHz) bandwidths. The terms narrowband and wideband referred to above can be replaced with sub-bands, concatenated bands, bands between carrier frequencies (carrier aggregation), and so on, without departing from the scope of the subject disclosure.

The switching station 188 is generally responsible for coordinating the activities of the base stations 184, 186 to ensure that the mobile units 182, 183A, 183B, 183C, and 183D are constantly in communication with the base station 184, 186 or with some other base stations that are geographically dispersed. For example, the switching station 188 may coordinate communication handoffs of the mobile unit 182 between the base station 184 and another base station as the mobile unit 182 roams between geographic areas that are covered by the two base stations.

In various circumstances, the telecommunication system 180, and more particularly, one or more of the base stations 184, 186 can be undesirably subjected to interference. Interference can represent emissions within band (narrowband or wideband), out-of-band interferers, interference sources outside cellular (e.g., TV stations, commercial radio or public safety radio), interference signals from other carriers (inter-carrier interference), interference signals from UEs operating in adjacent base stations, PIM, and so on. Interference can represent any foreign signal that can affect communications between communication devices (e.g., a UE served by a particular base station).

Figure 2A:
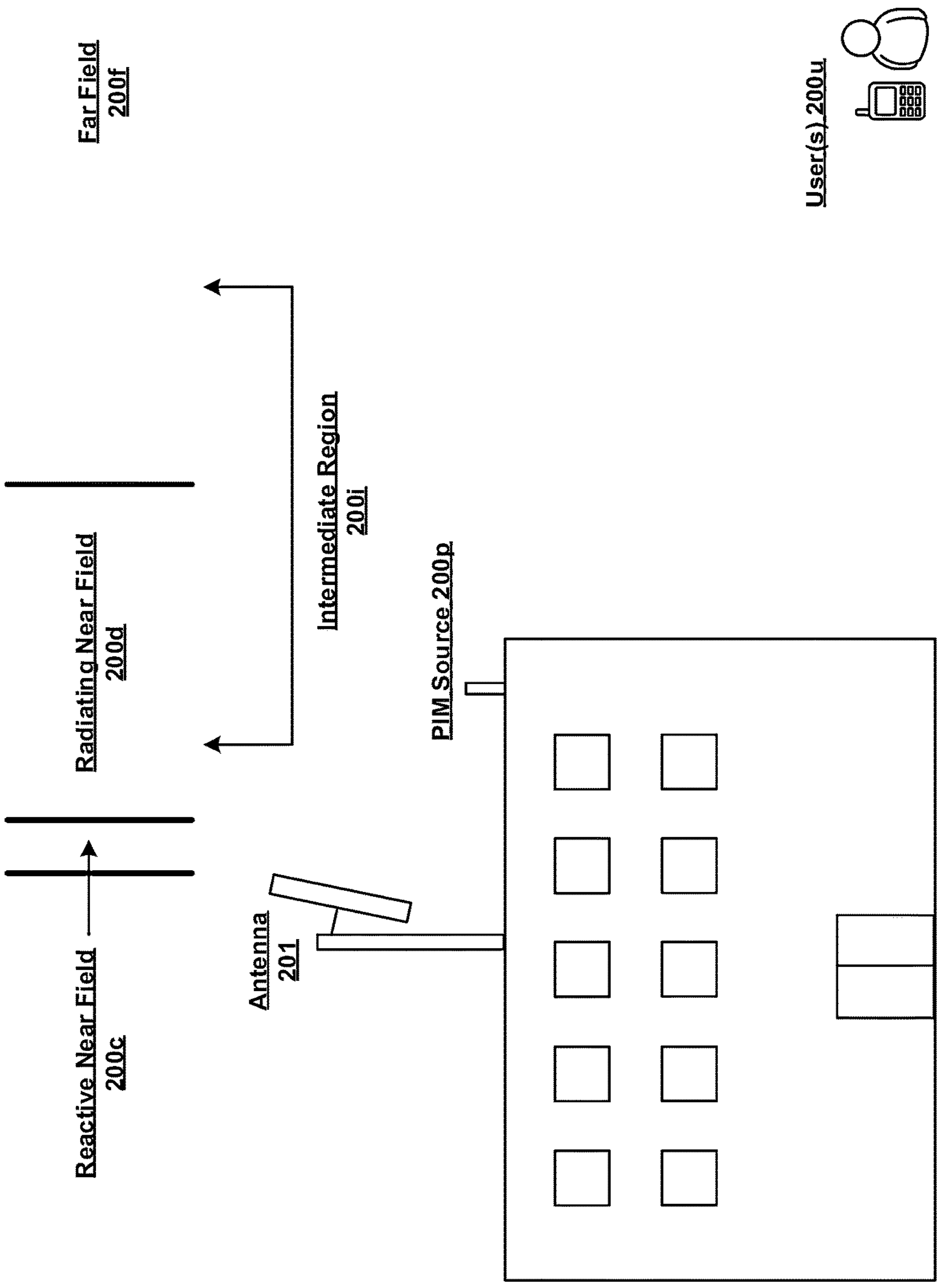
FIG. 2A is a block diagram illustrating an example, non-limiting embodiment of a system functioning within, or operatively overlaid upon, the communications network of FIG. 1A and/or the communications system of FIG. 1B in accordance with various aspects described herein.

FIG. 2A is a block diagram illustrating an example, non-limiting embodiment of a system 200 functioning within, or operatively overlaid upon, the communications network 100 of FIG. 1A and/or the communications system 180 of FIG. 1B in accordance with various aspects described herein. As depicted, the system 200 can include an antenna (or antenna system) 201. In various embodiments, the antenna 201 may include multiple radiating elements. In one or more embodiments, the antenna 201 may include multiple columns and/or rows of radiating elements, forming one or more antenna arrays or panels. As shown in FIG. 2A, the antenna 201 can be associated with various spatial regions, including a reactive near-field region 200*c*, a radiating near-field region 200*d*, a far-field region 200*f*, and an intermediate region 200*i*. One or more UEs/users 200*u* may be located in the far-field region 200*f*. The intermediate region 200*i* may include a zone that overlaps a portion of the radiating near-field region 200*d* and a portion of the far-field region 200*f*.

In various antenna deployments, antennas (or more particularly, the uplink) may be subject to interference and/or PIM—e.g., a PIM source 200*p*. PIM interference may be due to nonlinearities external to antennas that, when subjected to electromagnetic waves emitted by antenna elements in the downlink frequency band, generate reflections at frequencies in the uplink frequency band. PIM interference may also be due to antenna(s) of a base station transmitting and receiving in downlink and uplink frequency bands that are close to one another, or due to different antennas of different base stations transmitting in frequency bands that are close to one another. In these cases, intermodulation of signals transmitted in different (but sufficiently close) frequencies can result in passive signals falling into an uplink frequency band. In any case, interference/PIM decreases uplink sensitivity and thus negatively impacts uplink coverage, reliability, performance, and data speeds.

As depicted in FIG. 2A, the antenna 201 can be disposed or deployed on a structure, such as a building rooftop. It is to be appreciated and understood that the antenna 201 can be deployed in any suitable manner. As one example, the antenna 201 may be mounted on one or more towers where few or no objects may be located nearby (e.g., an unobstructed antenna on a tower), and thus a far-field representation may be adequate. As another example, multiple antennas 201 may be located within close proximity to one another (e.g., within a threshold distance from one another), where the antennas 201 may or may not have overlapping degrees of coverage, and thus the near-field region may have an impact on antenna performance. As yet another example, one or more antennas 201 may be deployed on building rooftop(s) in densely-populated areas (e.g., towns or cities). In this example, the antennas 201 may be located within close proximity to one another and may have overlapping degrees of coverage and/or may be obstructed by nearby external objects, such that the near-field and intermediate field regions may have an impact on antenna performance.

The far field (e.g., the far-field region 2000 may be defined by a distance $r>>2L^2/(\lambda)$, where L is the length of the antenna and A is the wavelength of a transmitted signal. Antenna specifications are generally based on the far-field region. In the far-field region, the electric and magnetic fields are perpendicular to each other, the ratio of E/H is the free space propagation, and the antenna pattern is not a function of the distance r. The near field, and more particularly the reactive near-field (e.g., the reactive near-field region 200*c*), can be defined by $r<\lambda/2\pi$. In the radiating near-field region (or the Fresnel region) (e.g., the radiating near-field region 200*d*), for $\lambda/2\pi<r<2L^2/(\lambda)$, the radiated power density is greater than the reactive power density and $1/r^3$ is very small, but the 1/r and $1/r^2$ terms are still dominant. For the intermediate region (e.g., the intermediate region 200*i*), where $r>2L^2/(\lambda)$, the term 1/r is larger than the other terms but not yet dominant. In all of the regions other than the far-field region, the electric and magnetic fields are not perpendicular. Various exemplary embodiments described herein account for the transition region—i.e., the intermediate region—between/overlapping the near-field and far-field regions, which can be represented differently, mathematically.

Figure 2B:
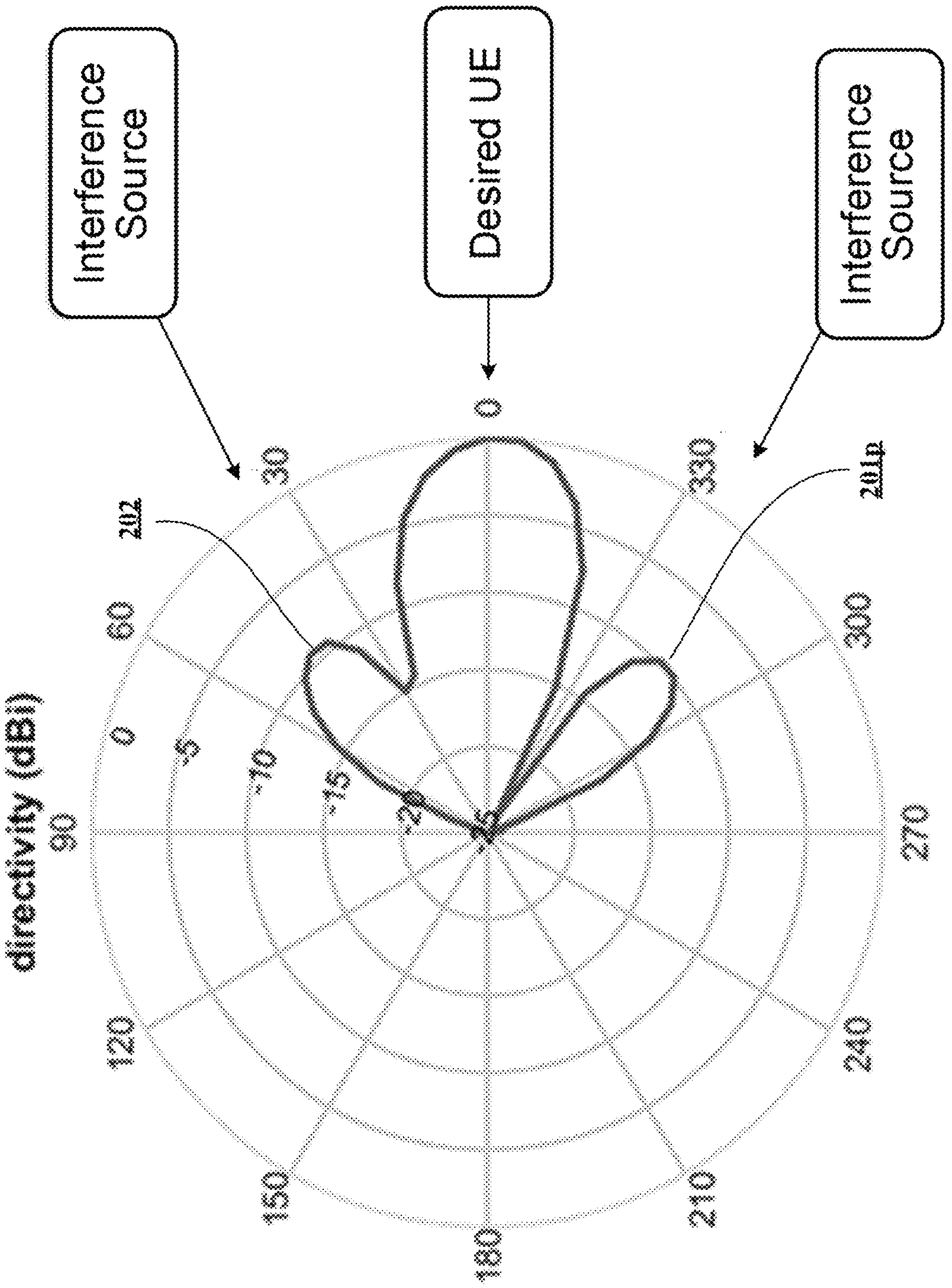
FIG. 2B depicts example null patterns for interference sources in accordance with various aspects described herein.

Antennas are typically designed based on the desired behavior in the far-field region—i.e., in accordance with certain design goals relating to beamwidth, half-power bandwidth, directivity, and back lobe radiation. Antennas are also designed not to generate PIM. Smart antennas are configured to minimize interference, generally by identifying the direction of the interference and creating nulls in that direction to avoid reception and transmission. For example, FIG. 2B depicts example null patterns 201*p* for interference sources in accordance with various aspects described herein. In certain embodiments, the antenna 201 may be operated using nulling techniques in which the energy reflected from the far-field is detected and used for optimization decisions. In such embodiments, the performance of the antenna(s) may thus be optimized (or improved) based on (e.g., based only on) the far field and not on the near field or the intermediate field.

Figure 2C:
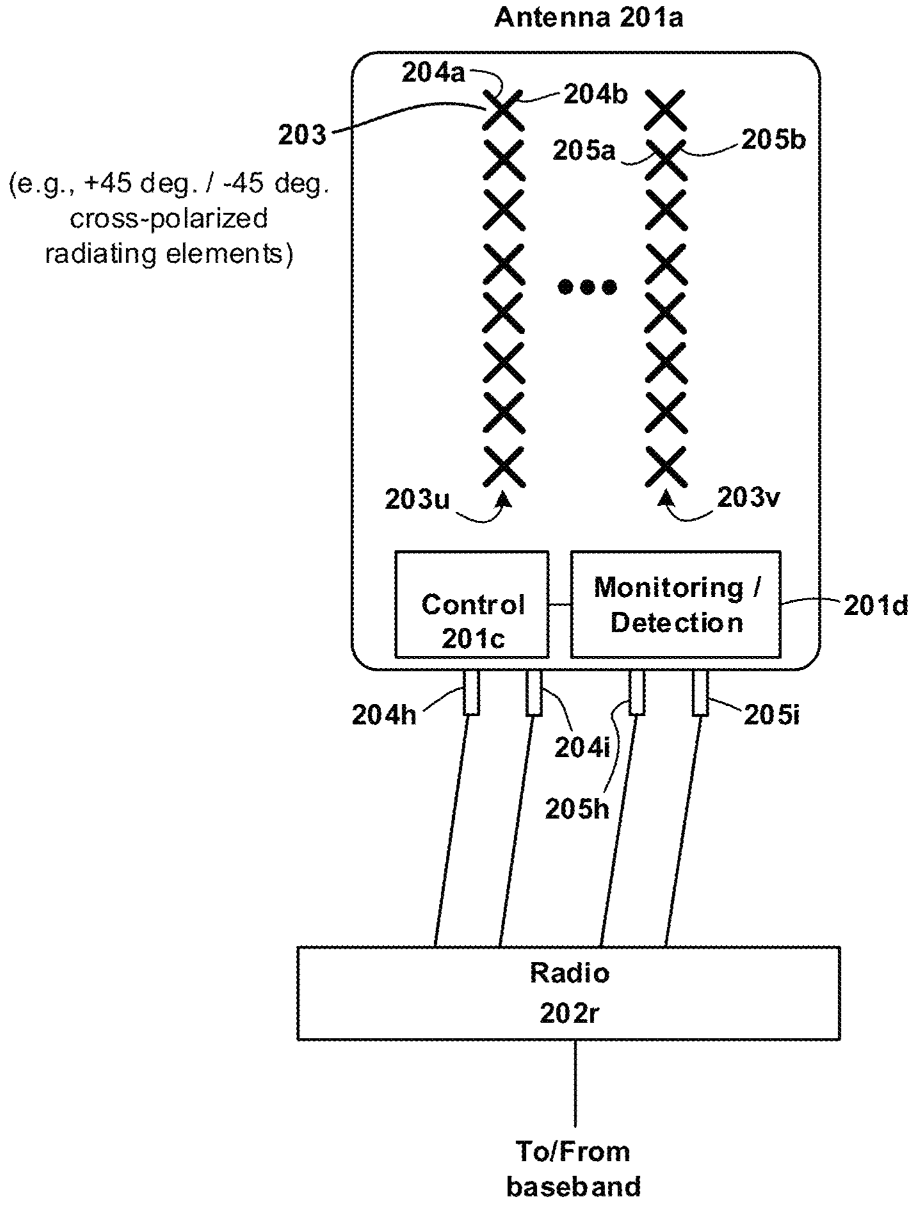
FIG. 2C is a block diagram illustrating an example, non-limiting embodiment of a communications system having an antenna comprising radiating elements and control and monitoring/detection devices for interference/PIM detection and mitigation (or avoidance), and functioning within, or operatively overlaid upon, the communications network of FIG. 1A and/or the communications system of FIG. 1B in accordance with various aspects described herein.

FIG. 2C is a block diagram illustrating an example, non-limiting embodiment of a communications system 202 having an antenna 201*a* comprising radiating elements 203 and control and monitoring/detection units 201*c* and 201*d* for interference/PIM detection and mitigation/avoidance control. In various embodiments, the antenna 201*a* may be the same as, may be similar to, or may otherwise correspond to the antenna 201 of FIG. 2A. Various implementations of the control unit 201*c* and the monitoring/detection unit 201*d* are described in more detail below (e.g., as control unit 221*c* and monitoring/detection unit(s) 221*d* in FIGS. 5A-5C).

As shown in FIG. 2C, the antenna 201*a* may be configured as a 4-port (204*h*, 204*i*, 205*h*, and 205*i*), 2-column (203*u*, 203*v*) antenna, with each column having eight dual/cross-polarized radiating elements 203. The antenna 201*a* and/or the radiating elements 203 therein may have any shape or combination of shapes with any suitable dimensions, polarizations, etc., and can be configured based on interference/PIM mitigation (or avoidance) needs. It is to be appreciated and understood that the antenna 201*a* may have a port/column configuration other than that shown, such as a configuration with more or fewer columns of radiating elements 203, where the number of radiating elements (per column) may vary from 1 to N depending on design objectives.

In exemplary embodiments, each radiating element 203 of antenna 201*a* may include an orthogonally-polarized pair of elements. For instance, as depicted, each radiating element 203 in column 203*u* may include orthogonally-polarized elements 204*a* (e.g., oriented for −45 degree polarization) and 204*b* (e.g., oriented for +45 degree polarization), and each radiating element 203 in column 203*v* may include orthogonally-polarized elements 205*a* (e.g., oriented for −45 degree polarization) and 205*b* (e.g., oriented for +45 degree polarization).

As depicted, the communications system 202 may include a radio 202*r* (e.g., a remote radio head or unit) communicatively coupled (e.g., via analog/RF line(s)) to the outputs/ports 204*h*, 204*i*, 205*h*, and 205*i*. Although not shown in FIG. 2C, the orthogonally-polarized elements 204*a* of the radiating elements 203 in column 203*u* may (e.g., each) be communicatively coupled with the port 204*h* of the antenna 201*a*, the orthogonally-polarized elements 204*b* of the radiating elements 203 in column 203*u* may (e.g., each) be communicatively coupled with the port 204*i* of the antenna 201*a*, the orthogonally-polarized elements 205*a* of the radiating elements 203 in column 203*v* may (e.g., each) be communicatively coupled with the port 205*h* of the antenna 201*a*, and the orthogonally-polarized elements 205*b* of the radiating elements 203 in column 203*v* may (e.g., each) be communicatively coupled with the port 205*i* of the antenna 201*a*. Although also not shown in FIG. 2C, the monitoring/detection unit 201*d* may be communicatively coupled with (e.g., each of) the radiating elements 203. As described in more detail below, the monitoring/detection unit may be configured to perform measurements on signals received at the various radiating elements 203.

As shown in FIG. 2C, the control unit 201*c* may be communicatively coupled with the monitoring/detection unit 201*d*. In exemplary embodiments, the control unit 201*c* may be configured to process detection outputs from the monitoring/detection unit 201*d* to determine the optimal (or best) rotational (or angular) position for (e.g., each column of) radiating elements 203, and cause, via a polarization shifter and a motor and drive assembly, the (e.g., column of) radiating elements 203 to physically rotate to the optimal (or best) position based on the determination. In certain embodiments, the optimal (or best) position may be the position at which there is a maximum in difference between signals received by dipole elements in one polarization (e.g., +45 degrees) relative to signals received by dipole elements in the orthogonal polarization (e.g., −45 degrees)—i.e., where one of the dipole polarizations "sees" interference/PIM and the other of the dipole polarizations does not "see" (or "sees" only minimal) interference/PIM. This enables mitigation or avoidance of interference/PIM by selecting (e.g., only) the signals received by the dipole elements that does not "see" (or "sees" only minimal) interference/PIM.

Although FIG. 2C shows the control unit 201*c* and the monitoring/detection unit 201*d* as being internal devices, in certain embodiments, one or more of the control unit 201*c* and the monitoring/detection unit 201*d* (e.g., some or all of the functionality thereof) may instead be external to the antenna 201*a*, such as, for example, included, or integrated, in the radio 202*r*. In some alternate embodiments, the radio 202*r* may be communicatively coupled with either or both of the control unit 201*c* and the monitoring/detection unit 201*d*.

Figure 2D:
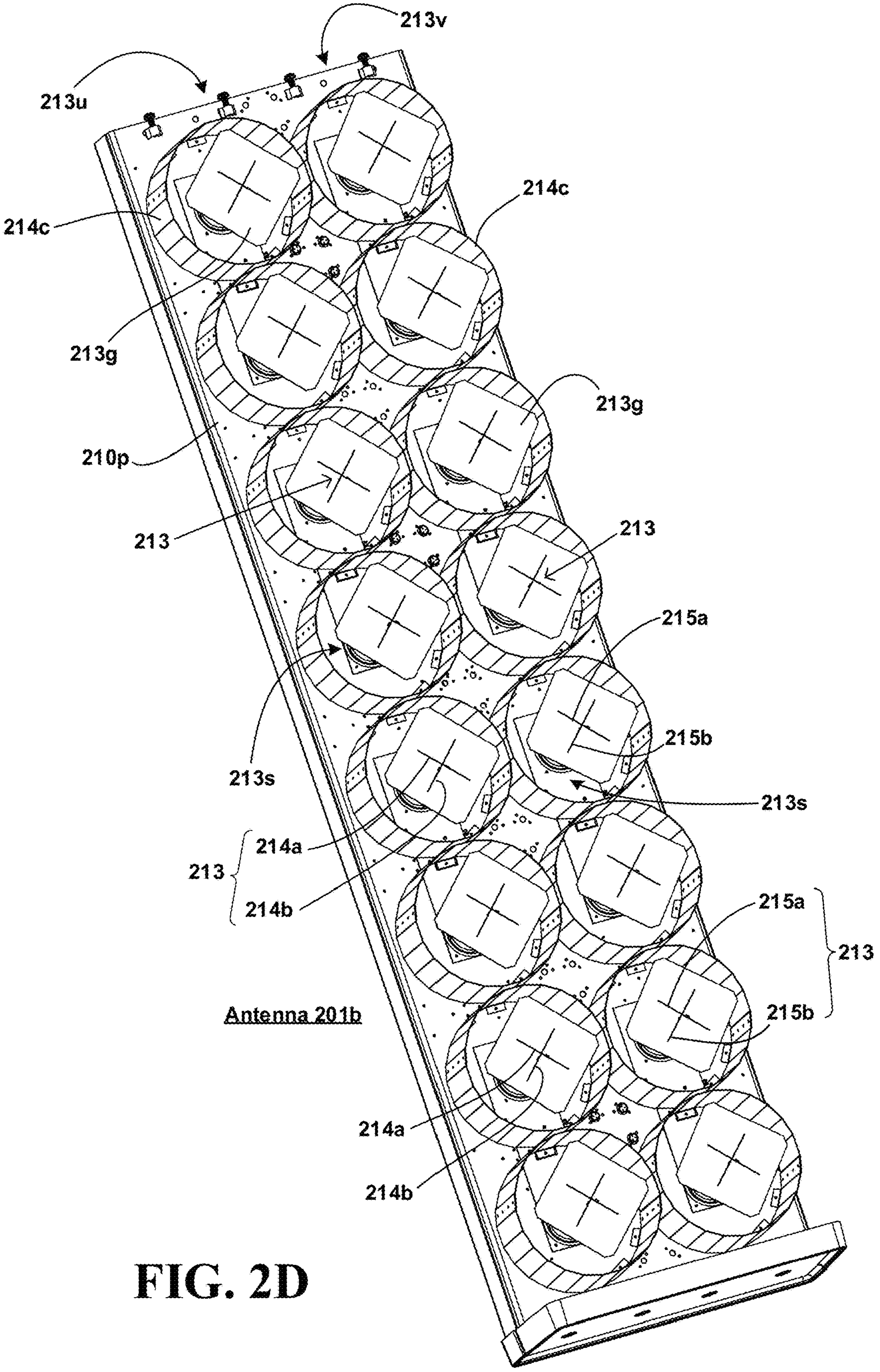
FIGS. 2D and 2E show various views of an example, non-limiting embodiment of an antenna in accordance with various aspects described herein.
Figure 2E:
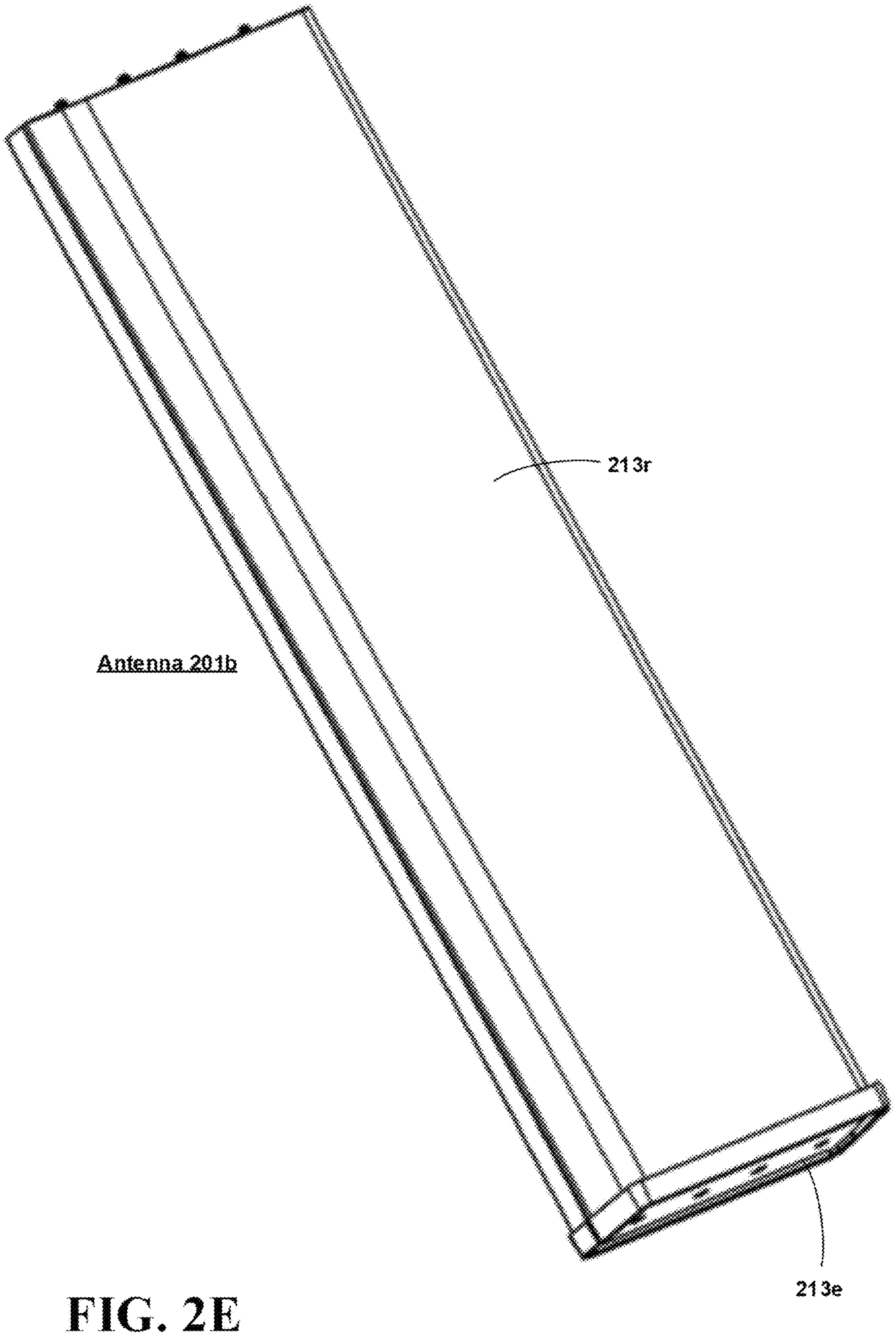
Figure 2F:
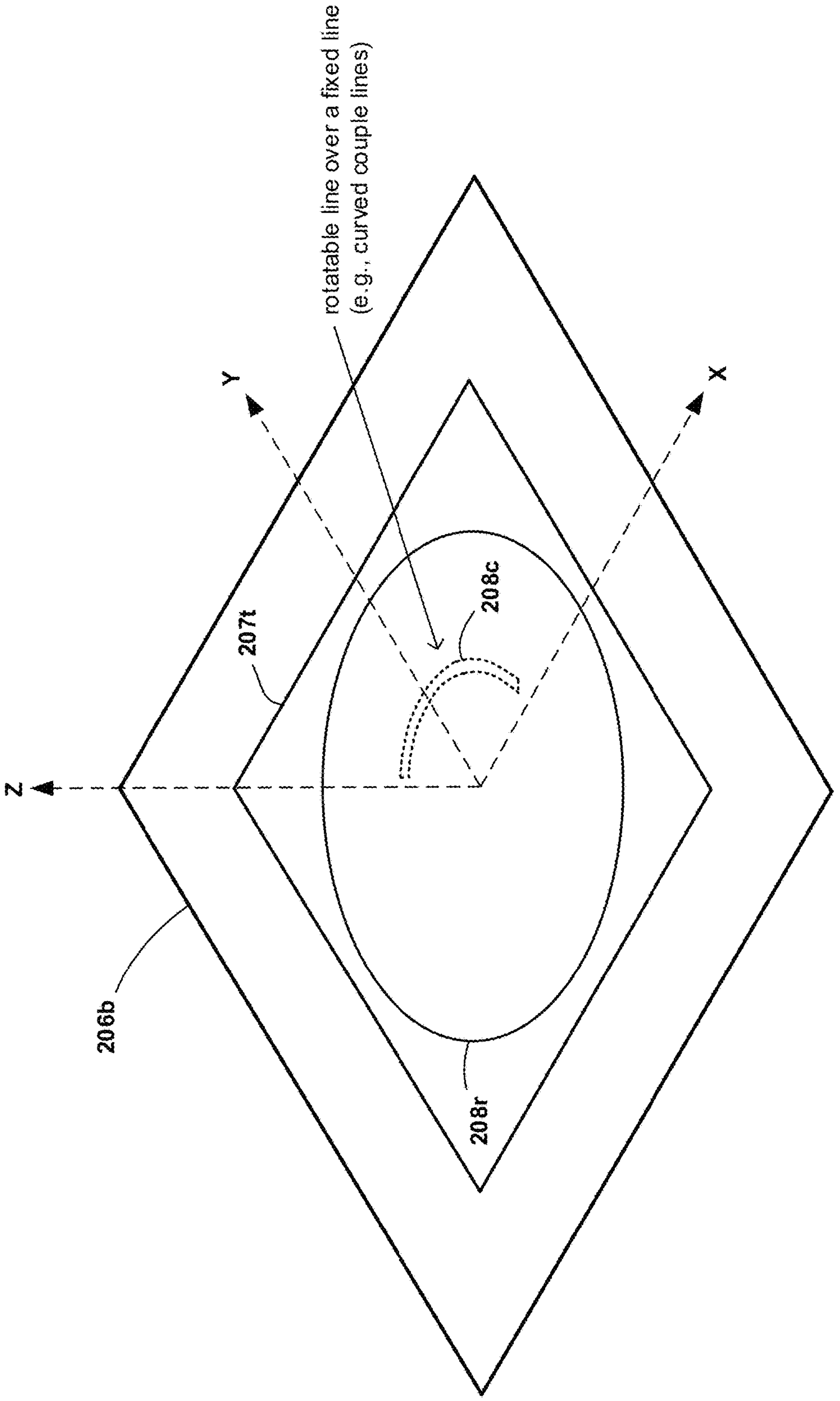
FIGS. 2F-2J show various views of portions of polarization shifter implementations in accordance with various aspects described herein.

FIGS. 2D and 2E show various views of an example, non-limiting embodiment of an antenna 201*b* in accordance with various aspects described herein. In one or more embodiments, the antenna 201*b* may be the same as, may be similar to, or may otherwise correspond to the antenna 201 of FIG. 2A and/or the antenna 201*a* of FIG. 2C. In exemplary embodiments, the antenna 201*b* may be a polarization selectable (e.g., sectorial) antenna array.

As depicted in FIG. 2E, the antenna 201*b* may include an enclosure (e.g., a radome) 213*r* and one or more end caps 213*e*. As shown in FIG. 2D (without the enclosure 213*r* and end cap(s) 213*e*), the antenna 201*b* may include a ground plane 210*p* upon (or adjacent to one or more surfaces upon) which the various components of the antenna 201*b* reside. In exemplary embodiments, the antenna 201*b* may be a 4-port antenna with two (e.g., linear) arrays 213*u*, 213*v* of dual/cross-polarized radiating elements 213. In various embodiments, the arrays 213*u* and 213*v* may be identical (e.g., may include radiating elements having identical configurations). In alternate embodiments, the arrays 213*u* and 213*v* may be different from one another (e.g., may include radiating elements having different configurations). It is to be appreciated and understood that the antenna 201*b* may have a port/array configuration other than that shown, such as a configuration with more or fewer radiating elements 213 and/or with more or fewer arrays of radiating elements 213. Further, the antenna 201*b* may include any suitable number of ground planes.

In exemplary embodiments, each of the radiating elements 213 may be dual port and dual polarized, composed of two linearly-polarized sub-elements that are 90 degrees offset in polarization from one another. Thus, each of the arrays 213*u* and 213*v* may include two sub-arrays of eight sub-elements each. In various embodiments, the eight sub-elements 214*a* of the radiating elements 213 in array 213*u* may all have a particular polarization, and the eight sub-elements 214*b* of the radiating elements 213 in array 213*u* may all have a polarization that is offset from the particular polarization by 90 degrees. Similarly, the eight sub-elements 215*a* of the radiating elements 213 in array 213*v* may all have a certain polarization, and the eight sub-elements 215*b* of the radiating elements 213 in array 213*v* may all have a polarization that is offset from that certain polarization by 90 degrees. In exemplary embodiments, the arrays 213*u* and 213*v* may be mounted to the ground plane 210*p*, and may be coupled to one or more RF feed networks. In one or more embodiments, the four sub-arrays may be independently fed to respective antenna ports (e.g., 204*h*, 204*i*, 205*h*, and 205*i* of FIG. 2C) via one or more RF feed networks—e.g., one port for each sub-array.

In various embodiments, each the radiating elements 213 may be designed and positioned such that their radiation pattern(s) exhibit directional, sectoral coverage. In one or more embodiments, the sub-elements in a dipole pair may be independent of (e.g., operated independently from) one another. For example, the sub-elements in a dipole pair may transmit and/or receive independently of one another.

In various embodiments, each of the radiating elements 213 may reside on (or may be integrated with) an element substrate 213*g*, such as a printed circuit board (PCB), together forming a, e.g., linear polarized antenna element. In one or more embodiments, each radiating element 213 and its corresponding element substrate 213*g* may be integrated with, coupled to, or otherwise included as part of a respective polarization shifter 213*s*, which can be configured to excite (or otherwise facilitate provision of physical forces to) the element substrate 213*g* to rotate the radiating element 213 thereon. FIGS. 2F-2J show views of various portions of polarization shifter implementations (described in more detail below). As also described in more detail below, the arrays 213*u* and 213*v* may be configured with (or coupled to), among other components, one or more linear drive assemblies, one or more control units, and one or more (e.g., interference/PIM) monitoring/detection units.

As shown in FIG. 2D, each of the radiating elements 213 and various other components associated therewith may be at least partially surrounded by a structure (e.g., cylindrical can) 214*c*. In exemplary embodiments, the cans 214*c* may be composed of material(s) and/or may have dimensions selected to prevent the radiating elements 213 within different cans 214*c* from impacting one another (whether in the same array or in the neighboring array). As one example, the cans 214*c* may be made of one or more conductive materials.

Figure 3A:
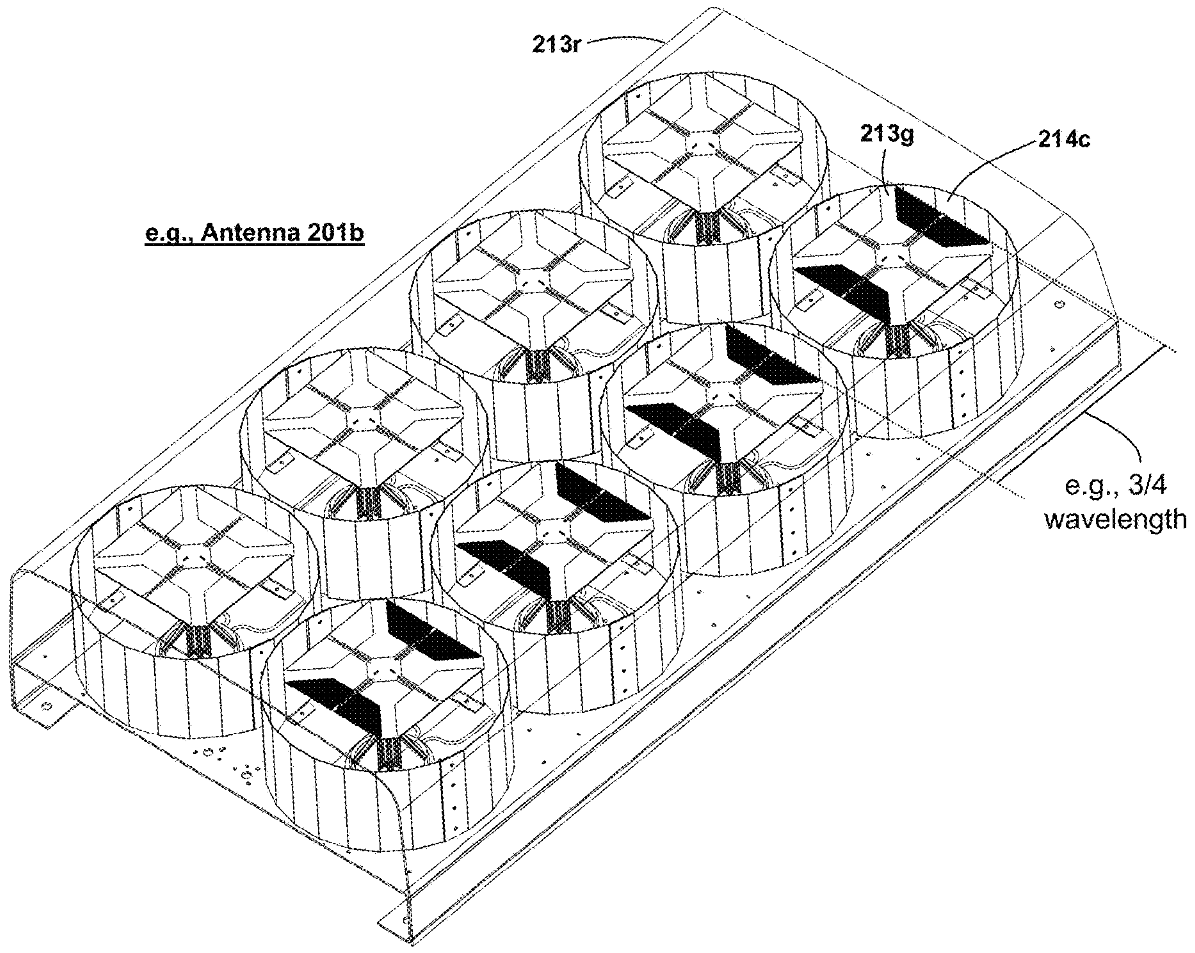
FIGS. 3A-3R are different views of various portions/implementations of an antenna in accordance with various aspects described herein.
Figure 3B:
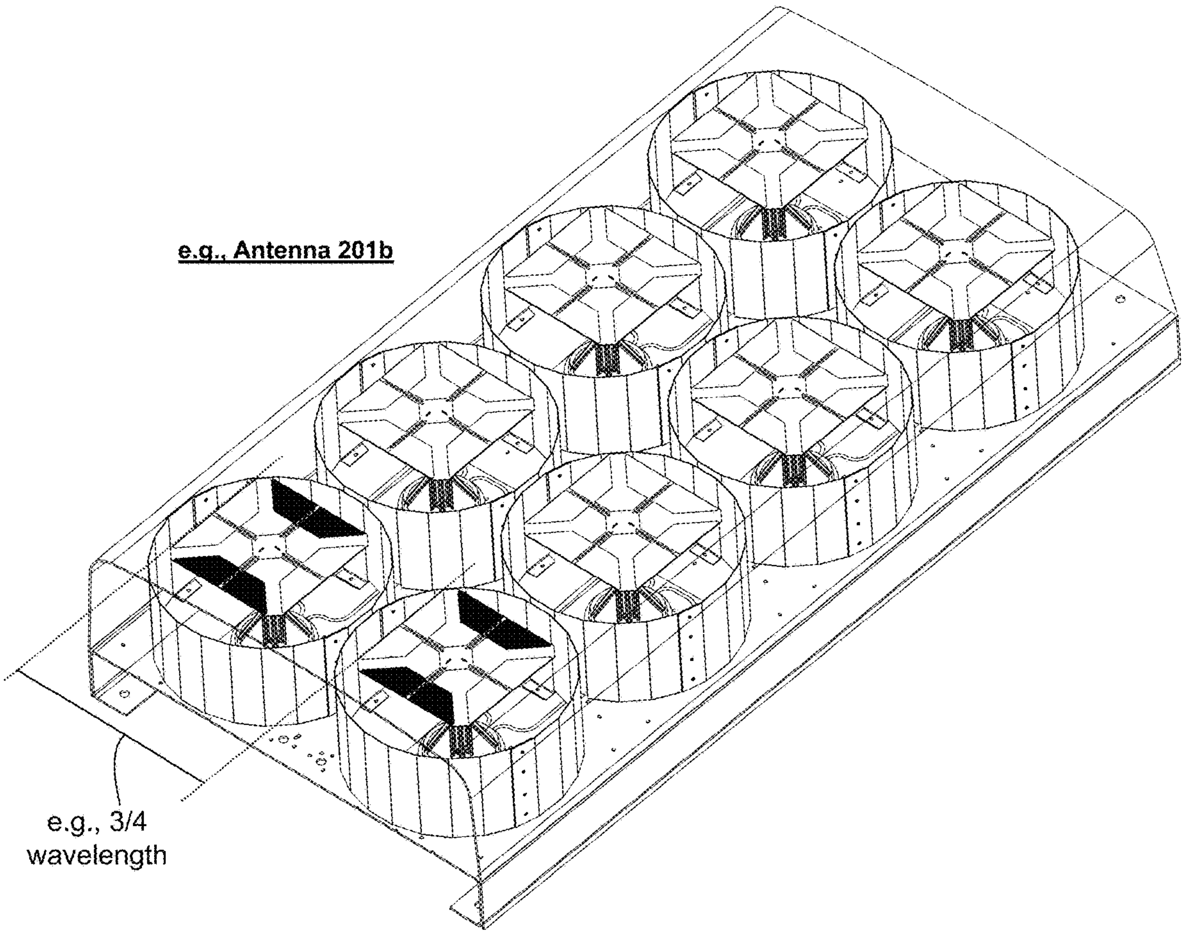
FIGS. 3S-3U show various alternate polarization shifters having different constructions, in accordance with various aspects described herein.
Figure 3C:
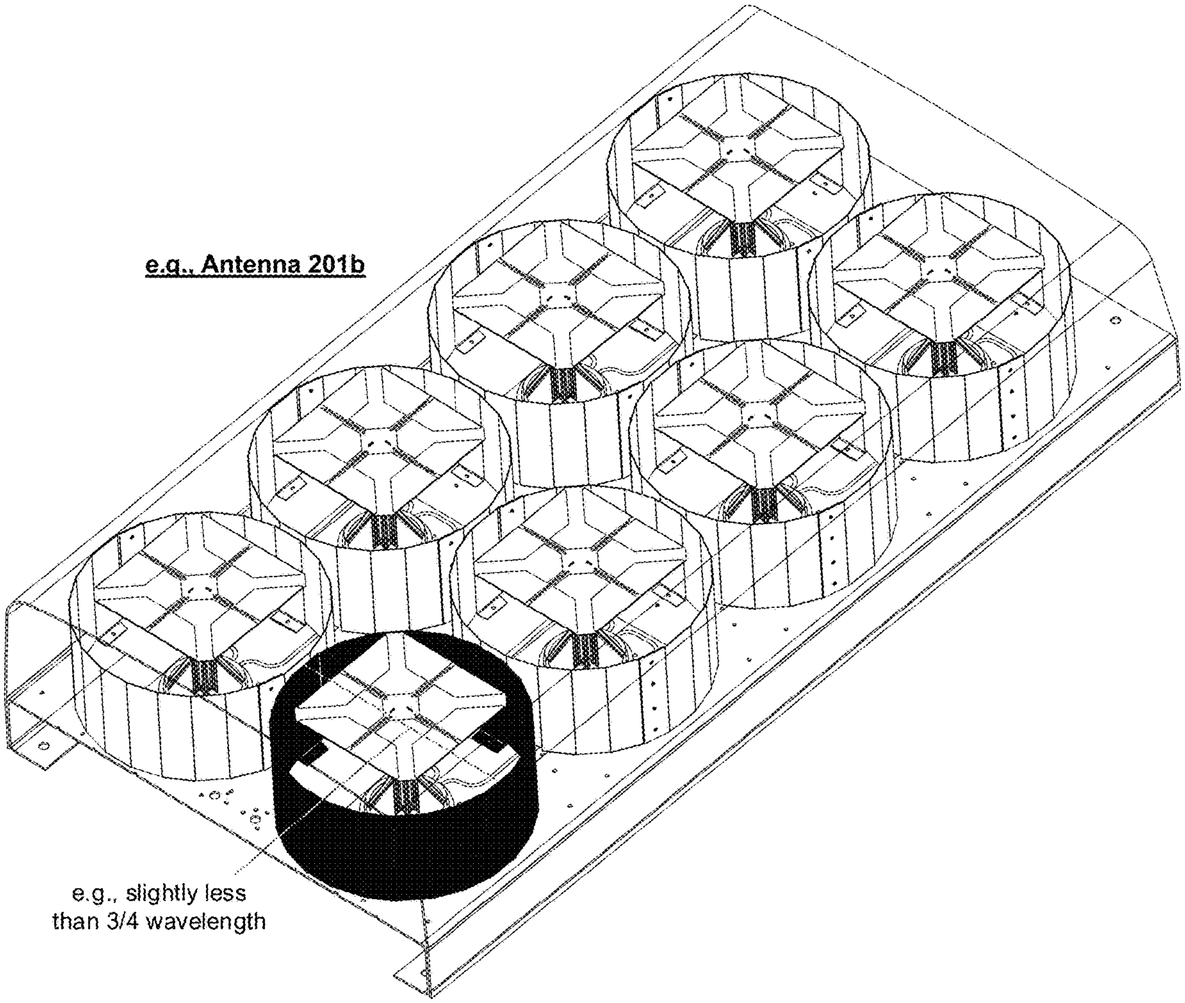
Figure 3D:
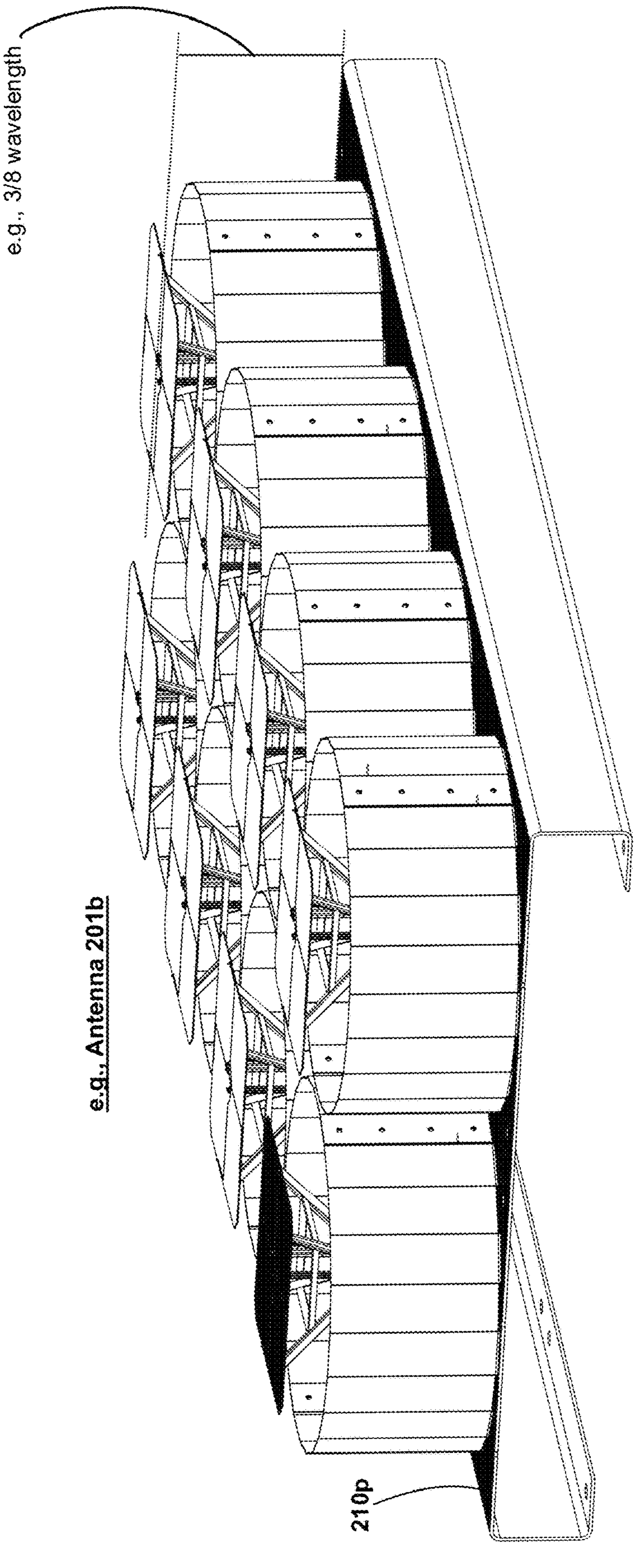
Figure 3E:
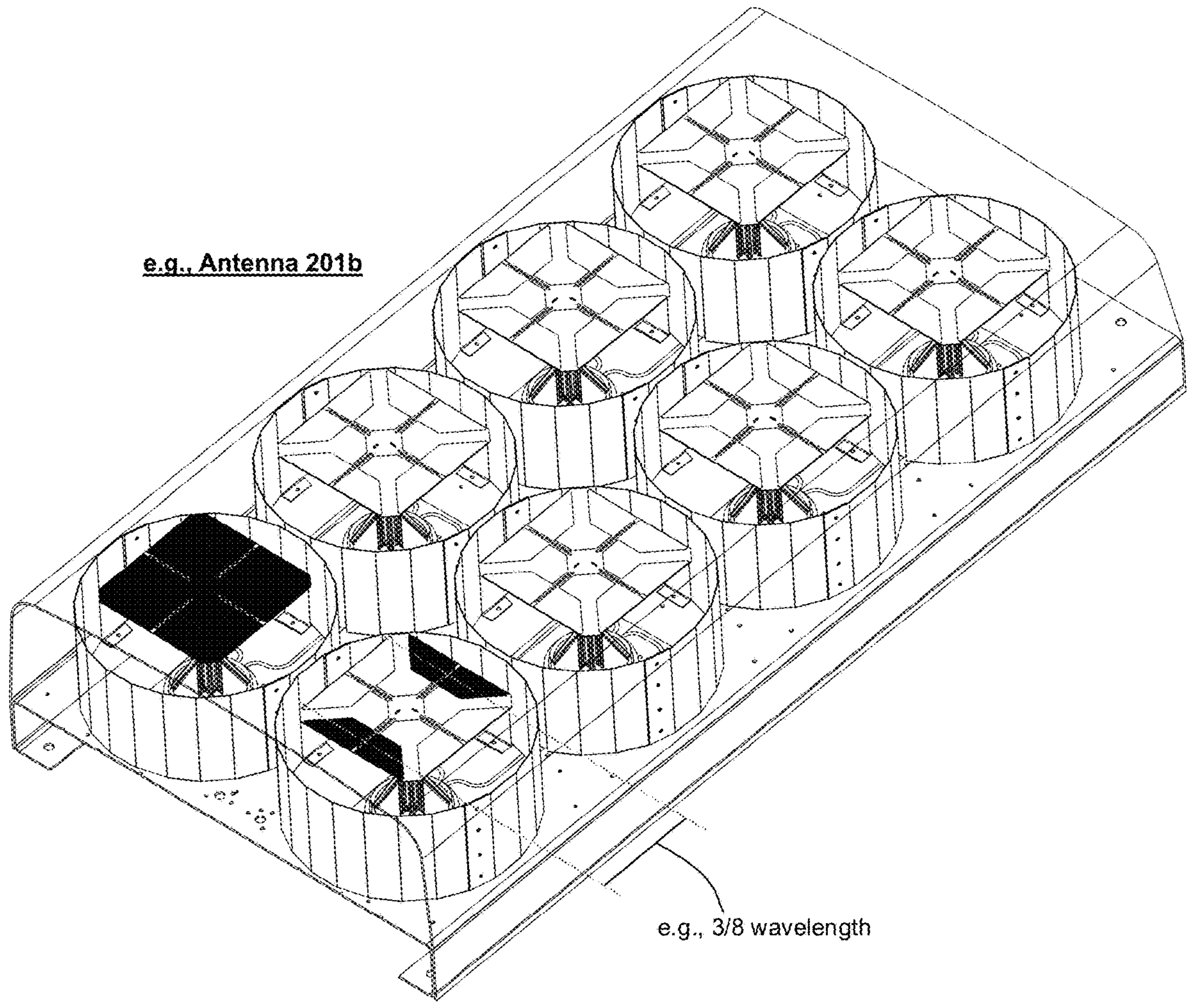
Figure 3F:
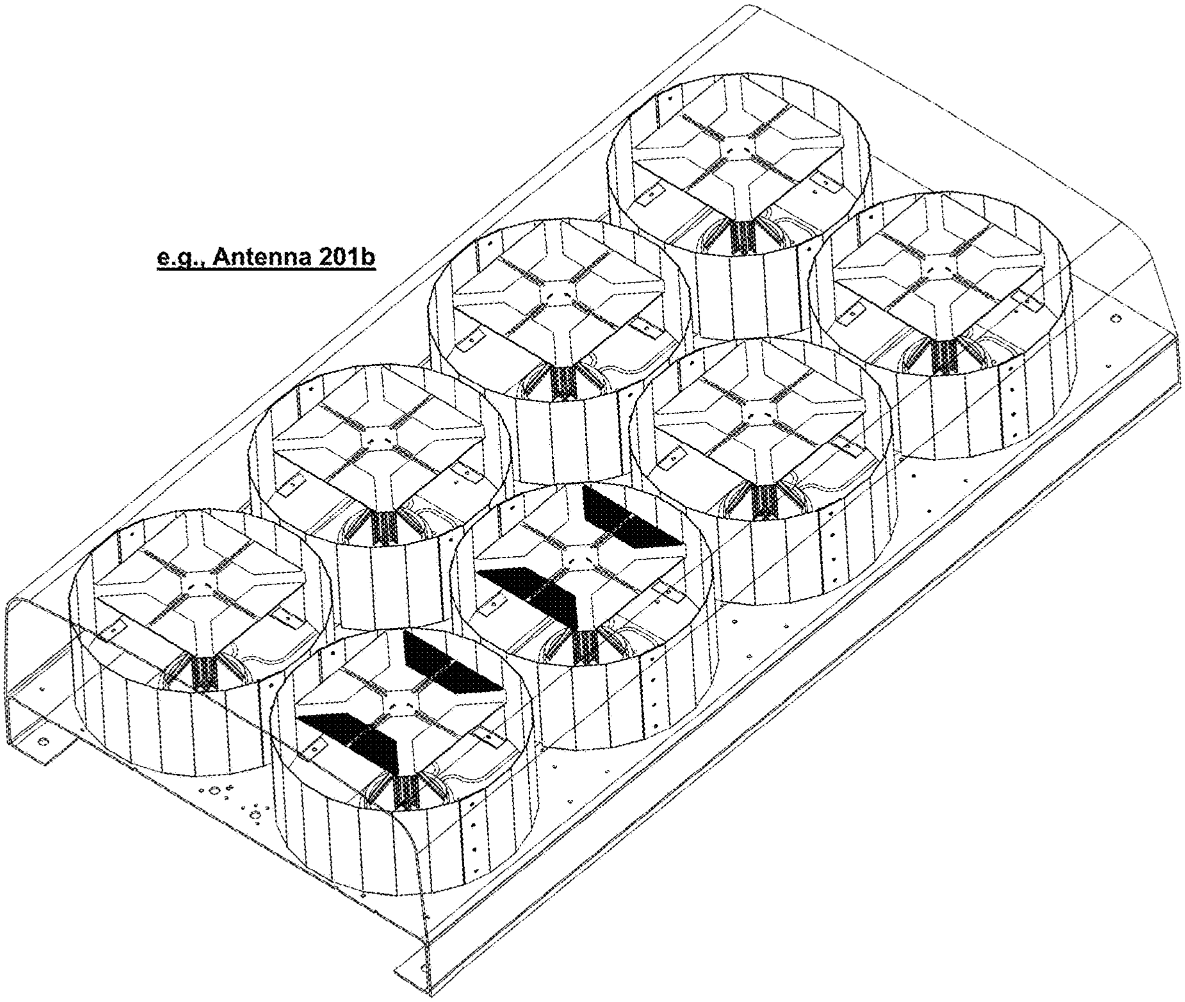
Figure 3G:
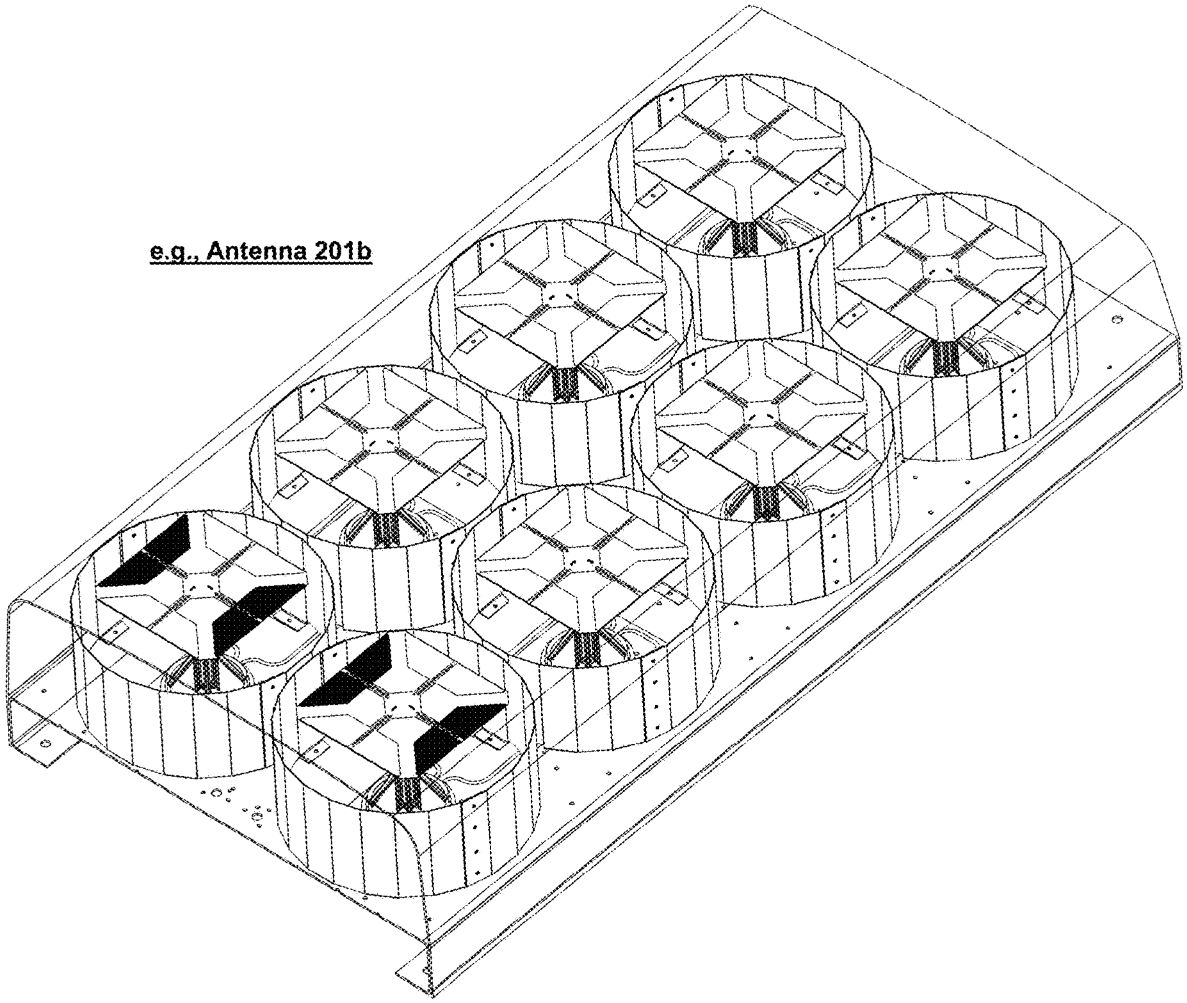
Figure 3H:
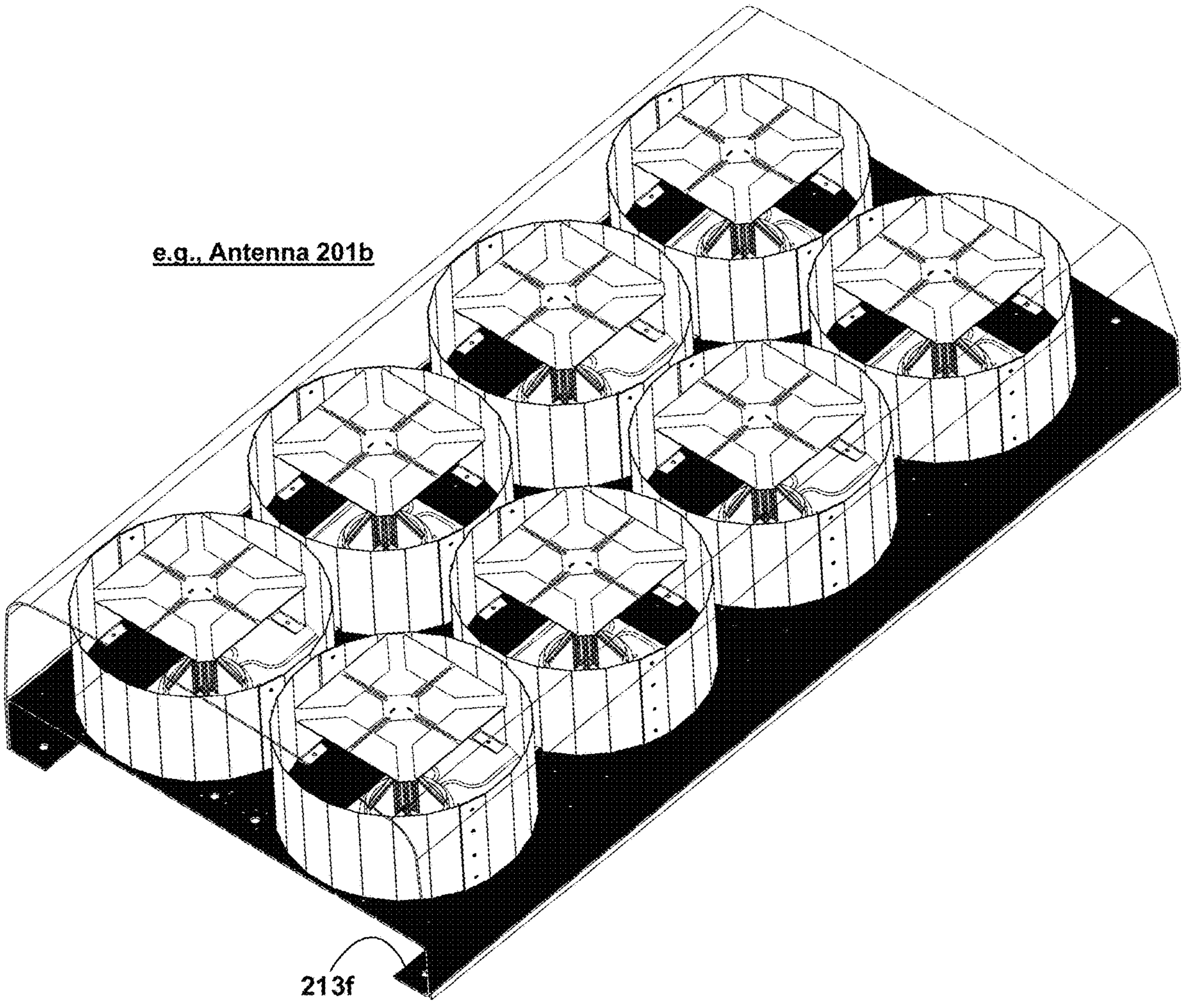
Figure 3I:
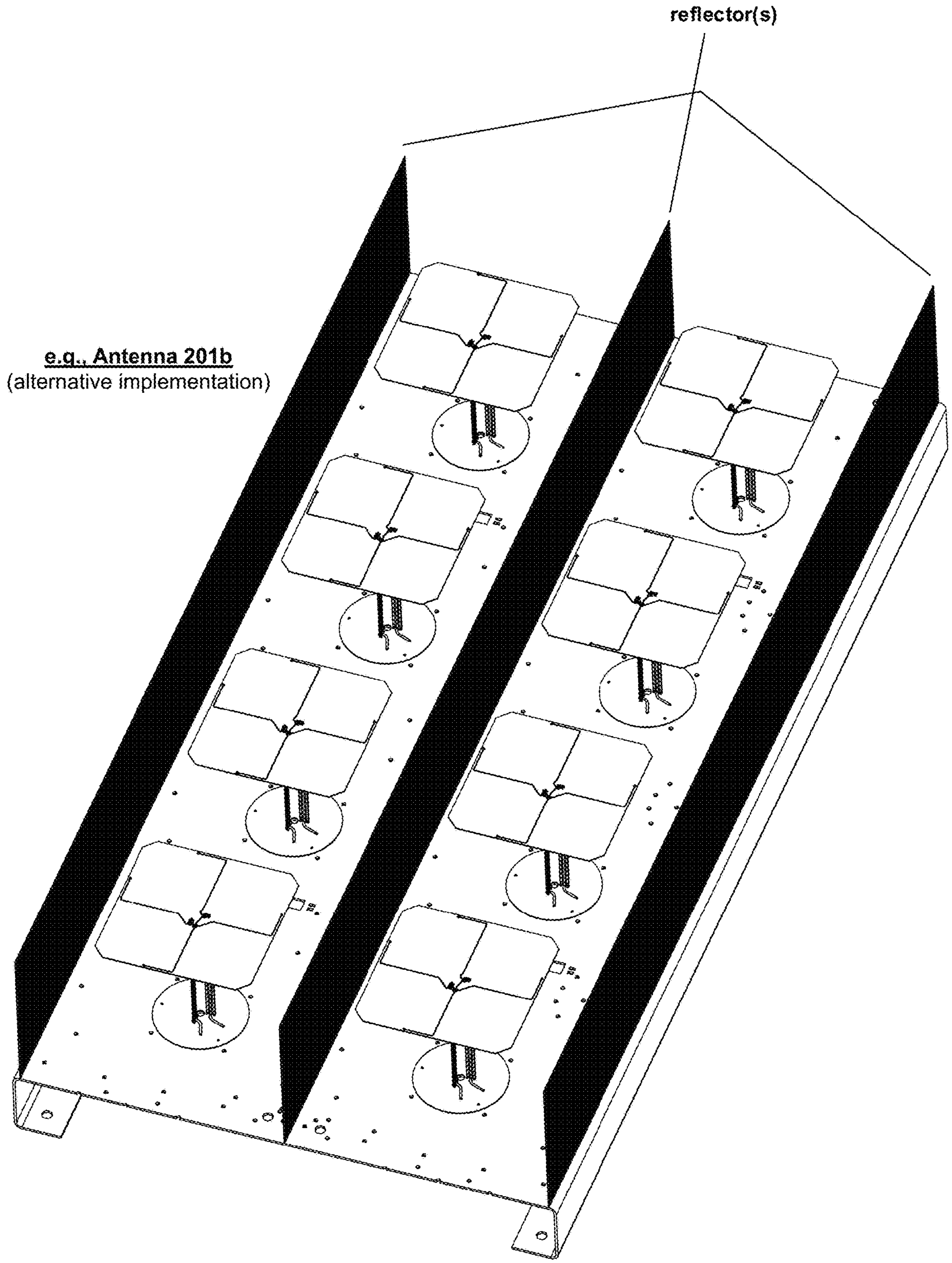
Figure 3J:
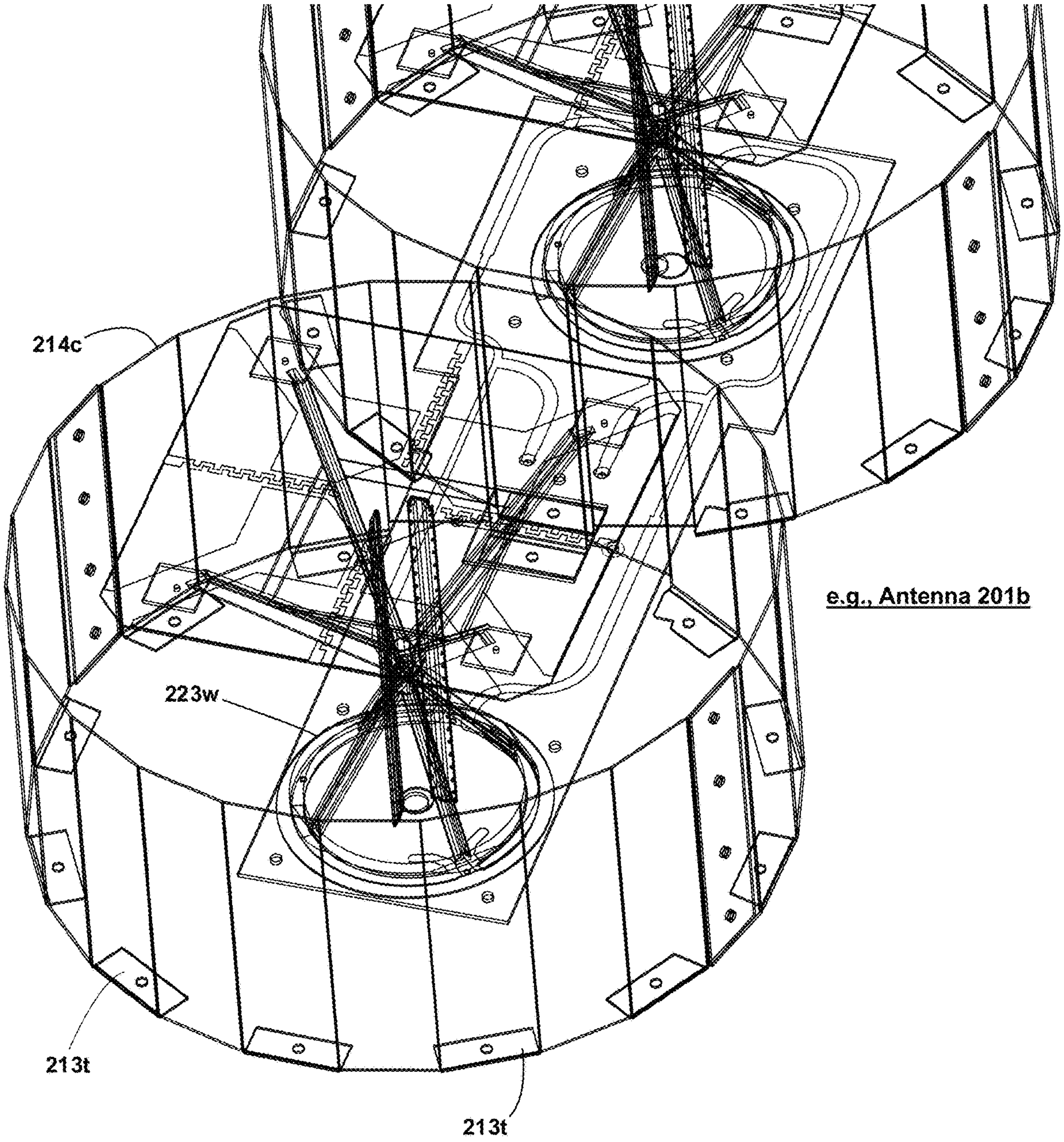
Figure 3K:
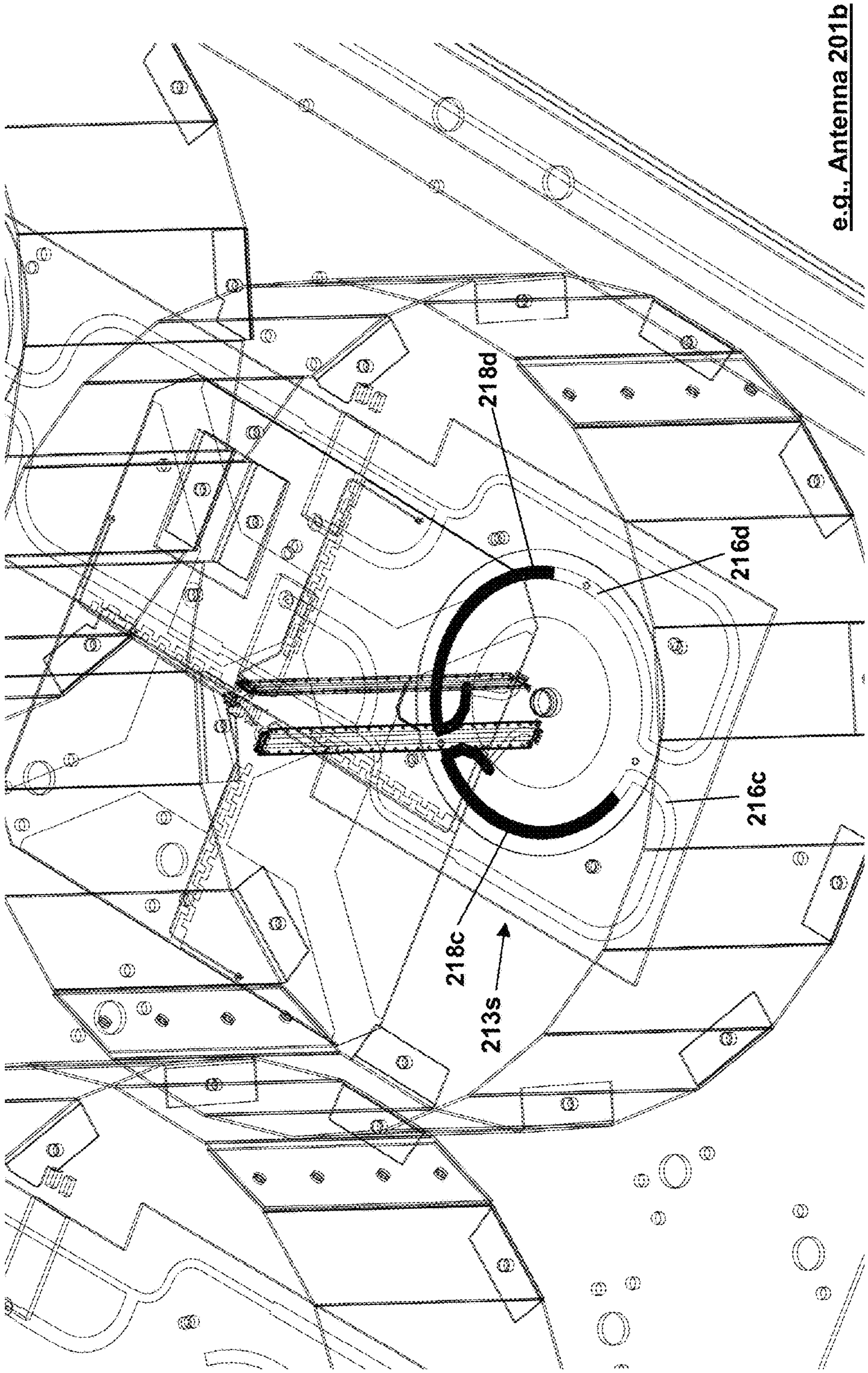
Figure 3L:
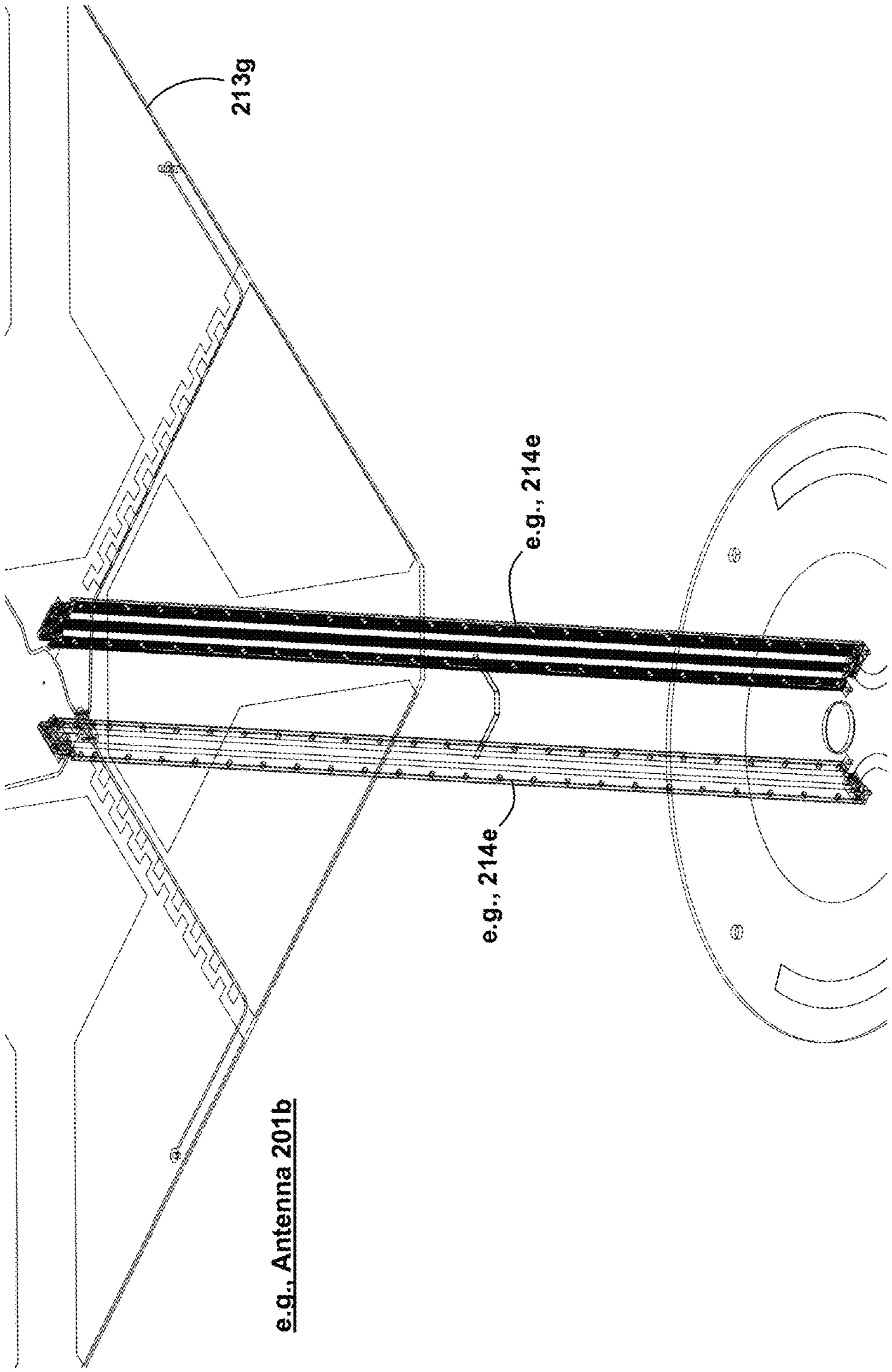
Figure 3M:
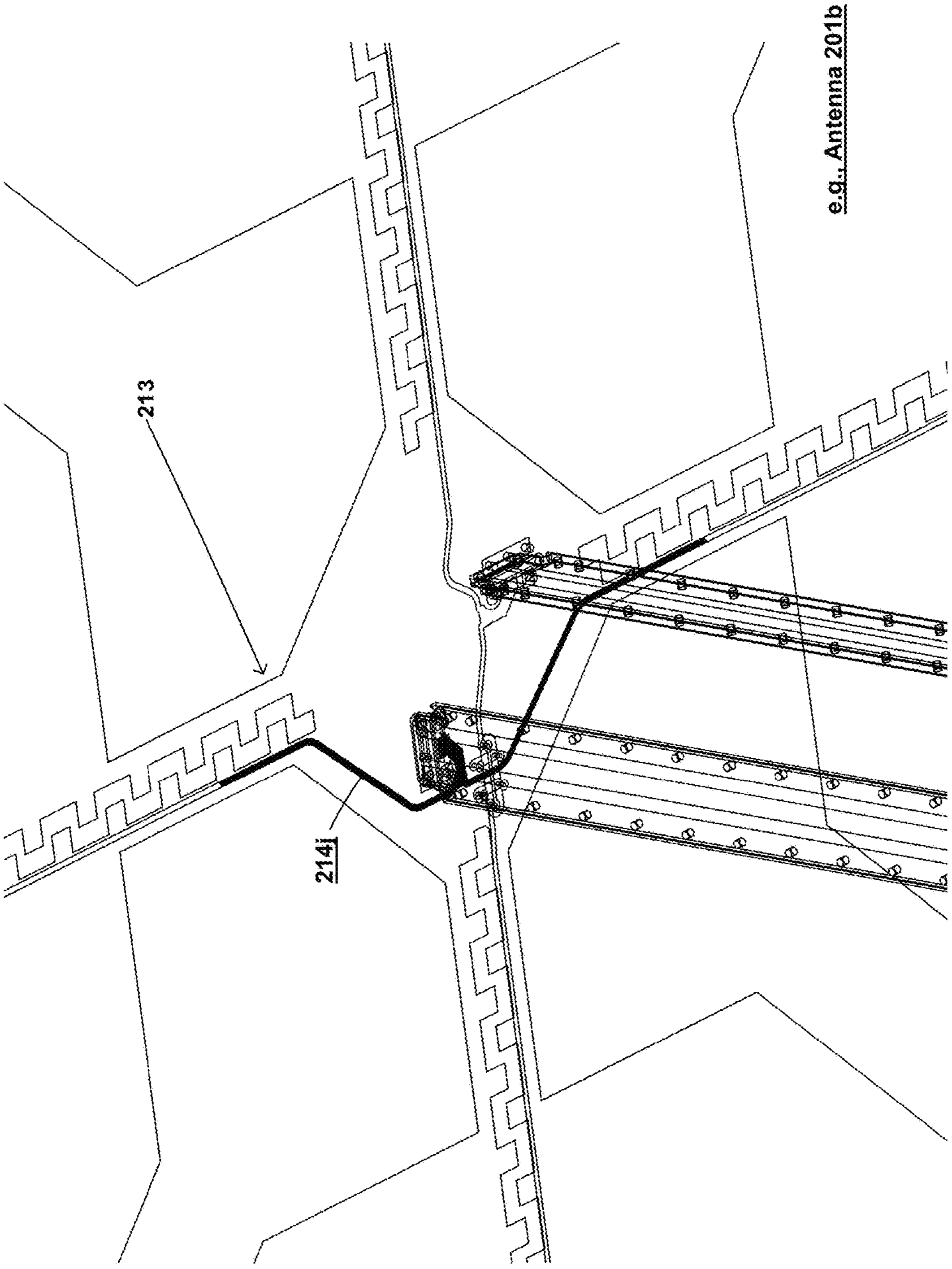
Figure 3N:
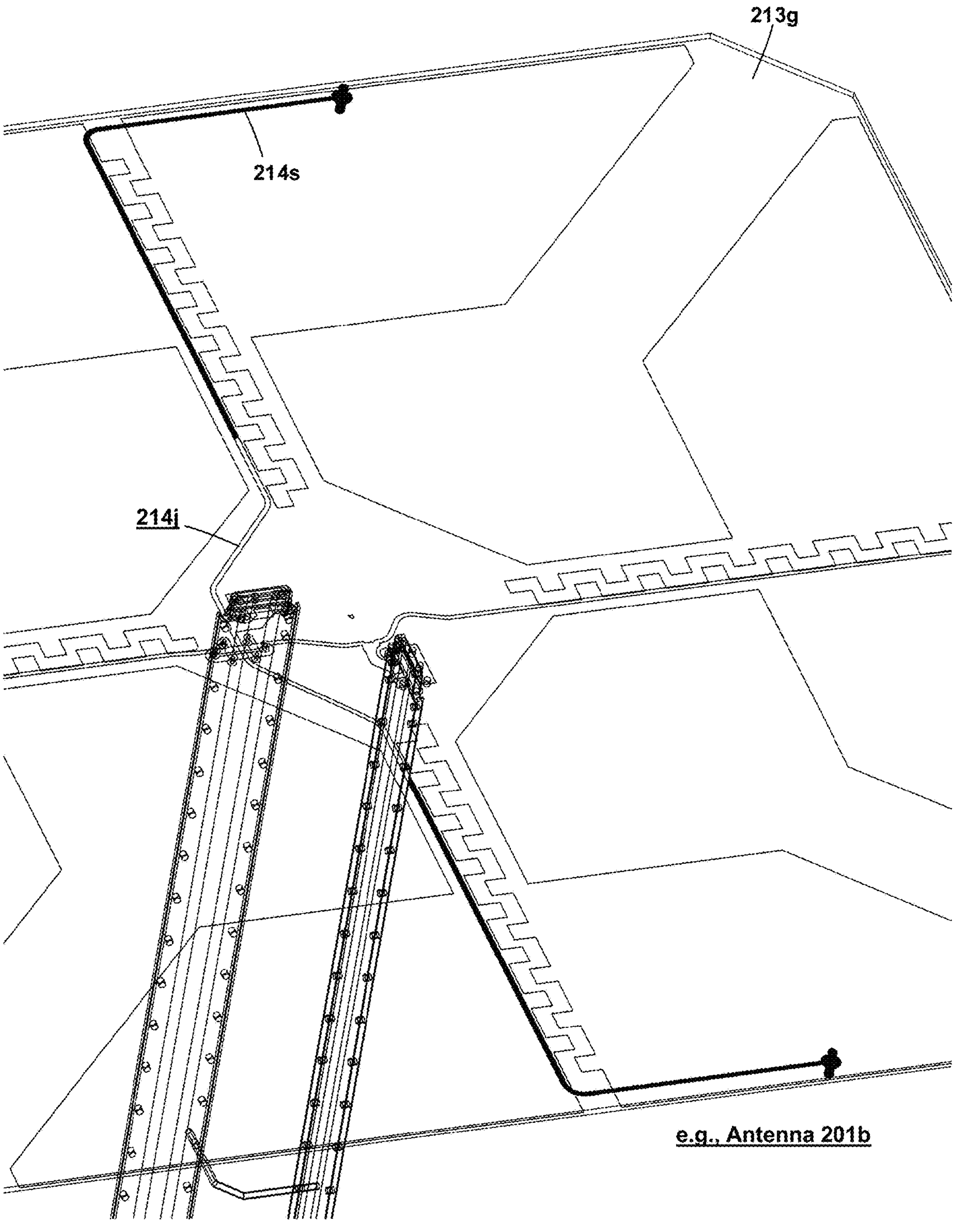
Figure 3O:
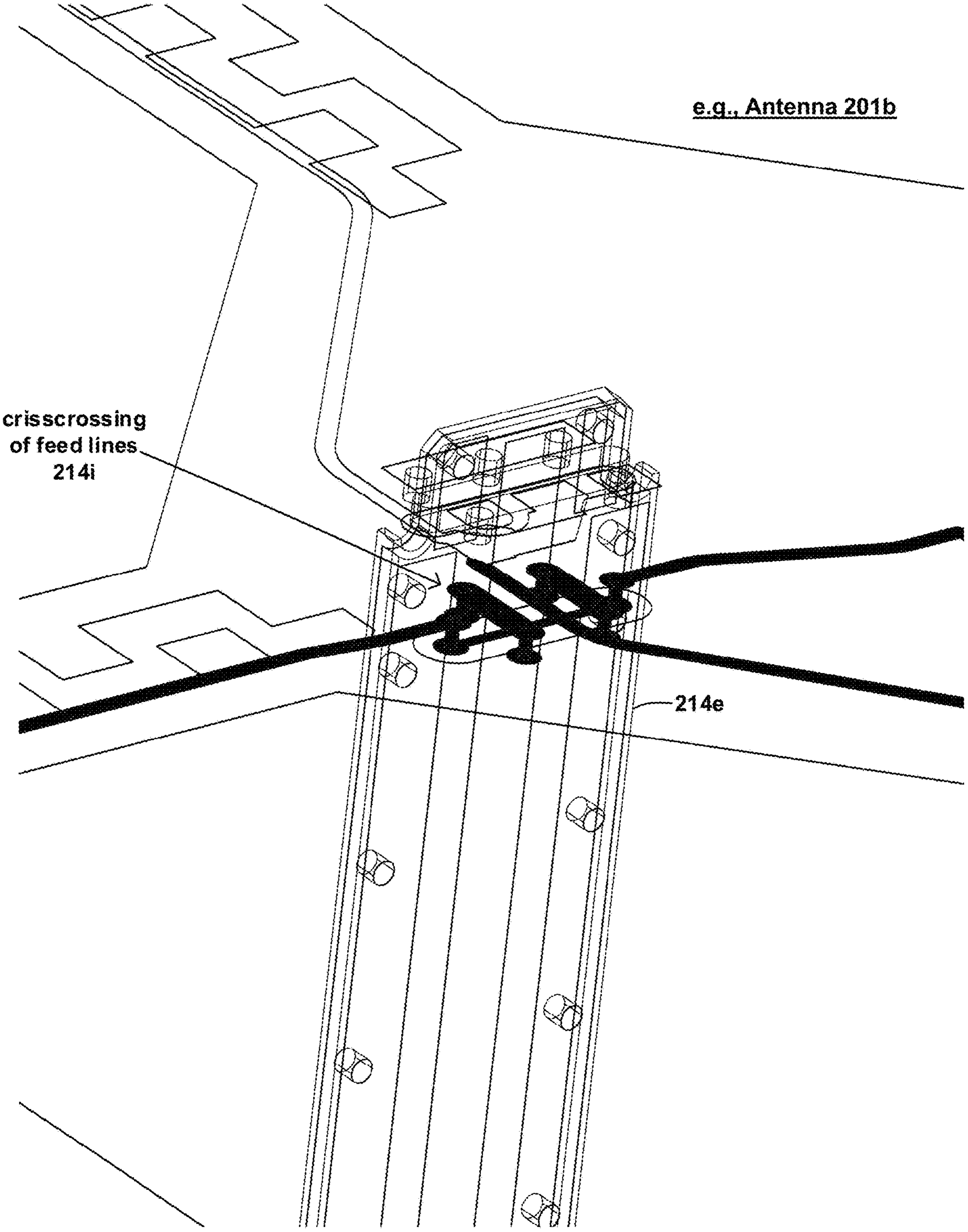
Figure 3P:
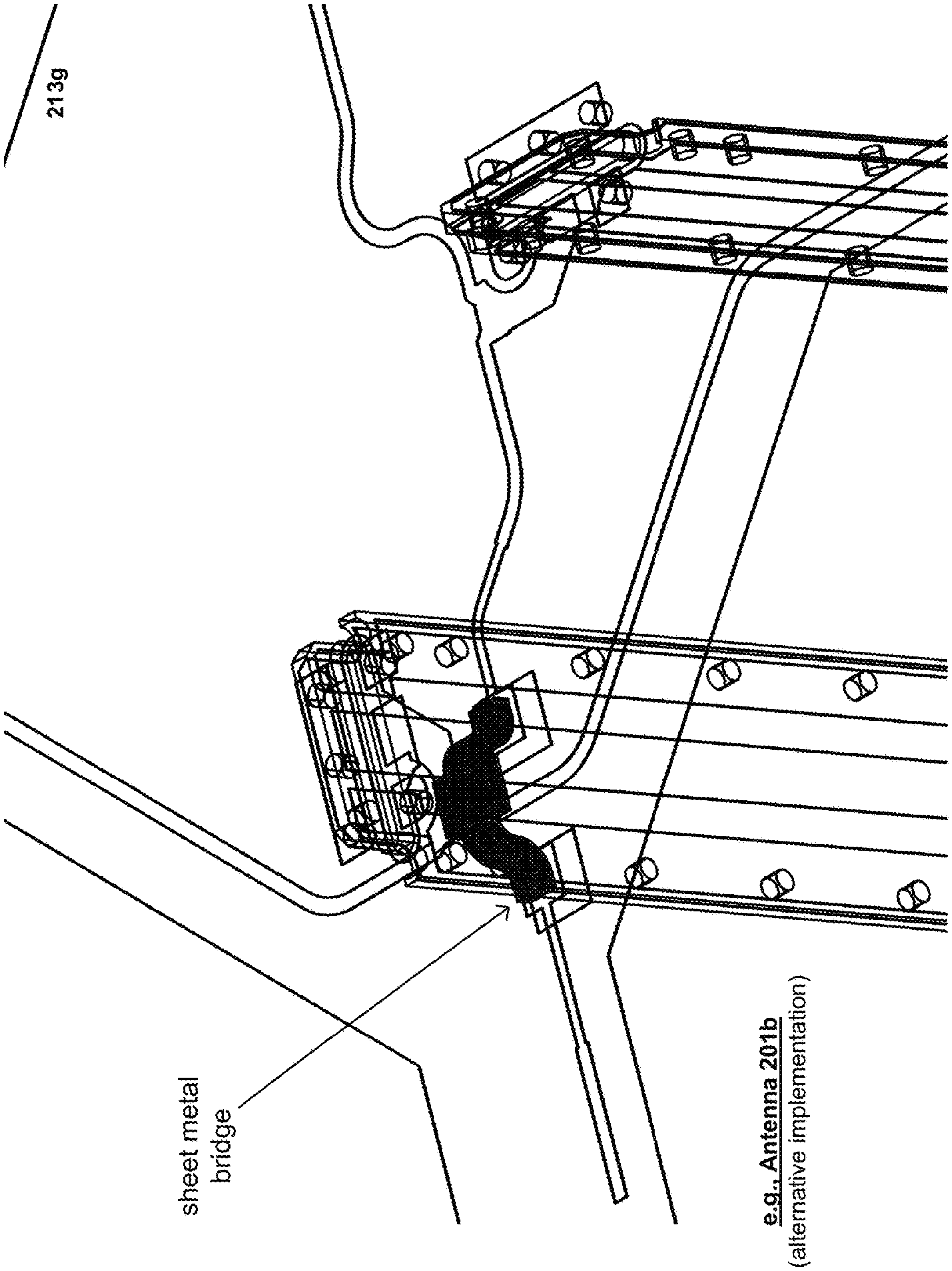
Figure 3Q:
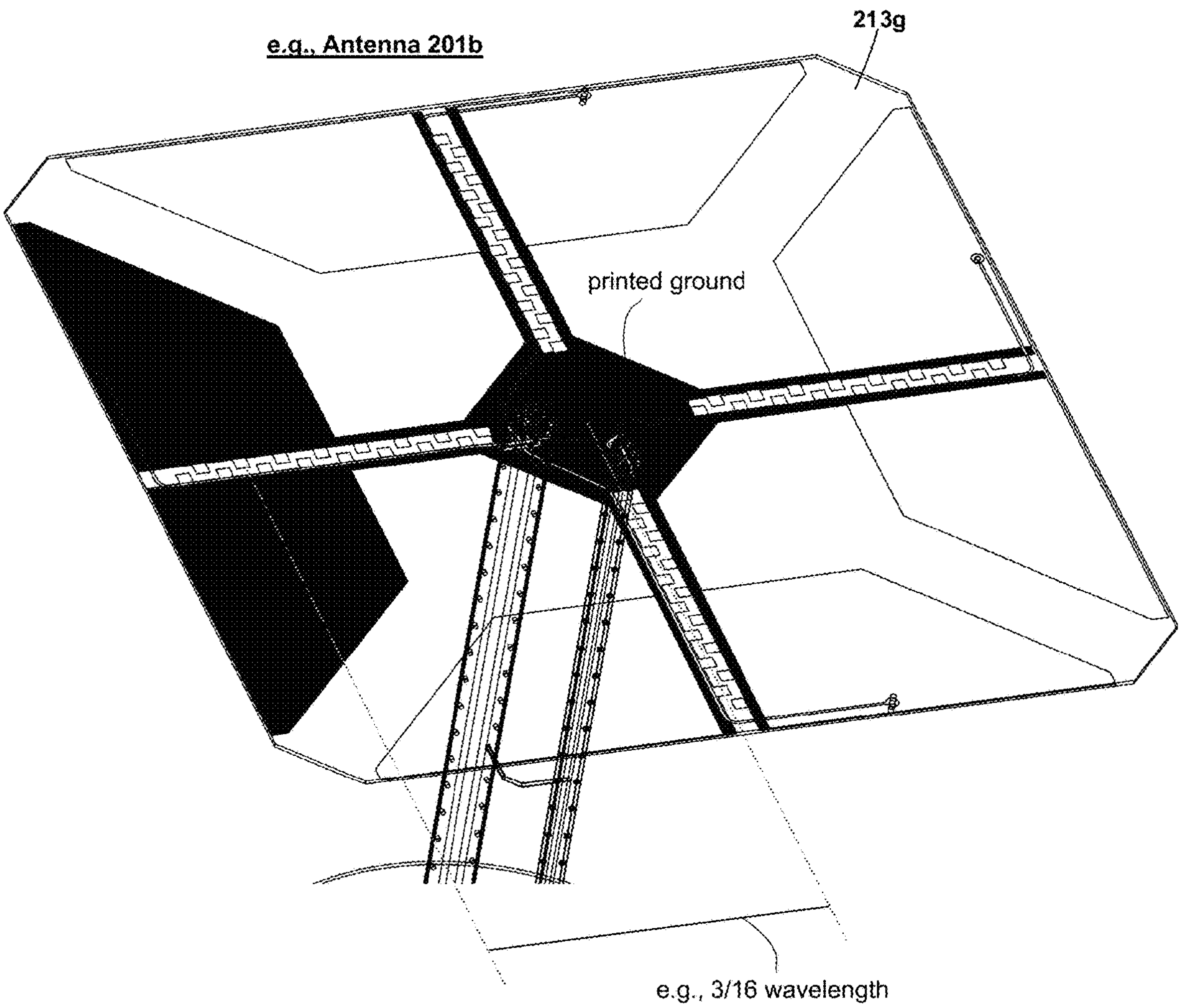
Figure 3R:
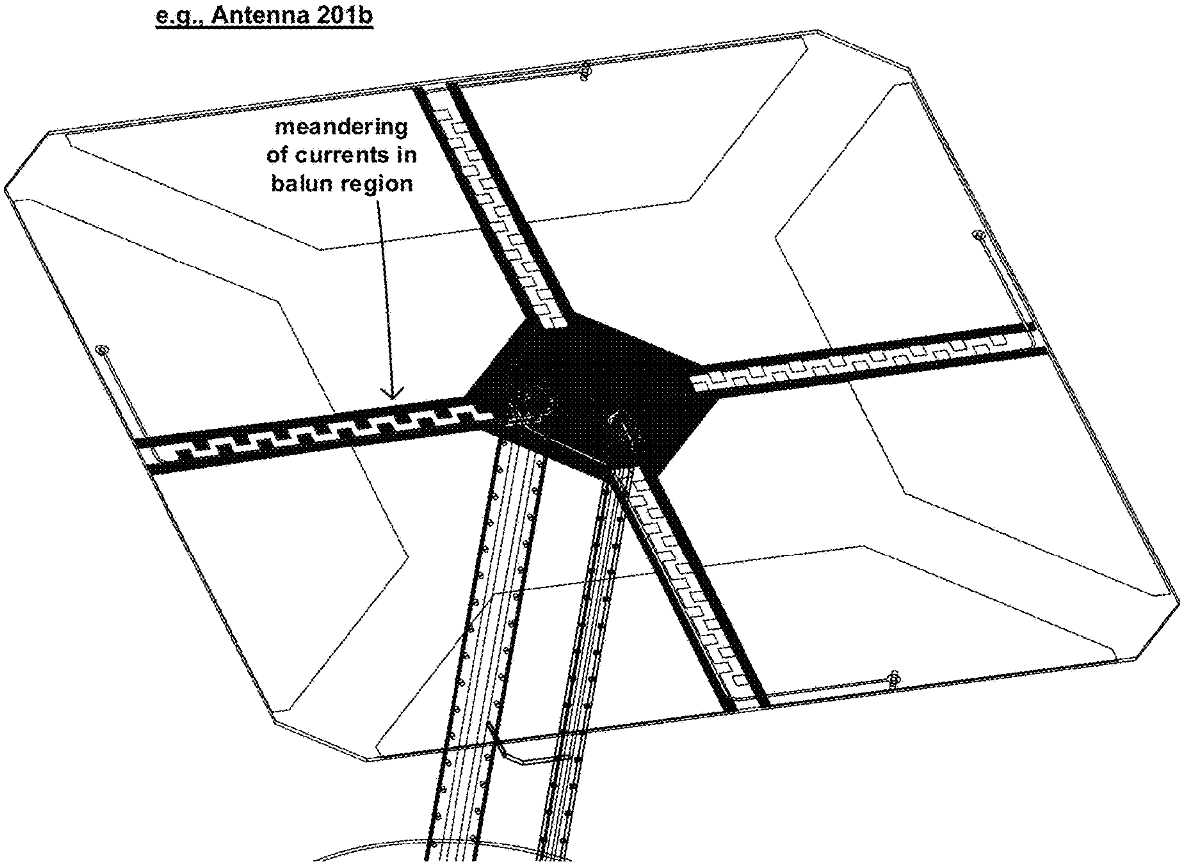

FIGS. 3A-3R are different views of various portions/implementations of the antenna 201*b* in accordance with various aspects described herein. While the antenna 201*b* is shown to include two arrays of four radiating elements, it is to be appreciated and understood that the antenna 201*b* may include any suitable number of arrays and radiating elements, such as, for instance, fewer or more radiating elements (e.g., two arrays each including eight radiating elements).

The relative positions between the various components of the antenna 201*b* may be chosen based on design/performance parameters. For instance, in exemplary embodiments, the radiating elements 213 (or dual-polarized dipole pairs) may be spaced apart from one another in each of the elevation and azimuth directions by (e.g., about) three-quarters (¾) of a wavelength (FIGS. 3A and 3B), which can economize the volume of the overall antenna as well as provide improved (or optimal) array performance. In one or more embodiments, the diameter of (e.g., each of) the cans 214*c* may be about (e.g., slightly less than) the aforementioned ¾ wavelength spacing such that each can 214*c* may be mechanically independent of its neighboring can 214*c* (FIG. 3C). In various embodiments, each radiating element 213 may be positioned (e.g., about) three-eighths (⅜) of a wavelength above a bottom common ground plane (e.g., ground plane 210*p*) (FIG. 3D). Such a height is greater than the typical quarter (¼) wavelength spacing, and may be influenced by the proximity of the conducting can 214*c* underneath each radiating element 213. In exemplary embodiments, the center-to-center spacing for each dipole pair 213 may be about ⅜ wavelength (FIG. 3E), which can create a "strong" electromagnetic mutual coupling bond between the dipole pairs for each polarization, thereby enabling the horizontal polarization within the same array and the vertical polarization for a neighboring array to have minimal to no mutual coupling (FIGS. 3E-3G). Keeping radiated RF energy from coupling to the other dipole pairs addresses mutual coupling issues that have been known to disturb the radiated cross-polarization performance (which can be critical for the antenna), the shape of the azimuth pattern, the return loss, and the isolation performance.

In various embodiments, in order to provide improved (or optimal) cross-polarization performance, the antenna 201*b* may be configured with a reflector 213*f* (FIG. 3H) for the arrays 213*u* and 213*v* of radiating elements 213. In one or more embodiments, the reflector 213*f* may have a non-planar profile, such as, for example, a C-shaped fold back profile, which can provide improved antenna performance and mechanical robustness, and prevent undue introduction of interference/PIM to the antenna itself. With the improved design, four independent same-band antenna sub-arrays within a single enclosure (213*r*) may exhibit low cross-polarization levels for all polarization positions for all four antenna ports. In certain embodiments, the antenna 201*b* may additionally, or alternatively, include one or more reflective component(s) located adjacent to the radiating elements (FIG. 3I) for improved cross-polarization performance.

In various embodiments, the cans 214*c* may be coupled (e.g., attached) to, or otherwise integrated into, the antenna 201*b* structure via one or more adhesive materials. In one or more embodiments, each can 214*c* may be coupled to the antenna 201*b* structure via very high bonding (VHB) tape 213*t* or the like, which can provide a virtual ground for the (e.g., electrically-connected) can 214*c* and yield suitable performance in relation to return loss, isolation, co-polarization pattern performance, and cross-polarization pattern performance (FIG. 3J).

As briefly discussed above, the antenna 201*b* may be configured with one or more polarization shifters. A polarization shifter is a passive radio frequency (RF) device that allows for rotation of a transmission line without degradation of a transmitted RF signal. In various embodiments, the device may be configured to feed, excite, or otherwise facilitate rotation of the radiating elements 213—i.e., changes in orientation of the dual-polarized dipole pairs—to/from various polarizations, such as a horizontal polarization, a vertical polarization, and any angle of "slant" polarization, which allows for interference/PIM mitigation (or avoidance) as described herein. In exemplary embodiments, each dipole pair may be excited by an output of a respective polarization shifter 213*s*. A portion of the polarization shifter 213*s* is shown in FIG. 3K.

Returning to FIG. 2F, the construction shown may include a bottom (or lower) substrate 206*b*, a top (or upper) substrate 208*r*, and a (e.g., thin) dielectric layer 207*t* disposed between the two substrates 206*b* and 208*r*. The top substrate 208*r* may be rotatable, and may include a transmission line 208*c* disposed thereunder—i.e., on an undersurface of the top substrate 208*r*. The transmission line 208*c* may be a microstrip or the like composed of conductive material, and may have one or more curved portions. Although not shown in FIG. 2F, the bottom substrate 206*b* may include a corresponding transmission line disposed on an upper surface of the bottom substrate 206*b*, and coupled to the transmission line 208*c* via the dielectric layer 207*t*. This corresponding transmission line may have the same (or a similar) shape and/or the same (or similar) dimensions as the line 208*c* of the top substrate 208*r*. The corresponding transmission line may be positioned relative to the transmission line 208*c* such that, when the top substrate 208*r* is in the rotational position shown, the transmission line 208*c* and the corresponding transmission line are aligned with (e.g., fully or partially overlapping) one another. In a case where the top substrate 208*r* is rotated in the XY plane, the transmission line 208*c* may rotate relative to the fixed corresponding transmission line thereunder. By virtue of the transmission line 208*c* and the corresponding transmission line being in close proximity to one another, these coupled lines may behave as if the two lines are a single "stretchable" line with minimal to no additional losses as compared to a single transmission line of the same length. In other words, most or all of the energy is transmitted through by/between the two transmission lines, with little to none of the energy being lost or reflected.

Figure 2G:
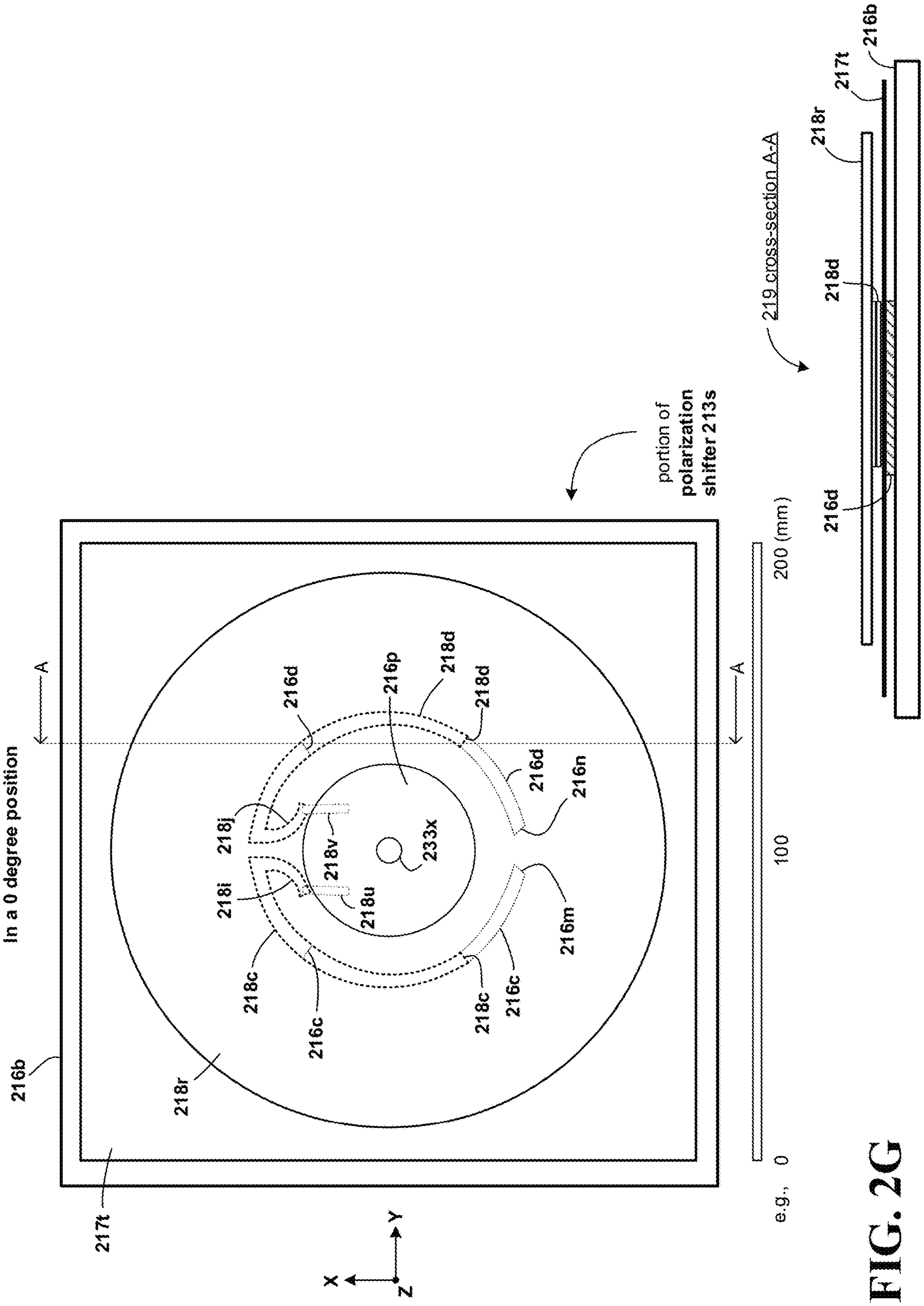

FIGS. 2G-2J are various views of an example, non-limiting embodiment of a portion of the polarization shifter 213*s* in accordance with various aspects described herein. This portion of the polarization shifter 213*s* may include components similar to those described above with respect to the polarization shifter portion of FIG. 2F. As shown in FIG. 2G, the polarization shifter 213*s* may include a bottom (or lower) substrate 216*b*, a top (or upper) substrate 218*r*, and a (e.g., thin) dielectric layer 217*t* disposed between the two substrates 216*b* and 218*r*. Reference number 219 shows a partial cross-sectional view of the portion of the polarization shifter 213*s* taken along line A-A. In exemplary embodiments, the bottom substrate 216*b* may correspond to the ground plane 210*b*—e.g., may be the ground plane 210*p* of FIG. 2D or may be a portion of the ground plane 210*p*.

In various embodiments, each of the substrates 216*b* and 218*r* may be a printed circuit board (PCB) or the like. In one or more embodiments, the dielectric layer 217*t* may be composed of polytetrafluoroethylene (PTFE) or the like (e.g., Teflon tape or film), and may function as a low friction insulator/buffer between the bottom substrate 216*b* and the top substrate 218*r*. Although the bottom substrate 216*b*, the top substrate 218*r*, and the dielectric layer 217*t* are each shown to have a specific shape and particular dimensions, each of these components can have any other shape or combination of shapes and can have any suitable dimensions depending on design/performance parameters.

In exemplary embodiments, the dielectric layer 217*t* may be coupled (e.g., adhesively fixed) to an undersurface of the top substrate 218*r*, and may have the same diameter as that of the top substrate 218*r* or a smaller diameter. In some alternate embodiments, the dielectric layer 217*t* may be coupled (e.g., adhesively fixed) to an upper surface of the bottom substrate 216*b*, and may have the same diameter as that of the top substrate 218*r* or a larger or a smaller diameter. In other alternate embodiments, there may be two dielectric layers 217*t*—one layer 217*t* coupled (e.g., adhesively fixed) to an undersurface of the top substrate 218*r* and another layer 217*t* coupled (e.g., adhesively fixed) to an upper surface of the bottom substrate 216*b*, which may further reduce friction between the two substrates.

The top substrate 218*r* may be rotatable, and may include transmission lines 218*c* and 218*d* disposed thereunder—i.e., on an undersurface of the top substrate 218*r*—that feed respective dipoles of a radiating element 213. Each of the transmission lines 218*c* and 218*d* may be a microstrip or the like composed of conductive material, and may have one or more curved portions. The bottom substrate 216*b* may include corresponding (e.g., input) transmission lines 216*c* and 216*d* disposed on an upper surface of the bottom substrate 216*b*, and respectively coupled to the transmission lines 218*c* and 218*d* via the dielectric layer 217*t*. In certain embodiments, the transmission lines 216*c* and 216*d* may have the same (or similar) shapes and/or the same (or similar) dimensions as the corresponding transmission lines 218*c* and 218*d* of the top substrate 218*r*. In exemplary embodiments, the transmission lines 216*c* and 216*d* may be curved like the transmission lines 218*c* and 218*d*, but may not include counterpart features, such as curved end portions 218*i* and 218*j* and tail portions 218*u* and 218*v*. Curved end portions 218*i* and 218*j* and tail portions 218*u* and 218*v* of the respective transmission lines 218*c* and 218*d* may be shaped and sized to minimize or eliminate energy loss. In various embodiments, tail portions 218*u* and 218*v* may be contiguous with the respective curved end portions 218*i* and 218*j*. In other embodiments, tail portions 218*u* and 218*v* may be extensions that couple to the respective curved end portions 218*i* and 218*j*.

While the partial cross-sectional view 219 of FIG. 2G shows the top and bottom substrates 218*r* and 216*b* and the dielectric layer 217*t* as being separated from one another based on the dimensions of the various transmission lines, in certain embodiments, some or all of the transmission lines may be at least partially embedded in a surface of the respective substrate. In these embodiments, the top and bottom substrates 218*r* and 216*b* may be in contact with one another, separated only by the dielectric layer 217*t*.

In various embodiments, end 216*m* of the transmission line 216*c* may be an input/output end coupled to a feed network (not shown), and end 216*n* of the transmission line 216*d* may be an input/output end coupled to the feed network. In one or more embodiments, the transmission lines 216*c* and 216*d* may additionally be coupled to the monitoring/detection unit 221*d*. Although not shown, in some embodiments, one or more of the transmission lines 216*c* and 216*d* may further extend (or may couple with one or more other lines that extend) beyond the portion of the bottom substrate 216*b* shown.

In certain embodiments, the coupled lines—i.e., the transmission lines 216*c* and 218*c* and the transmission lines 216*d* and the 218*d*—may be designed and constructed such that impedance is kept constant regardless of the position of the rotated transmission line or regardless of a length of overlap of the rotated transmission line and the fixed transmission line.

To enable continued operation of a corresponding element substrate 213*g* and radiating element 213 (e.g., above the polarization shifter 213*s*), whether during rotation thereof or otherwise, the polarization shifter 213*s* may further include a ground plane 216*p*. In exemplary embodiments, the ground plane 216*p* may be a disk-shaped rotatable structure that is disposed above the bottom substrate 216*b* and below the top substrate 218*r*, and that may rotate along with the top substrate 218*r* during polarization shifting. In various embodiments, the ground plane 216*p* may be disposed in-line with or beneath the transmission lines 218*c* and 218*d*, and may be electrically connected to a radiating element feed point above. In one or more embodiments, the ground plane 216*p* may have a diameter that is smaller than a diameter of the top substrate 218*r*. In alternate embodiments, the ground plane 216*p* may have a diameter that is about equal to (or larger than) the diameter of the top substrate 218*r*. In certain embodiments, the ground plane 216*p* may have a shape other than a disk shape.

In one or more embodiments, the ground plane 216*p* may be capacitively coupled to the (e.g., main) ground plane 210*p* (e.g., FIG. 2D) and/or electrically coupled thereto via one or more plated through-holes or the like. Coupling the ground plane 216*p* with the ground plane 210*p* may provide improved antenna performance.

Figure 2H:
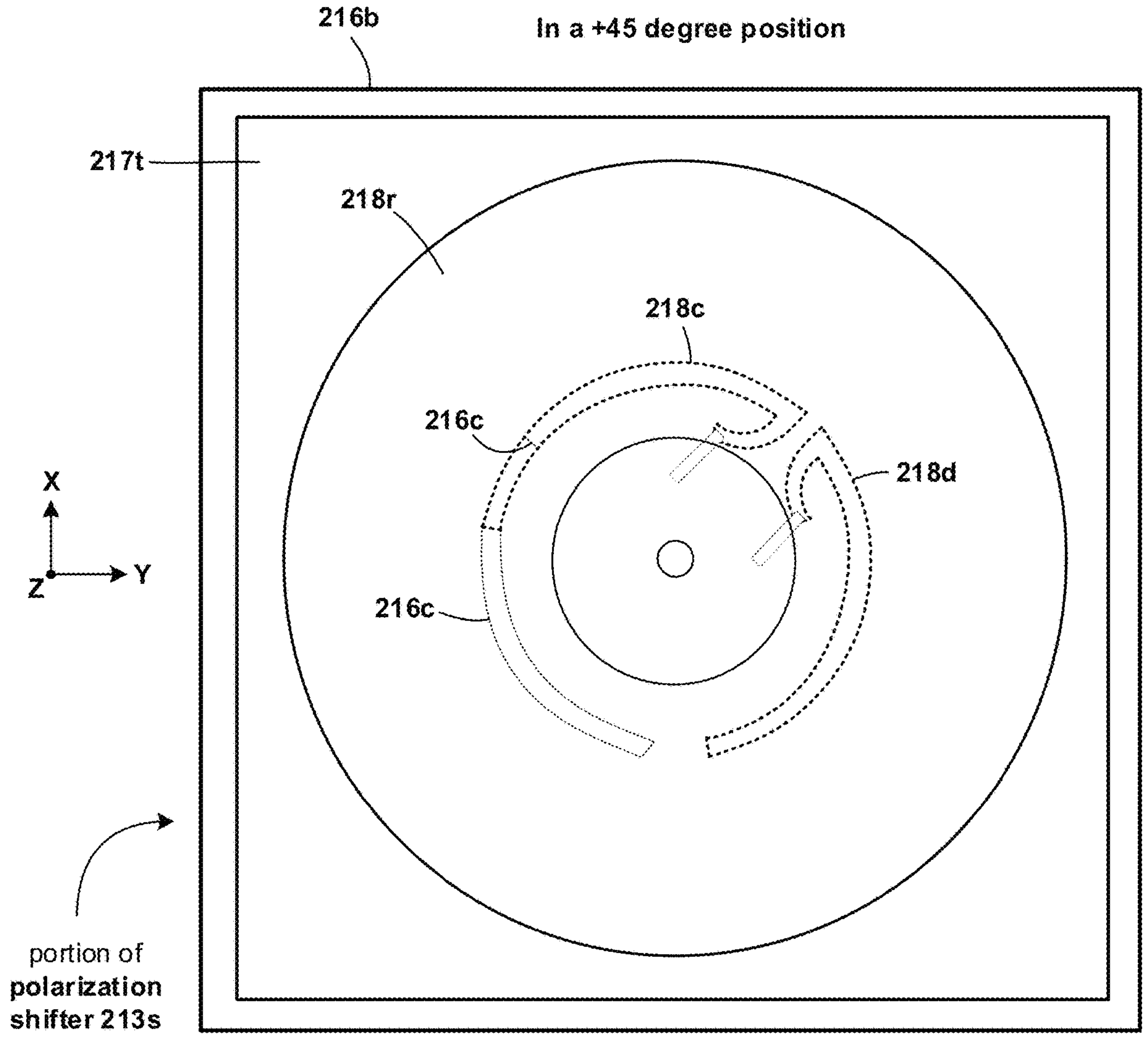
Figure 2I:
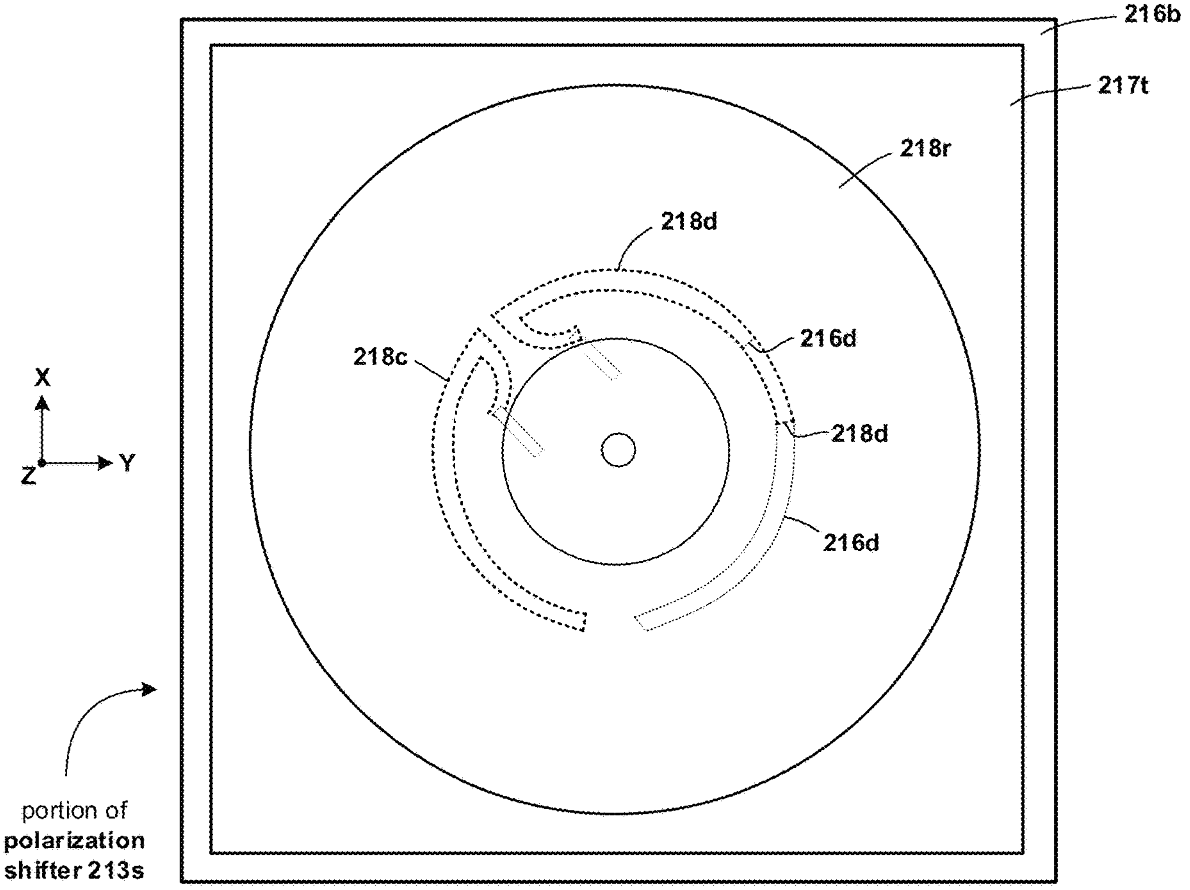

In a case where a single line is used to feed a single polarized element, the range of rotation of the element may be about 180 degrees. Here, however, where dual-polarized radiating elements are employed, and two (e.g., curved) transmission lines 218*c* and 218*d* are configured in a mirror/symmetric manner, rotational range of the radiating element may be about 90 degrees (as shown in FIGS. 2G-2I). When the polarization shifter 213*s* is in a 0 degree position shown in FIG. 2G, the transmission line 216*c* may partially overlap the transmission line 218*c*, and the transmission line 216*d* may partially overlap the transmission line 218*d*. As compared to other rotational positions, the 0 degree position may result in minimum overlap between coupled lines.

In a case where the top substrate 218*r* is rotated in the XY plane to a +45 degree position (FIG. 2H), the transmission line 218*c* may rotate relative to the transmission line 216*c* thereunder such that there is minimum overlap between these coupled lines, and the transmission line 218*d* may rotate relative to the transmission line 216*d* thereunder such that there is maximum (e.g., full) overlap between these coupled lines. In a different case where the top substrate 218*r* is rotated in the XY plane to a −45 degree position (FIG. 2I), the transmission line 218*c* may rotate relative to the transmission line 216*c* thereunder such that there is maximum (e.g., full) overlap between these coupled lines, and the transmission line 218*d* may rotate relative to the transmission line 216*d* thereunder such that there is minimum overlap between these coupled lines. By virtue of the coupled lines in each of the two sets of coupled lines being in close proximity to one another, the coupled lines may behave as if the two lines are a single line with minimal to no additional losses as compared to a single transmission line of the same length. In this way, the two polarizations of a radiating element 213 may be rotated together by the same amount in the clockwise or counterclockwise directions in the XY plane.

In certain embodiments, the two polarizations may be separated by one or more ground strips (e.g., via plated through-holes in between the transmission lines 218*c* and

Figure 2J:
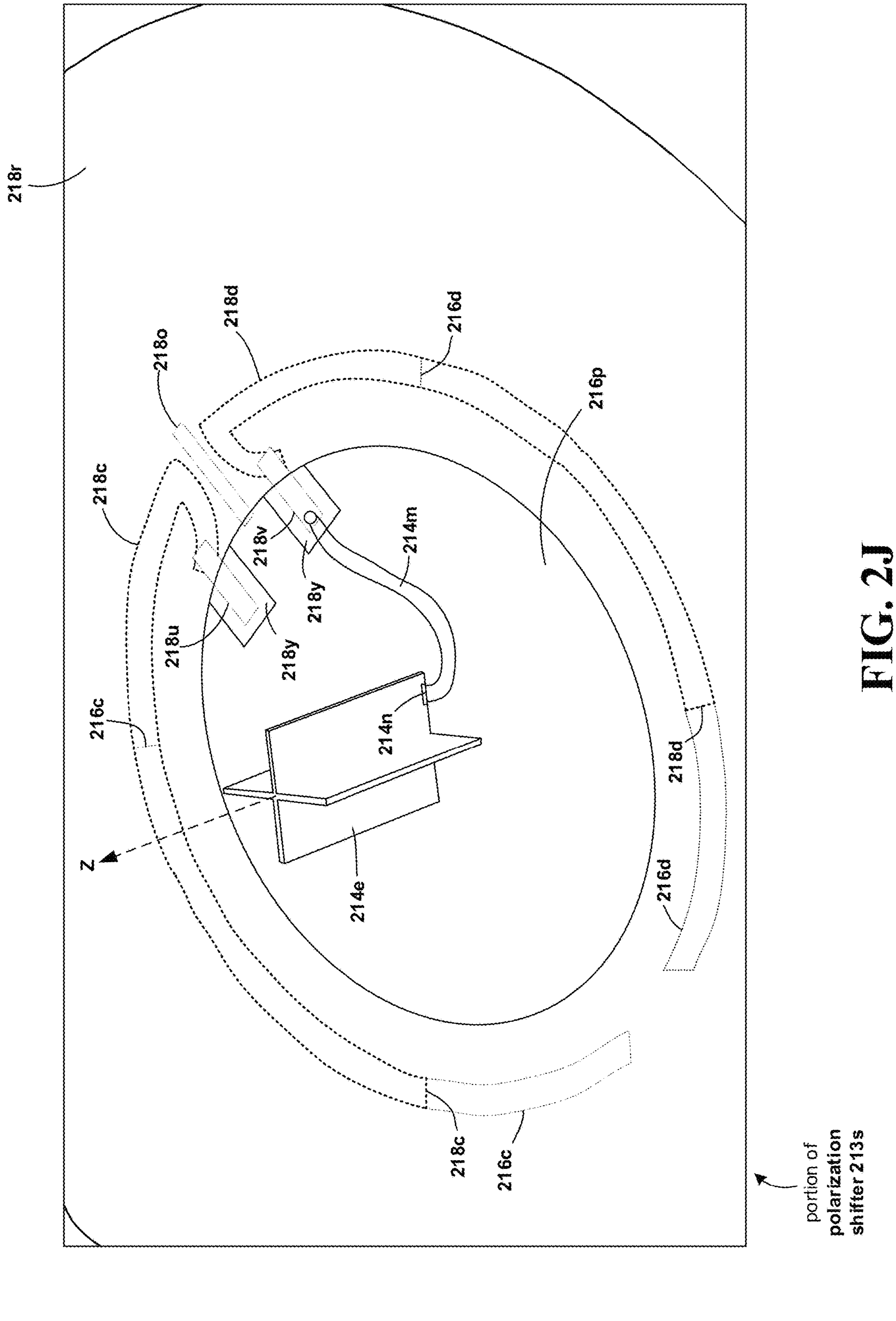

218*d*) in order to improve isolation between the polarizations. For instance, as shown in FIG. 2J, the polarization shifter 213*s* may, in some embodiments, include one or more ground strips 218*o* disposed between the curved end portions of the transmission lines 218*c* and 218*d*, which can provide isolation between the two transmission lines. In various embodiments, one or more pads 218*y* may be disposed on the ground plane 216*p* for supporting the tail portions 218*u* and 218*v*.

It is to be appreciated and understood that the dimensions of the transmission lines 216*c*, 216*d*, 218*c*, 218*d* may be defined to yield any desired extent of overlap between coupled lines when the polarization shifter 213*s* is operated. Thus, in certain embodiments, rotation of the top substrate 218*r* to the +45 degree position may or may not result in maximum (or full) overlap between the transmission line 218*d* and the transmission line 216*d*, and rotation of the top substrate 218*r* to the −45 degree position may or may not result in maximum (or full) overlap between the transmission line 218*c* and the transmission line 216*c*.

In exemplary embodiments, the polarization shifter 213*s* may include one or more (e.g., vertical) feed boards 214*e* (FIG. 2J) that provide mechanical support, and enable feeding, for a corresponding element substrate 213*g* and radiating element 213. As shown in FIG. 2J, the transmission line 218*d* may be coupled to a foot portion of the feed board 214*e* via a connection line 214*m* and a junction 214*n*. In exemplary embodiments, the junction 214*n* may be a 90 degree PCB junction. In various embodiments, the top substrate 218*r* may include a plated through-hole through which a portion of the transmission line 218*d* (such as, for example, the tail end 218*v*) may be routed to electrically connect to the connection line 214*m*. This portion of the transmission line 218*d* may be overlaid over the ground plane 216*p*. Although FIG. 2J only shows a connection line for the transmission line 218*d*, polarization shifter 213*s* may similarly include a connection line for the transmission line 218*c*, coupled via a similar junction on the same or a different portion of the vertical feed board 214*e*. With the polarization shifter 213*s* constructed in the above-described manner in which no (e.g., dangling, hanging, or suspended) feeding cables are involved or needed, polarization shifting of a radiating element 213 can be freely effected without concern or worry about having to accommodate such feeding cables.

In exemplary embodiments, the vertical feed boards (e.g., 214*e*) may transform the characteristic impedance of a 50 ohm output of the polarization shifter 213*s* to 45 ohms at the input to the element substrate 213*g* (FIG. 3L). In various embodiments, each dipole of a radiating element 213 may be fed with a 90 ohm transmission line 214*j* (FIG. 3M). In one or more embodiments, a reactive matching circuit for each dipole may be a short section 214*s* of the 90 ohm transmission line 214*j* that is grounded at, e.g., less than a tenth of a wavelength from the feed point of each dipole (FIG. 3N). In some embodiments, each dipole of the same polarization may be phase matched in feed length, and dipole pairs may not be phase matched to one another. In embodiments where there are plated through-holes in the element substrate 213*g*, (e.g., two) feed lines 214*i* may be crisscrossed (FIG. 3O) to reduce part count. Additionally, or alternatively, a sheet metal bridge (FIG. 3P) may be employed for crisscrossing the two independent feed lines. In contrast to the typical dipole-to-ground plane distance of ¼ wavelength, in some embodiments, the element substrate 213*g* may be configured such that the distance between the tops or upper surfaces of the dipoles and the printed ground may be less than ¼ wavelength, such as 3/16 wavelength. In these embodiments, the currents in the balun region may be meandered to assist with impedance matching of each dipole pair (FIGS. 3Q and 3R).

Figure 3S:
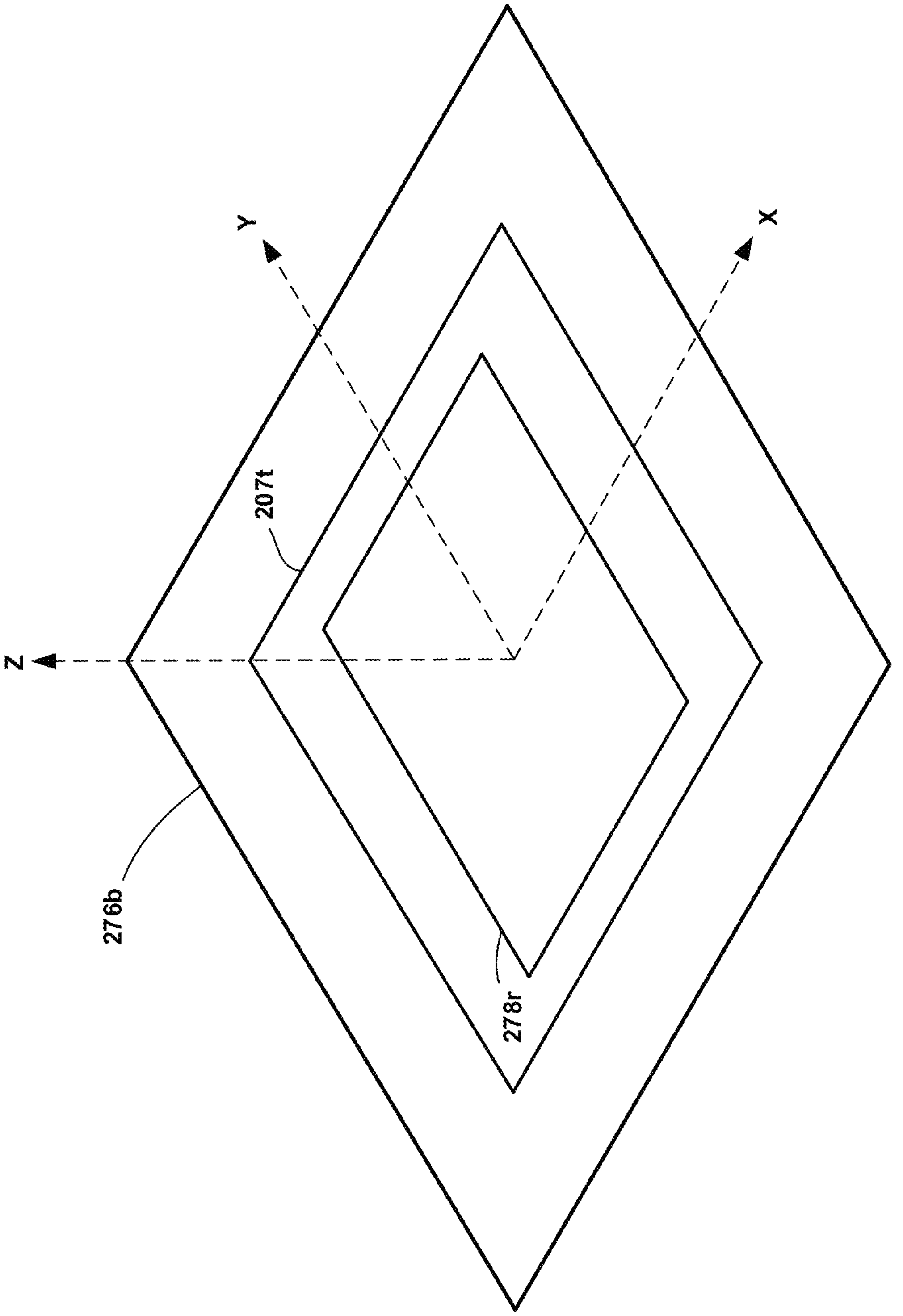
Figure 3T:
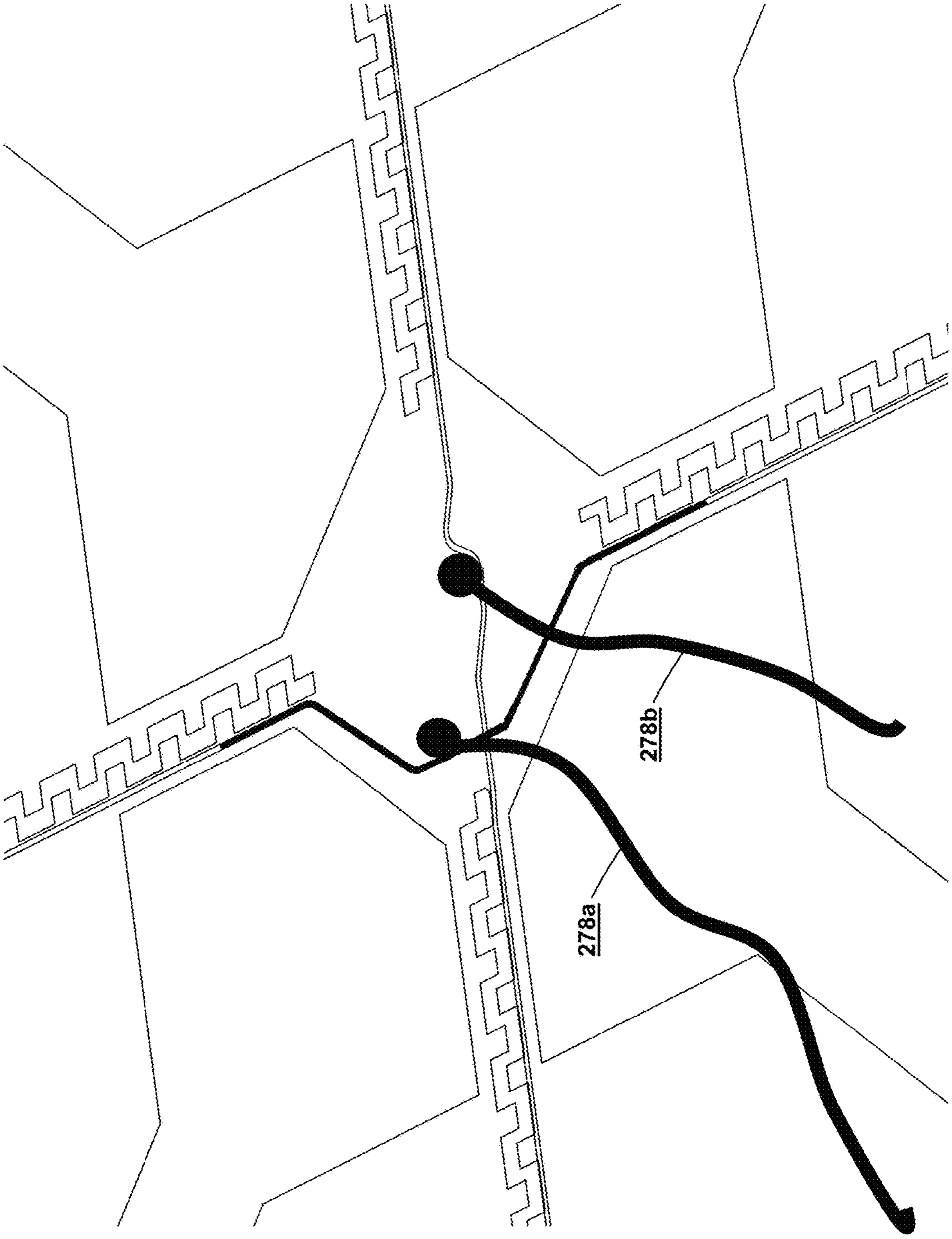
Figure 3U:
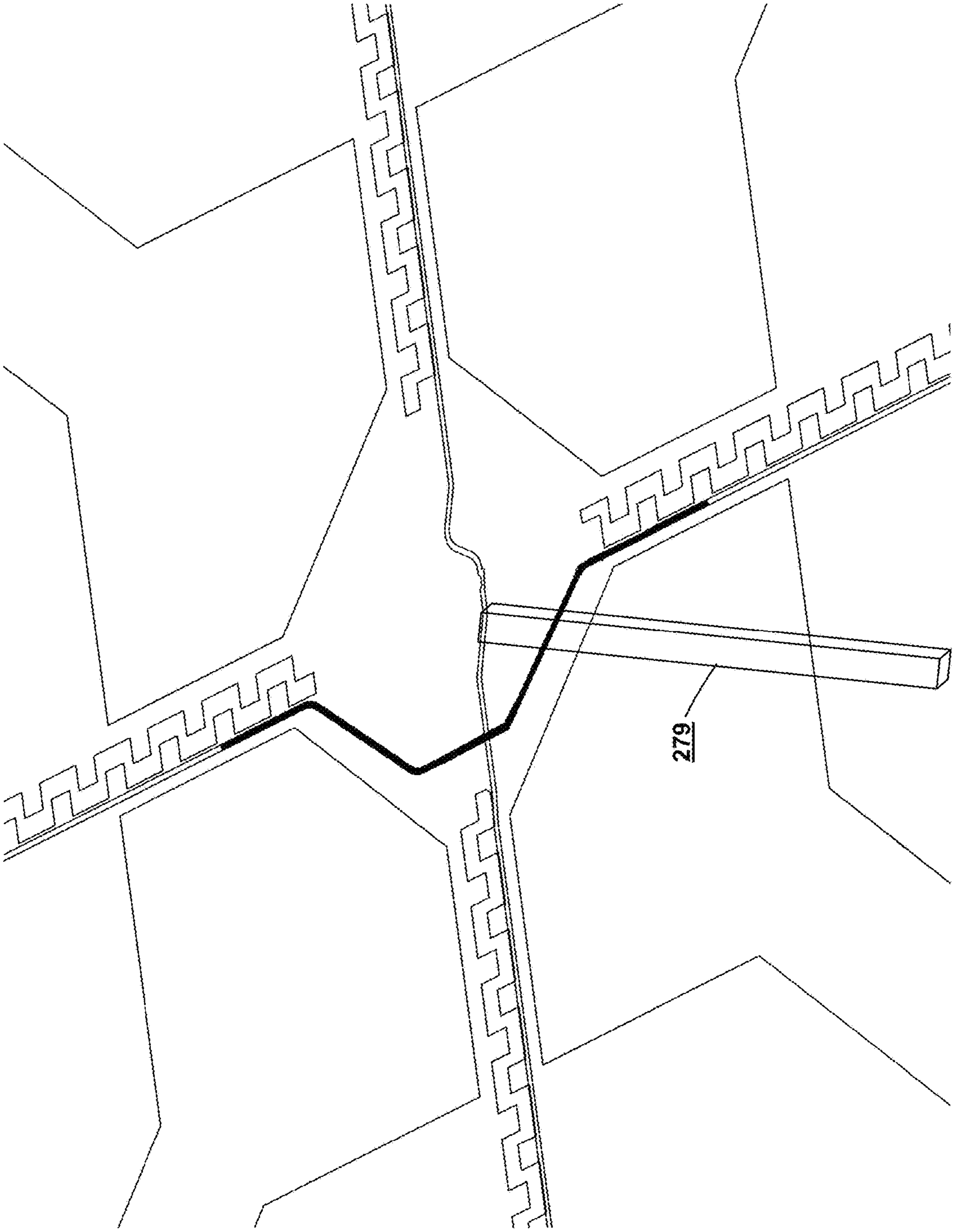

It is to be appreciated and understood that, while a polarization shifter is described above with respect to one or more of FIGS. 2F-2J and 3A-3R as having particular constructions, other constructions are possible. FIGS. 3S-3U show various alternate polarization shifters having different constructions, in accordance with various aspects described herein. In some implementations, and as shown in FIG. 3S, a polarization shifter may include a bottom (or lower) air dielectric metal strip 276*b*, a top (or upper) air dielectric metal strip 278*r*, and a (e.g., thin) dielectric layer 207*t* disposed between the two air dielectric metal strips 276*b* and 278*r*. The construction shown in FIG. 3S may be similar to that show in FIG. 2F—i.e., where the top air dielectric metal strip 278*r* may be curved and rotatable, where the bottom air dielectric metal strip 276*b* may be curved and fixed, and where the two air dielectric metal strips 276*b* and 278*r* may be coupled to one another via the dielectric layer 207*t*. In a case where the top air dielectric metal strip 278*r* is rotated in the XY plane, it may rotate relative to the fixed bottom air dielectric metal strip 276*b* thereunder. By virtue of the top air dielectric metal strip 278*r* and the corresponding bottom air dielectric metal strip 276*b* being in close proximity to one another, these coupled strips may behave as if the two strips are a single "stretchable" strip or line with minimal to no additional losses as compared to a single transmission line of the same length. In other words, most or all of the energy is transmitted through by/between the two strips, with little to none of the energy being lost or reflected. Additionally, employing air dielectric metal strips can enable higher power handling and lower insertion loss.

In some implementations, and as shown in FIG. 3T, a set of two flexible feed cables (e.g., RF coaxial cables) 278*a*, 278*b*—one cable for each element polarization—may be employed in lieu of rotating/fixed curved transmission lines. For instance, one of the feeding cables may be used in place of the transmission lines 218*c* and 216*c*, and the other feeding cable may be used in place of the transmission lines 218*d* and 216*d*. In certain embodiments, each of the flexible feed cables 278*a*, 278*b* may be coupled (e.g., soldered) on one end thereof to a feed network, PCB, or air strip (not shown), and may be coupled (e.g., soldered) on the other end thereof to the rotatable dual-polarized radiating element (FIG. 3T). In some embodiments, the flexible feed cables 278*a*, 278*b* may have added length, forming a small loop, which may provide a stress relief for maintaining suitable intermodulation performance while still enabling a 90-degree range of rotation.

In some implementations, and as shown in FIG. 3U, one or more rotary joints (e.g., shown as block 279) may be employed in lieu of rotating/fixed curved transmission lines, for facilitating rotation of the dual-polarized radiating element. A rotary joint configured to carry two RF signals may be utilized for feeding the dual-polarized radiating element, or two rotary joints, each configured to carry a single RF signal, may be utilized for respective feeding to the two sub-elements.

Figure 4A:
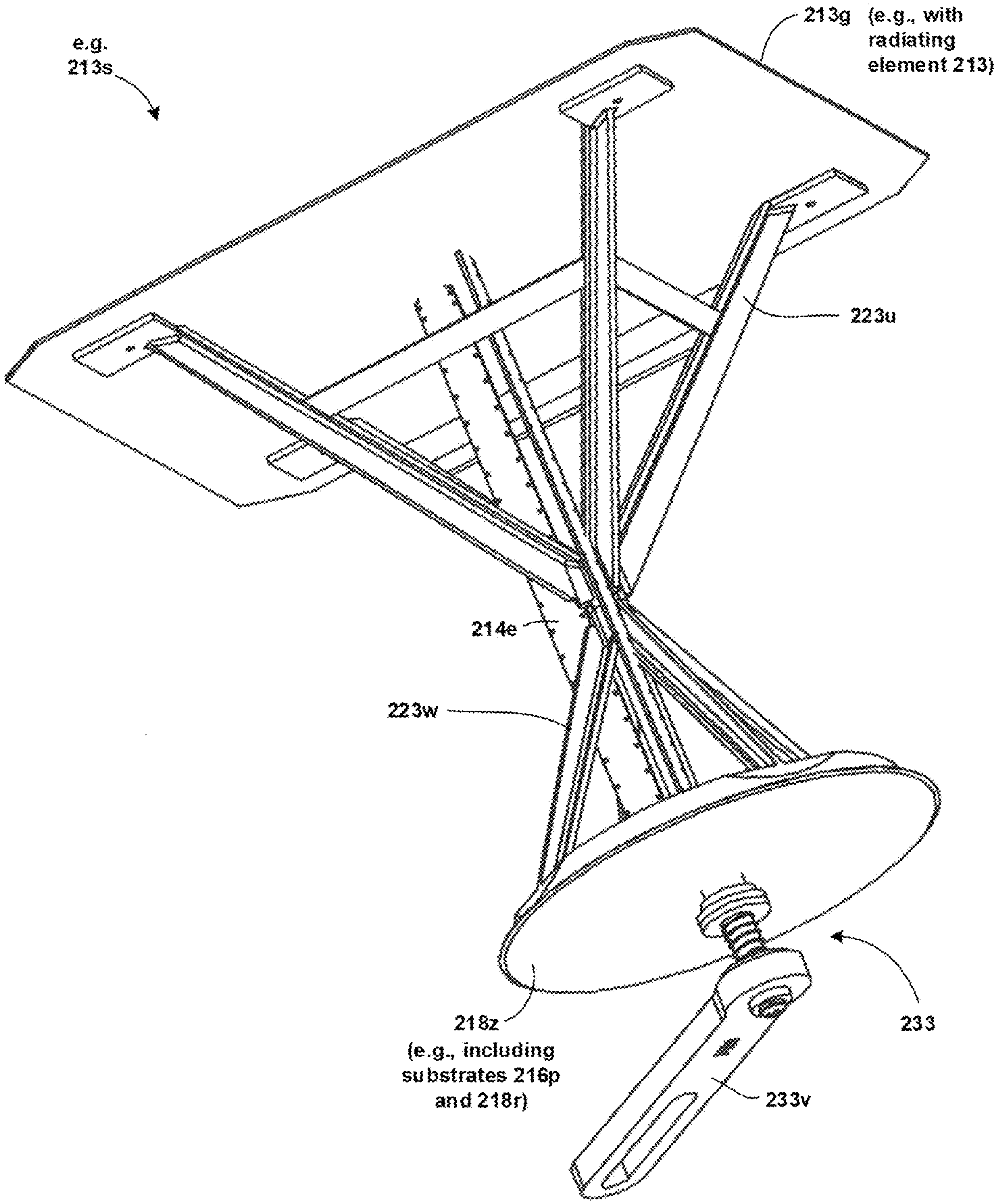
FIGS. 4A-4D show various views of a polarization shifter in accordance with various aspects described herein.
Figure 4B:
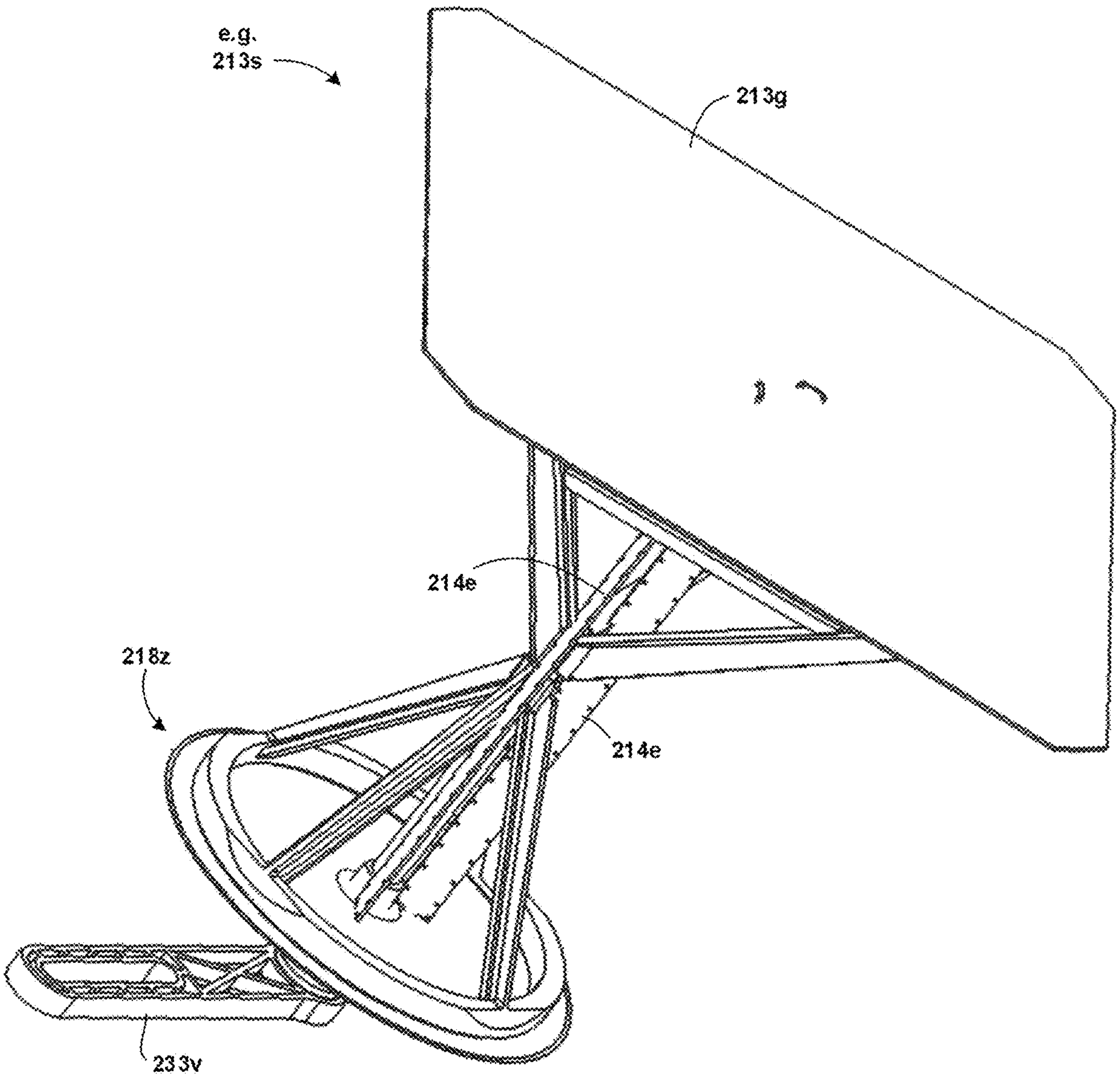
Figure 4C:
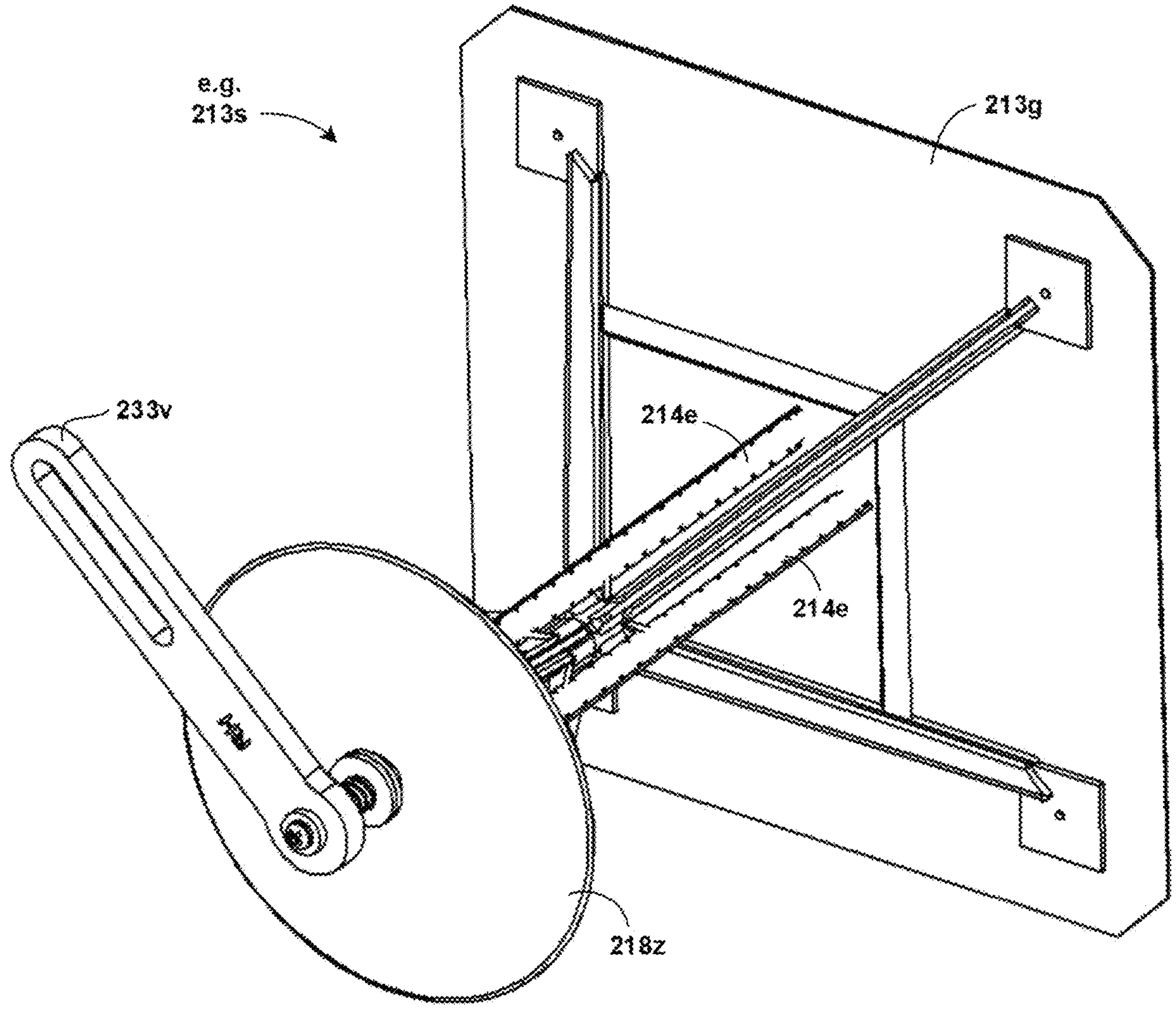
Figure 4D:
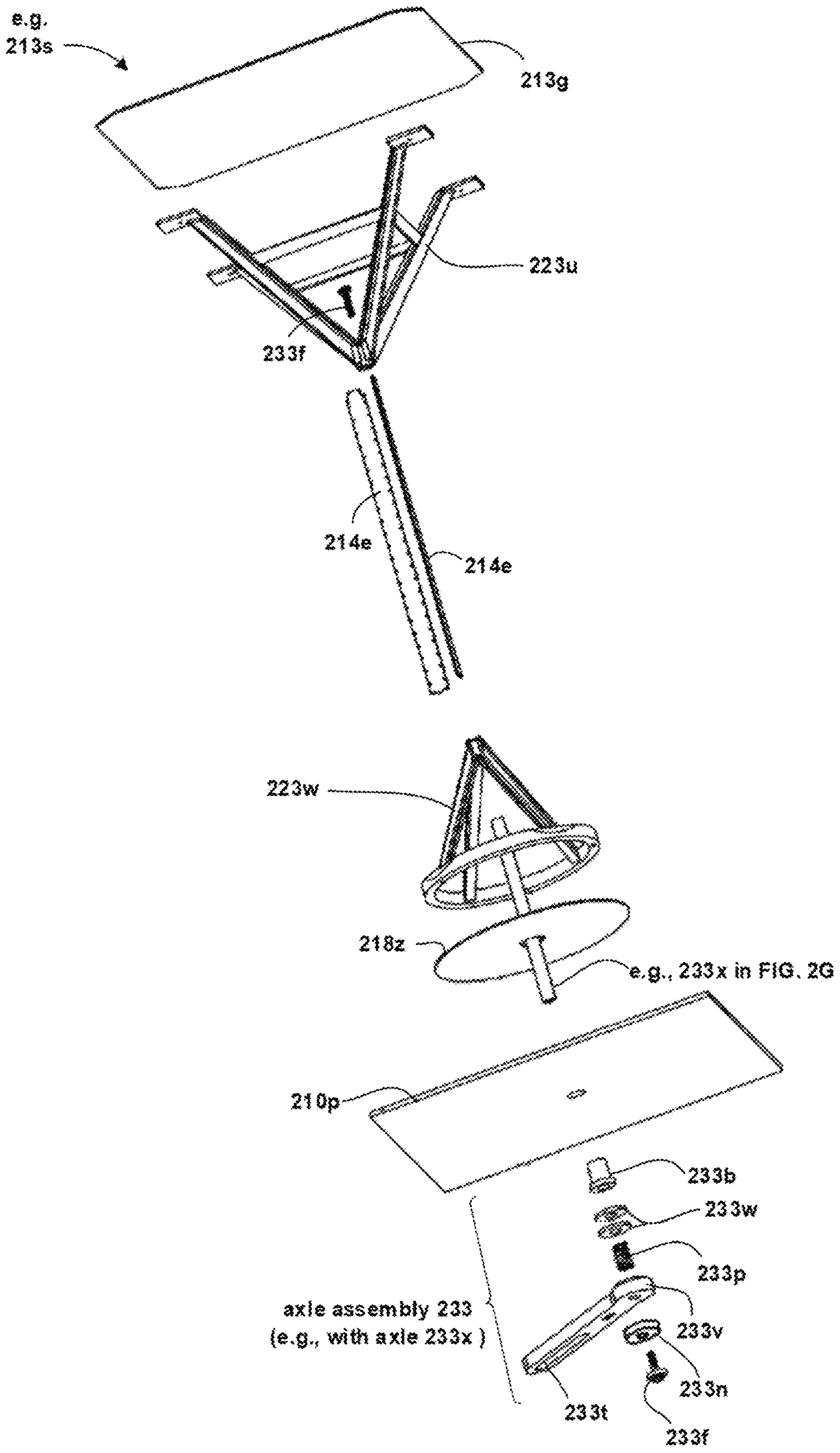
Figure 4E:
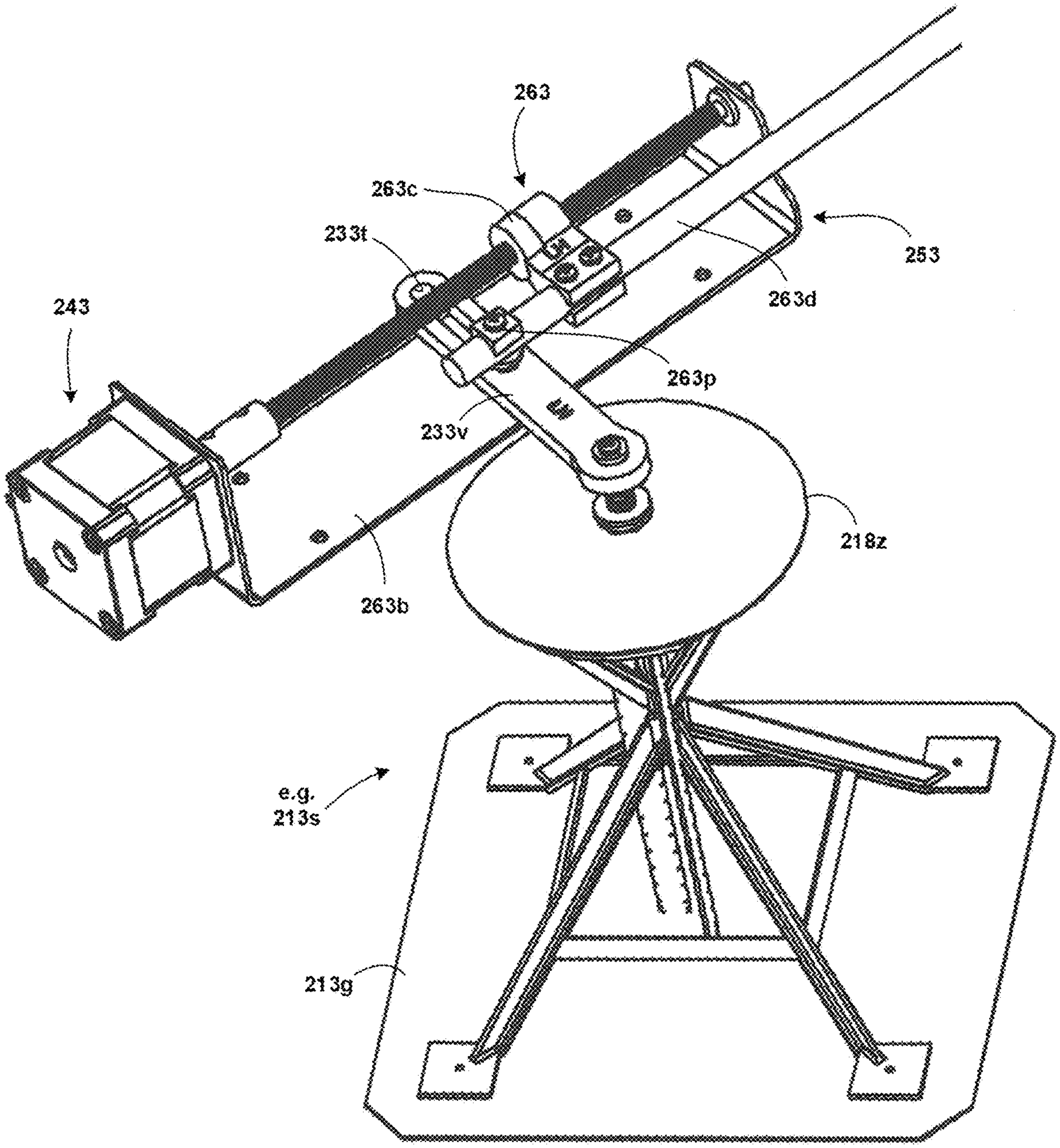
FIG. 4E is a perspective view of the polarization shifter of FIGS. 4A-4D (without a ground plane) coupled to, or integrated with, a motor and a drive assembly in accordance with various aspects described herein.
Figure 4F:
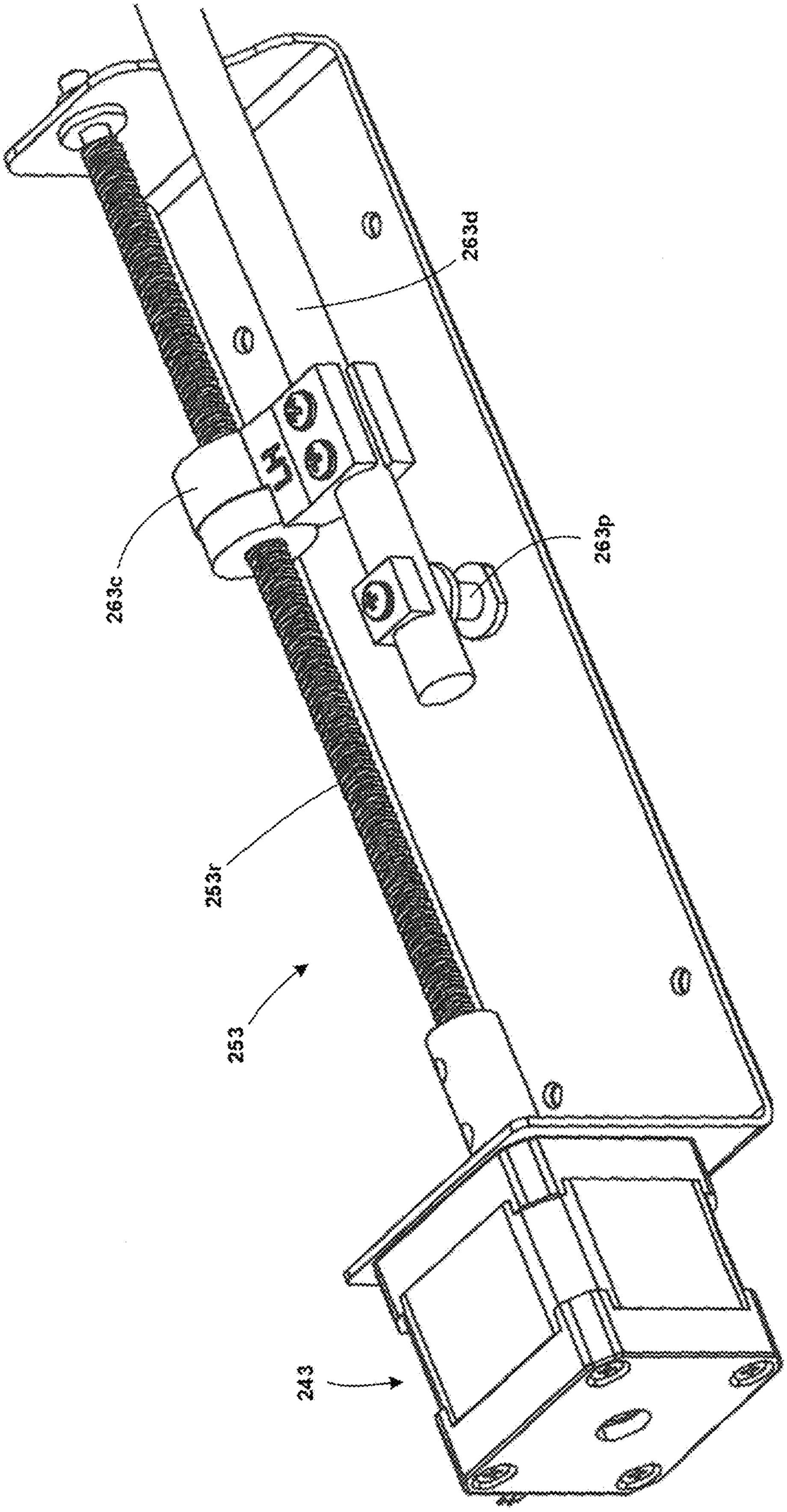
FIG. 4F is a perspective view of the motor of FIG. 4E in accordance with various aspects described herein.

FIGS. 4A-4D show various views of a polarization shifter (or a polarization selectable antenna assembly) in accordance with various aspects described herein. In exemplary embodiments, the polarization shifter may be similar to, the same as, or otherwise correspond to the polarization shifter 213*s* described above. As depicted, the polarization shifter 213*s* may include, or may be integrated with, an axle (or axle drive) assembly 233, a motor 243, and a (e.g., linear) drive assembly 253, which enable rotary forces to be applied to the element substrate 213*g* and the radiating element 213 thereon to effect desired polarization shifting. The exploded view in FIG. 4D illustrates the various components of the axle assembly 233 and depicts ground plane 210*p*. FIG. 4E is a perspective view of the polarization shifter 213*s* (without the ground plane) coupled to, or integrated with, the motor 243 and the drive assembly 253 in accordance with various aspects described herein. FIG. 4F is a perspective view of the motor 243 in accordance with various aspects described herein. In exemplary embodiments, the drive assembly 253 and/or the motor 243 may be included in, or otherwise, coupled to a control unit, such as the control unit 201*c* described above with respect to FIG. 2C and/or the control unit 221*c* described in more detail below.

As described above, in exemplary embodiments, each radiating element 213 may reside on a respective element substrate 213*g* (e.g., as copper features on a PCB material). In various embodiments, each element substrate 213*g* may be mounted on an antenna support structure—e.g., including an upper support structure 223*u* and a lower support structure 223*w*—over the fixed ground plane 210*p*. Each of the upper and lower support structures 223*u*, 223*w* may be composed of any suitable material, such as a dielectric material and/or a plastic material, and may have minimal mass/weight. While the antenna support structure is shown to include upper and lower portions 223*u*, 223*w*, the antenna support structure may include more portions or may be a single structure.

In one or more embodiments, the antenna support structure 223*u*, 223*w* may be configured to rigidly hold the element substrate 213*g* in a fixed position, or at a fixed distance, above the ground plane 210*p*. As a dual-polarized radiating element, the polarization of the radiating element 213 (or polarization angle resulting from the dominate polarization orientations of the radiation compared to a common reference plane) may change in response to physical/mechanical rotation thereof above the ground plane 210*p*.

In some embodiments, the upper support structure 223*u* may be coupled (e.g., affixed) to an underside of the element substrate 213*g* such that the element substrate 213*g* (and thus the radiating element 213 thereon) rotates when the upper support structure 223*u* is rotated. In various embodiments, the upper support structure 223*u* may be coupled with (e.g., rigidly affixed to) the lower support structure 223*w* such that the upper support structure 223*u* rotates when the lower support structure 223*w* is rotated. In one or more embodiments, the lower antenna support 223*w* may have a ring ridge feature that contacts (or affixes to) a rotatable substrate coupler 218*z*, which may include the (upper) substrate 218*r* and the ground plane 216*p* described above with respect to one or more of FIGS. 2G-2J. The ground plane 216*p* may be coupled (e.g., physically, capacitively, or electrically) to the ground plane 210*p*. In various embodiments, the substrate 218*r* may be coupled (e.g., affixed) to the lower support structure 223*w* such that the substrate 218*r* rotates along with the lower support structure 223*w*. In one or more embodiments, the upper and/or lower support structures 223*u*, 223*w* may be coupled with (e.g., rigidly affixed to) the axle assembly 233 such that the upper and/or lower support structures 223*u*, 223*w* rotate when the axle assembly 233 is rotated.

Figure 4G:
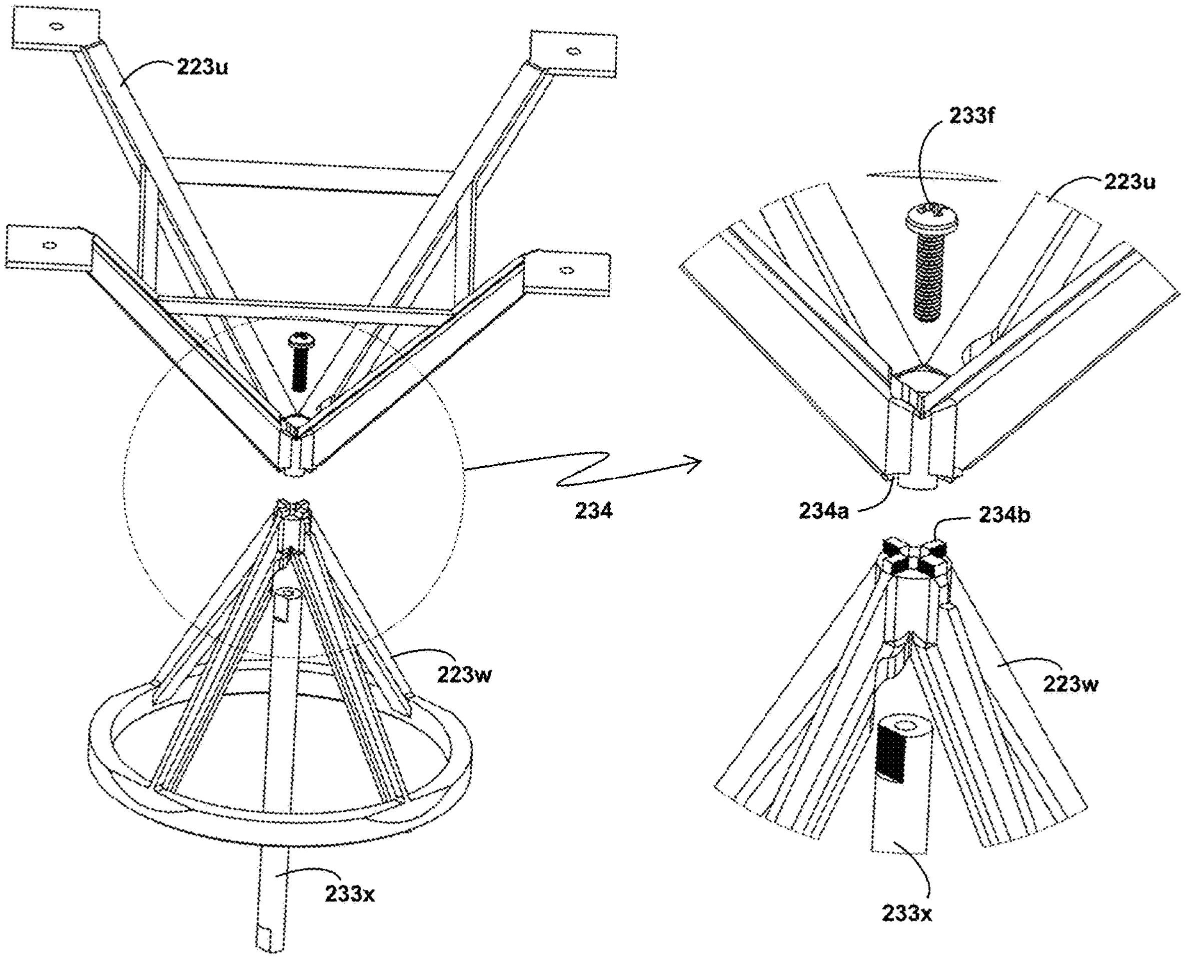
FIG. 4G is a view of a portion of the polarization shifter of FIGS. 4A-4D in accordance with various aspects described herein.

As depicted in FIG. 4D, the axle assembly 233 may include an axle 233*x* (which may pass through the substrate coupler 218*z*), a compression spring 233*p*, a slotted lever 233*v*, a bushing 233*b*, washers 233*w*, a nut 233*n*, and fasteners 233*f*. It is to be appreciated and understood that the axle assembly 233 may alternatively include some, but not all, of these components, may include more or fewer of one or more of these components, or may include one or more other components, so long as the overall axle assembly 233 is capable of providing rotational force to the antenna support structure. As shown in FIG. 4D, the axle 233*x* may be a rigid rod, and may be tapped for threaded fasteners 233*f* at each end of the axle. One end of the axle 233*x* may pass through a portion of the lower support structure 223*w*, and the other end of the axle 233*x* may pass through the ground plane 210*p*. As depicted by reference number 234 of FIG. 4G (showing a magnified view of portions of the upper and lower support structures 223*u*, 223*w*), the upper and lower support structures 223*u*, 223*w* may include complementary keying features 234*a* and 234*b* such that, when the upper and lower support structures 223*u*, 223*w* are mated to one another via the keying features 234*a* and 234*b*, rotation of the lower support structure 223*w* will result in rotation of the upper support structure 223*u*. One of the fasteners 233*f* may secure the axle 233*x*, the lower support structure 223*w*, and the upper support structure 223*u* to one another. Another one of the fasteners 233*f* may secure (or captivate) the bushing 233*b*, the compression spring 233*p*, the washers 233*w*, and the slotted lever 233*v* to the axle 233*x* (on an undersurface of the ground plane 210*p*). In various embodiments, the axle assembly 233 may be constructed (or proportioned) such that, when the fasteners are tightened, the compression spring 233*p* is placed under load and pulls the antenna support structure (e.g., at a sufficient force) toward or against the substrate coupler. The slotted lever 233*v* and the axle 233*x* may have corresponding keying features that interface with one another such that the axle assembly 233 rotates when the slotted lever 233*v* is rotated.

In exemplary embodiments, mechanical rotation of the polarization shifter 213*s* (and thus the element substrate 213*g* and the radiating element 213 thereon) may be achieved via control of a motorized device—motor 243—and a linkage assembly 263 of the drive assembly 253. The motor 243 may be configured to transmit rotational forces to the slotted lever 233*v* via the linkage assembly 263. The linkage assembly 263 may include a linkage/control rod 263*d* and a carriage/carrier 263*c* and a camming pin 263*p* respectively coupled to the control rod 263*d*. The carriage 263*c* may be threadably coupled to a threaded rod 253*r*, which may be secured to a bracket 263*b*. Rotation of the motor 243 (e.g., clockwise or counterclockwise) may correspondingly turn the threaded rod 253*r*, and thus the carriage 263*c*, and cause the control rod 263*d* and the camming pin 263*p* to move linearly with respect to the threaded rod 253*r*. With the camming pin 263*p* installed to/through slot 233*t* of the slotted lever 233*v*, linear movement (or camming action) of the camming pin 263*p* in the slotted lever 233*v* may impart rotational force to the slotted lever 233*v*, and thus to the element substrate 213*g* and the radiating element 213.

It is to be appreciated and understood that the various components described herein, including those of the antenna support structure 223*u*, 223*w* and the drive assembly 253, may have any suitable dimensions and desired shapes or combinations of shapes. For instance, in certain embodiments, the lower support structure 223*w* may have one or more wing-like protrusions. As another example, the lower support structure 223*w* may include a cone-like or spiral construction (e.g., similar to the shape of a conical compression spring) in addition to, or rather than, a pod-like structure. As a further example, in some embodiments, the slotted lever 233*v* may be a symmetrical component with two slots 233*t* on opposite sides of the lever. As yet a further example, flat or partially flat linkage/control rods 263*d* may be employed rather than cylindrical ones.

Figure 5A:
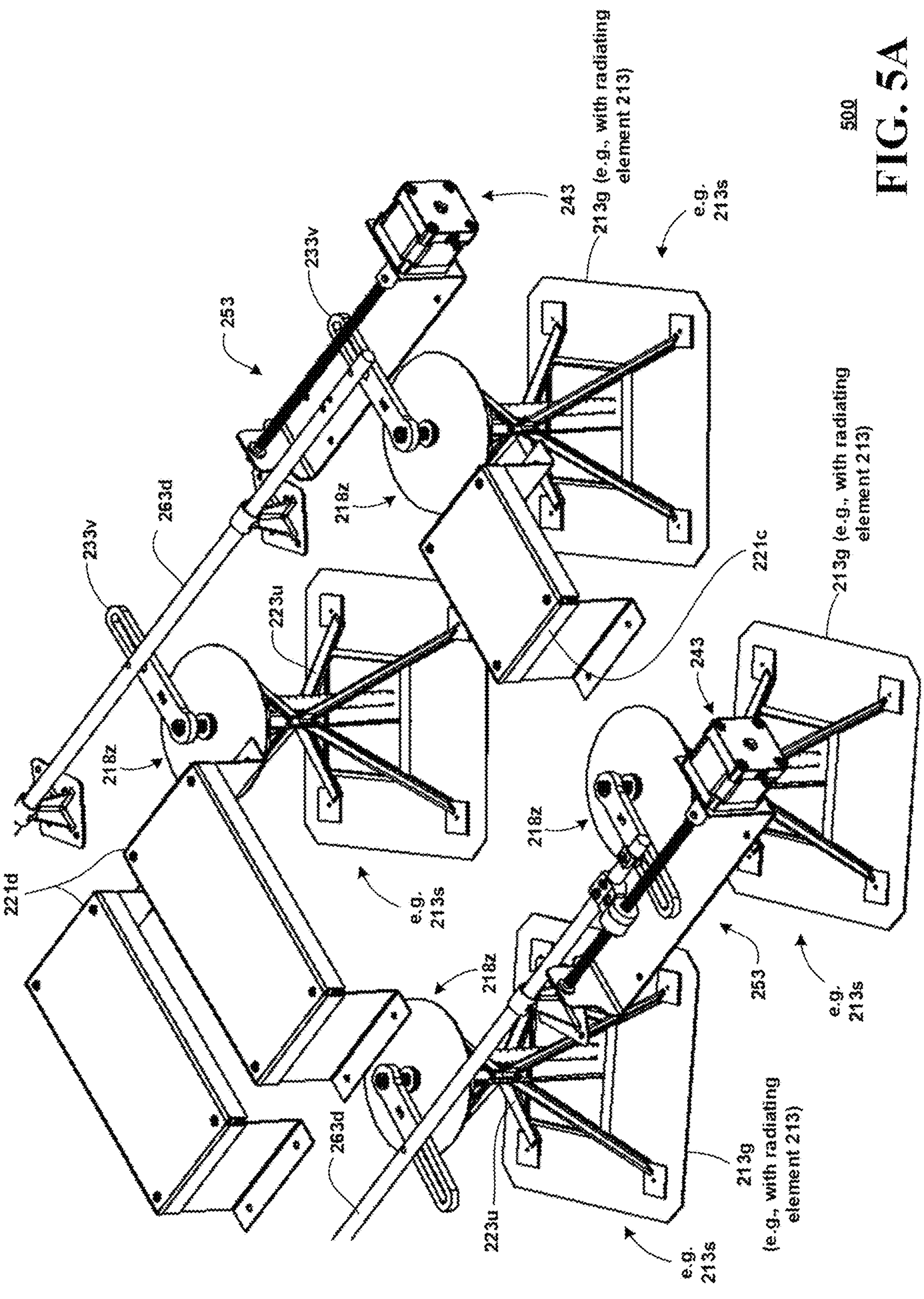
FIG. 5A depicts an exemplary, non-limiting embodiment of an interference/PIM mitigation (or avoidance) system in accordance with various aspects described herein.
Figure 5B:
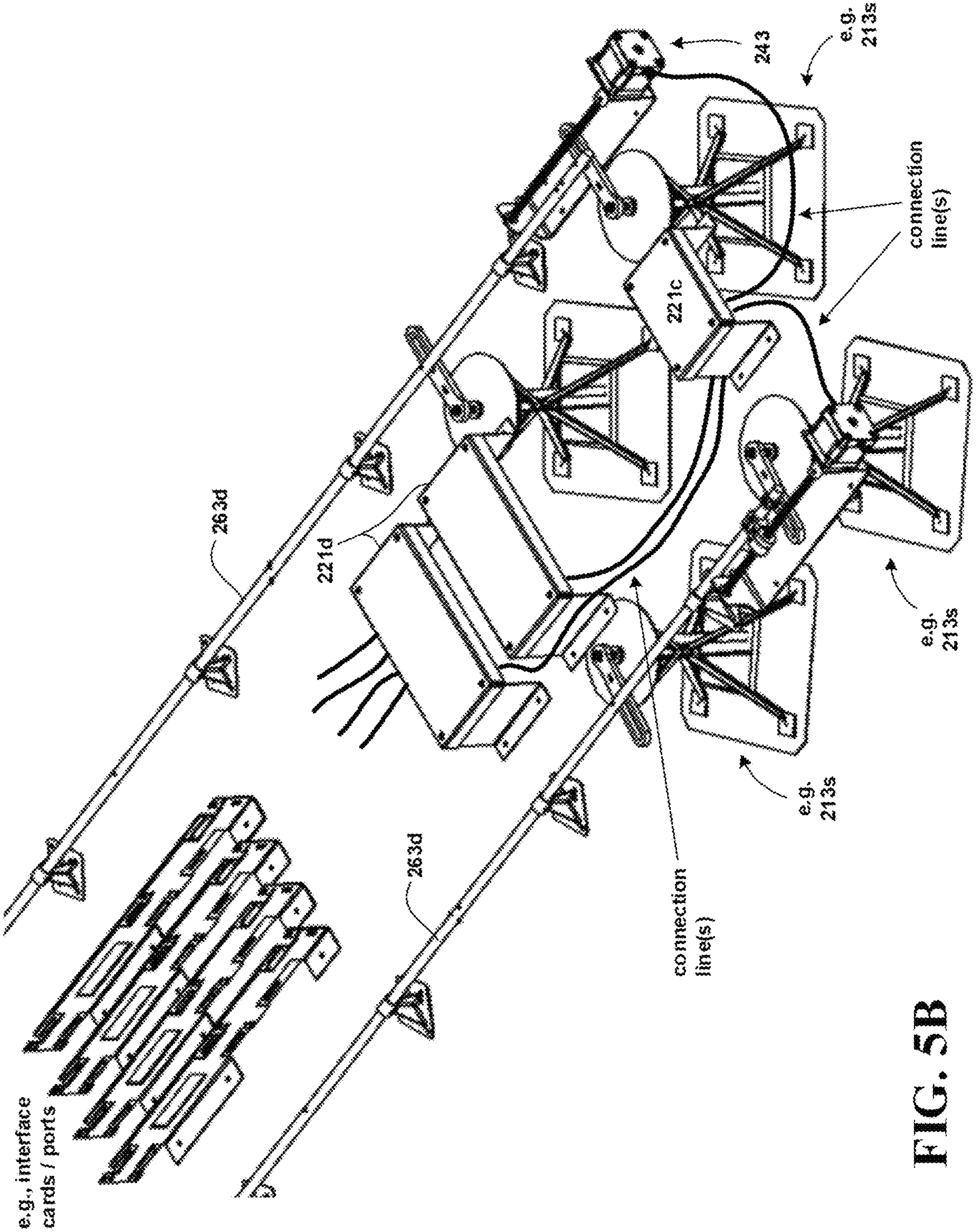
FIGS. 5B and 5C each depicts an exemplary, non-limiting implementation relating to the interference/PIM mitigation (or avoidance) system of FIG. 5A in accordance with various aspects described herein.
Figure 5C:
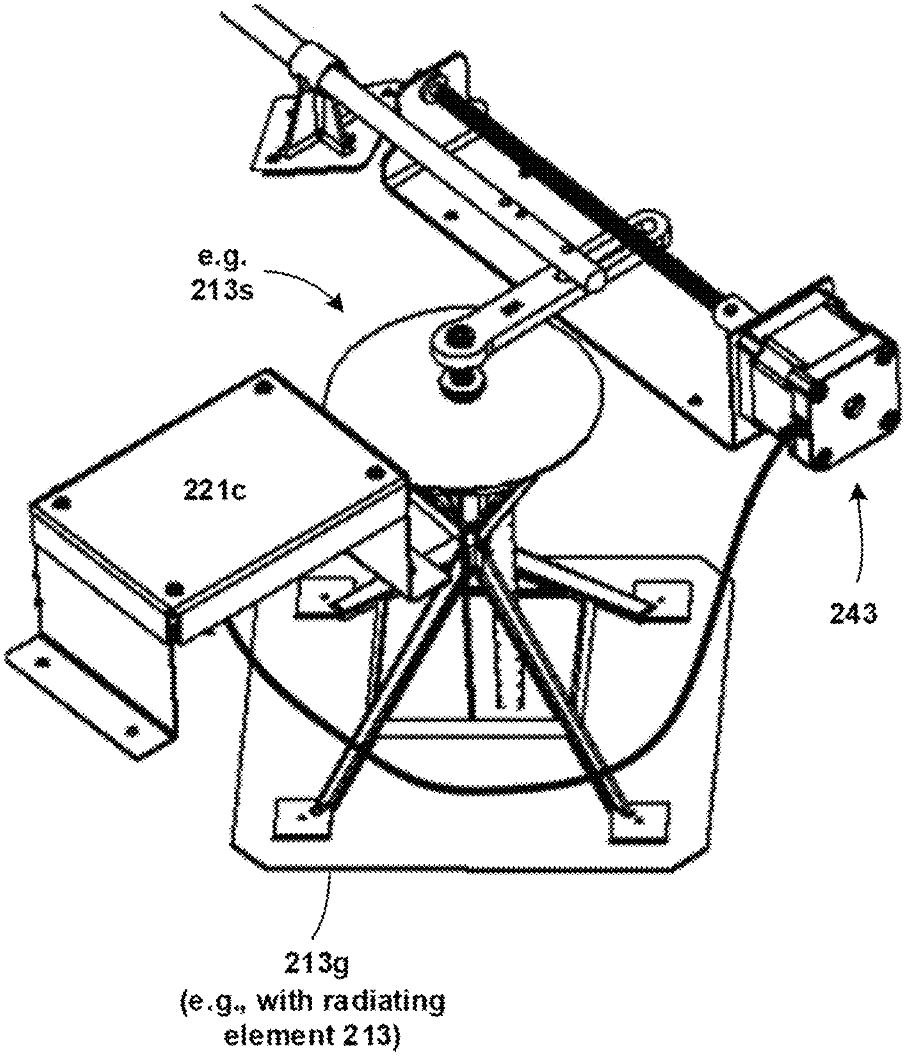

FIG. 5A depicts an exemplary, non-limiting embodiment of an interference/PIM mitigation (or avoidance) system (e.g., a self-mitigating PIM system) 500 in accordance with various aspects described herein. FIGS. 5B and 5C each depicts an exemplary, non-limiting implementation relating to interference/PIM mitigation (or avoidance) system 500 of FIG. 5A in accordance with various aspects described herein. In exemplary embodiments, the interference/PIM mitigation (or avoidance) system 500 may be implemented in an antenna, such as the antennas 201, 201*a*, and/or 201*b* described above with respect to FIGS. 2A and 2C-2E.

Referring to FIG. 5A, the interference/PIM mitigation (or avoidance) system 500 may include a control unit 221*c* (which may be similar to, may be the same as, or may correspond to control unit 201*c* of FIG. 2C), monitoring/detection unit(s) 221*d* (which may be similar to, may be the same as, or may correspond to monitoring/detection unit 201*d* of FIG. 2C), arrays of polarization shifters 213*s*, element substrates 213*g*, radiating elements 213, and a motor 243 and drive assembly 253 for each of the arrays. Although FIG. 5A shows two polarization shifters 213*s*, two element substrates 213*g*, and two radiating elements 213 in each array, in exemplary embodiments, the interference/PIM mitigation (or avoidance) system 500 may include additional polarization shifters 213*s*, element substrates 213*g*, and radiating elements 213, such as, for instance, a total of eight polarization shifters 213*s*, eight element substrates 213*g*, and eight radiating elements 213 in each array, as described above with respect to at least FIG. 2D. In various embodiments, therefore, each of the linkage rods 263*d* in FIG. 5A may couple to additional polarization shifters 213*s* in each array. The number of polarization shifters 213*s* coupled to a single linkage rod 263*d*, the number of motors 243 employed (e.g., in each array), and so on may vary depending on design/performance parameters and/or other considerations.

The control unit 221*c* may be communicatively coupled with the monitoring/detection unit(s) 221*d* and/or the motors 243, and may be configured to communicate with the monitoring/detection unit(s) 221*d* and/or the motors 243 over any suitable interface, such as a Serial Peripheral Interface (SPI), a Recommended Standard interface (e.g., RS-232 or the like), a Universal Serial Bus (USB) interface, and/or the like. Although FIGS. 5A and 5B show a control unit 221*c* implemented in a single board and the monitoring/detection unit(s) 221*d* implemented in multiple boards, it is to be appreciated and understood that these units may be implemented in any desired number of boards. For instance, in some embodiments, the control unit 221*c* (e.g., functionality thereof) may be implemented in a single board and the monitoring/detection unit(s) 221*d* may also be implemented in a single board. As another example, the control unit 221*c* (e.g., functionality thereof) may be implemented in multiple boards and the monitoring/detection unit(s) 221*d* may be implemented in a single board. In certain embodiments, the control functionality and monitoring/detection functionality may be implemented in a single integrated board.

The control unit 221*c* and the monitoring/detection unit(s) 221*d* may also reside in any desired location. For instance, in exemplary embodiments, the control unit 221*c* and the monitoring/detection unit(s) 221*d* may be located within the antenna (e.g., within the enclosure 213*r* of FIG. 2E). In other embodiments, one or more of the control unit 221*c* and the monitoring/detection unit(s) 221*d* may be located external to the antenna.

In various embodiments, the control unit 221*c* (whether implemented as a standalone controller board or integrated with one or more other devices, such as the monitoring/detection unit 221*d*) may include a variety of components configured to provide the control functionality described herein. In one or more embodiments, the control unit 221*c* may include, among other components, one or more microcontrollers, one or more analog-to-digital (A/D) converters, and/or hardware, firmware, or a combination of hardware and software for motor and antenna position management. In exemplary embodiments, the control unit 221*c* may be employed to configure the monitoring/detection unit(s) 221*d* with desired settings, such as values for base frequencies, attenuation, peak power limits, motor-related movements/travel, and/or other parameters. This provides flexibility, enables wider use of the overall system, and permits different detection configurations for different radiating elements of an antenna.

Although FIG. 5A shows two motors 243 (one for each array and controlling radiating elements 213 in each array to rotate, collectively), the system 500 may alternatively include more or fewer motors 243. For instance, in some embodiments, the system 500 may include multiple motors 243 per array, such as one motor 243 for a first set of polarization shifters 213*s* in an array, another motor 243 for a second set of polarization shifters 213*s* in the same array, and so on. In other embodiments, the system 500 may include a single motor 243 coupled to all of the polarization shifters 213*s* of all of the arrays of the antenna. In these embodiments, the single motor 243 may include, or may be integrated with, one or more (e.g., electronic) gears and/or latches, such as relay(s), contactor(s), solenoid(s), and/or the like, to enable differing rotation between the different arrays of polarization shifters 213*s*. In certain embodiments, the control unit 221*c*, the monitoring/detection unit(s) 221*d*, and one or more motors 243 may be implemented in a single, integrated construction.

In one or more embodiments, the monitoring/detection unit(s) 221*d* may be coupled with each of the radiating elements 213 in the system 500. In a case where the system 500 includes two arrays of radiating elements 213 and two monitoring/detection units 221*d*, a first one of monitoring/detection units 221*d* may be coupled to each of the radiating elements 213 in a first one of the arrays, and a second one of monitoring/detection units 221*d* may be coupled to each of the radiating elements 213 in a second one of the arrays. Here, for the first array of radiating elements 213, one sub-array of dipole elements may be coupled to the first monitoring/detection unit 221*d* over a first communication line, and the other orthogonal sub-array of dipole elements may be coupled to the first monitoring/detection unit 221*d* over a second communication line. Similarly, for the second array of radiating elements 213, one sub-array of dipole elements may be coupled to the second monitoring/detection unit 221*d* over a third communication line, and the other orthogonal sub-array of dipole elements may be coupled to the second monitoring/detection unit 221*d* over a fourth communication line.

In a case where the system 500 includes a single monitoring/detection unit 221*d* configured to monitor signals for all of the arrays, the various dipole elements in all of the arrays may be coupled to that single monitoring/detection unit 221*d*. For instance, for the first array of radiating elements 213, one sub-array of dipole elements may be coupled to the single monitoring/detection unit 221*d* over a first communication line, and the other orthogonal sub-array of dipole elements may be coupled to the single monitoring/detection unit 221*d* over a second communication line. Similarly, for the second array of radiating elements 213, one sub-array of dipole elements may be coupled to the single monitoring/detection unit 221*d* over a third communication line, and the other orthogonal sub-array of dipole elements may be coupled to the single monitoring/detection unit 221*d* over a fourth communication line.

In various embodiments, the interference/PIM mitigation (or avoidance) system 500 may be capable of receiving signals, analyzing the signals, identifying the optimal (or best) polarization shifter position (and thus the best position for a given array of radiating elements) based on the analysis, and causing the polarization shifter to rotate to that optimal (or best) position. Here, the monitoring/detection unit 221*d* may, for a given array, obtain signals from corresponding radiating elements 213 in that array. The control unit 221*c* may identify the optimal position (i.e., the position yielding the best radiating element performance) for those radiating elements 213 based on radiating element power level reading(s) (at different radiating element or column positions) from the monitoring/detection unit 221*d*, and may control the corresponding motor 243 to drive its associated drive assembly 253 to rotate (e.g., via respective slotted levers 233*v*) the corresponding polarization shifters 213*s*, element substrates 213*g*, and radiating elements 213 to that optimal position. In various embodiments, the control unit 221*c* may control rotation of the radiating elements 213 in a range of positions (e.g., a 90 degree range, such as, from −45 degrees to +45 degrees and vice versa) and in definable incremental steps or degrees (such as in increments of 0.5 degrees, 1 degree, 5.625 degrees, 2.8125 degrees, etc.). In certain embodiments, the control unit 221*c* may be configured to calibrate the motor(s) 243 (e.g., periodically or based on user command) to ensure that rotational increments remain accurate over time.

Figure 5D:
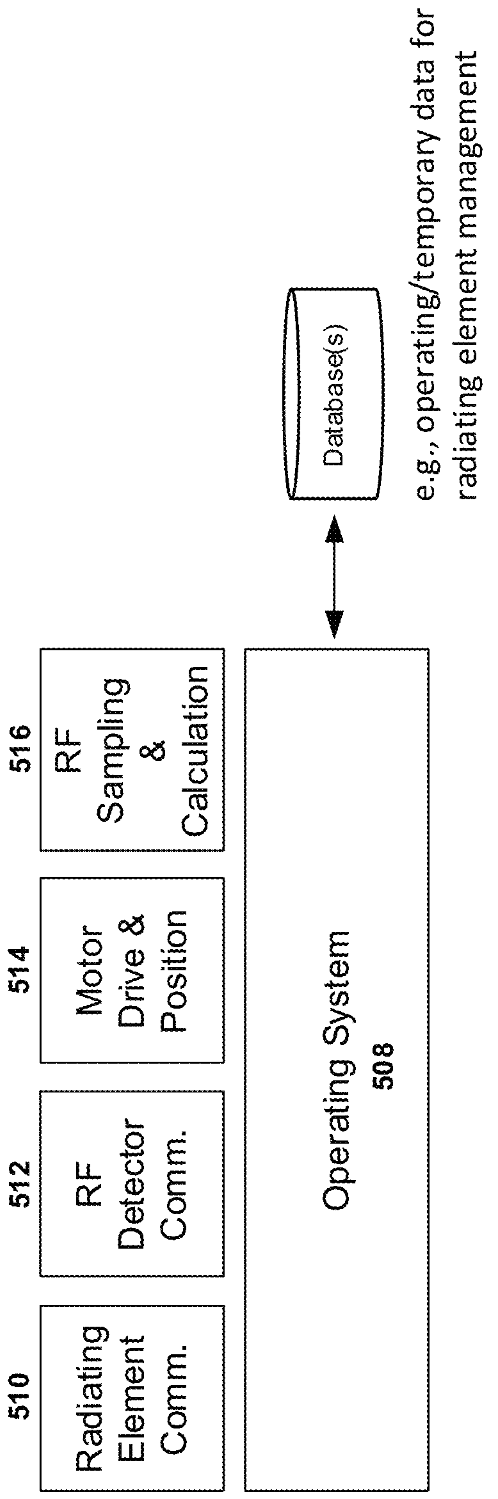
FIG. 5D is a block diagram of an exemplary, non-limiting embodiment of a functional architecture of a control unit in accordance with various aspects described herein.

FIG. 5D is a block diagram of an exemplary, non-limiting embodiment of a functional architecture of the control unit 221*c* in accordance with various aspects described herein. In exemplary embodiments, the control unit 221*c* may, as described in more detail below, be configured to obtain/read radiating element power level(s) from the monitoring/detection unit(s) 221*d*, calculate average power value(s), analyze the calculations, select an optimal (or best) radiating element (or column) position based on the analysis, and control motion of the motor(s) 243 to effect interference/PIM mitigation or avoidance.

In some embodiments, the control unit 221*c* may be equipped with an operating system (OS) 508 configured to manage power state (e.g., idle, active, etc.), memory allocation, software updates, system and default data configuration, interrupt management and time-sharing execution of tasks, etc. In certain embodiments, the OS may be configured to manage and control various (e.g., modular) functionality relating to the radiating elements 213. Example functionality may include external communication functionality 510, monitoring/detection unit communication functionality 512, motor driver and positioning functionality 514, and/or monitoring/detection sampling/calculation functionality 516.

In various embodiments, the radiating element communication function 510 may provide the necessary functions for external communication—i.e., for exchanging messages with an external source, such as, a user computing device, an automated system, and/or another device/system to configure/manage radiating element power readings/measurements, monitor system performance, etc., which enables remote access and monitoring. The function 510 may employ any suitable communication protocol, such as, for example, Transmission Control Protocol/Internet Protocol (TCP/IP), RS485 serial, User Datagram Protocol (UDP), and/or the like.

In various embodiments, the monitoring/detection unit communication function 512 may provide the necessary functions for exchanging messages with the monitoring/detection unit(s) 221*d* to configure/manage detector settings, receive detector errors, obtain power readings/measurements, etc. The function 512 may employ any suitable communication protocol, such as, for example, USB, SPI, RS485 serial, and/or the like.

In various embodiments, the motor driver and positioning function 514 may be configured to control rotary (clockwise and/or counterclockwise) motion of the motor(s) 243, speed of the motor(s) 243, and/or displacement or distance of travel of the motor(s) 243. Positioning functionality (or circuitry) may monitor and validate motor movements relative to desired radiating element (or column) positions.

In various embodiments, the monitoring/detection sampling/calculation functionality 516 may sample RF voltages provided by the monitoring/detection unit(s) 221*d*, calculate the optimal (e.g., best) radiating element (or column) position, and provide instructions to the motor driver and positioning function 514 to move the motor(s) 243 accordingly.

The following is an overview of an exemplary implementation for mitigating or avoiding PIM or interference. PIM, for instance, generally does not have random characteristics, but is rather highly-directionally polarized in space. Depending on the orientation of the PIM source, the orientation or angle of radiating elements in an antenna may be adjusted to avoid the PIM. In the antenna 201*b* of FIG. 2D, for example, measurements may be made for each column or array of radiating elements 213 to identify the PIM, and the radiating elements 213 in one or more of the arrays may be collectively rotated. In exemplary embodiments, signal parameters (e.g., power, whether peak, average, or root mean square) may be measured for the dipole elements of the radiating elements 213 in a given column (i.e., for one sub-array of dipole elements, collectively, and for the other orthogonal sub-array of dipole elements, collectively), and a ratio of the two measurements may be calculated. Where there is no PIM or interference in the signals, the measurements are expected to be essentially equal. However, in the presence of PIM or interference, there will be an optimal (or best) angle of rotation of the radiating elements in which one sub-array of dipole elements will not receive the PIM/interference, while the other orthogonal sub-array of dipole elements will. The column of radiating elements can thus be rotated in increments (e.g., 16 increments of 5.625 degrees each, 32 increments of 2.8125 degrees each, or any other desired incremental steps), such that the column of radiating elements incrementally occupies different rotational positions in a continuous or sequential manner, and measurements from signals received at the dipole elements may be made at each of the incremental steps to identify that optimal (or best) angle of rotation for that column of radiating elements.

Figure 5E:
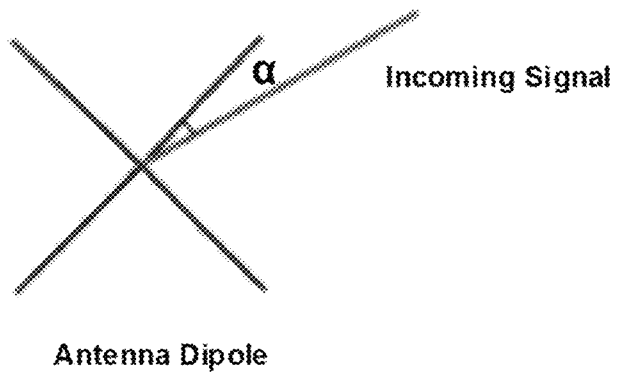
FIG. 5E illustrates a radiating element and an incoming signal in accordance with various aspects described herein.

In exemplary embodiments, identifying an angle of incoming interference/PIM enables effective mitigation, or avoidance, thereof. FIG. 5E illustrates a radiating element (e.g., a radiating element 213) and an incoming signal in accordance with various aspects described herein. RF signals received by each radiating element 213—by each dipole element of the dipole pair—may be detected by the monitoring/detection unit 221*d*. As depicted in FIG. 5E, relative polarization angle α is the angle between the incoming linearly-polarized signal and one of the dipole elements of the radiating element 213. Power at each of the dipole elements may be proportional to both an amplitude A of the incoming signal and the angle α, and therefore, may not be effectively used to determine the angle α unless the amplitude A is known:

$$P(-45)=A*\sin(\alpha);\text{ and}$$

$$P(+45)=A*\cos(\alpha).$$

In fact, even if multiple power measurements of the incoming signal are taken at different polarization angles, it would still be difficult to accurately determine the smallest angle α, since the amplitude A of the signal might change due to varying traffic during the measurement period. However, by (e.g., simultaneously) measuring the signal power from both orthogonal elements, and computing the ratio of the power levels, the result will not be affected by the signal amplitude A, but (e.g., only) by the polarization angle:

$$P(+45)/P(-45)=A*\cos(\alpha)/A*\sin(\alpha)=\cot(\alpha).$$

Therefore, the largest power ratio will indicate the smallest angle α regardless of signal amplitude A. Since, for linearly-polarized signals, the angle α is fairly constant over time and amplitude variations, different kinds of power measurements may be made (such as root mean square (RMS), peak, instantaneous, average, or combination of one or more of these kinds of power measurements), so long as both polarizations are measured simultaneously and using the same measurement method. When measuring the power of a communication signal in the field environment, care must generally be taken to detect only the signal of interest and avoid contributions from any overlapping or adjacent signals. A narrow bandwidth power detector may be employed in various embodiments to enable such selective detection.

Figure 5F:
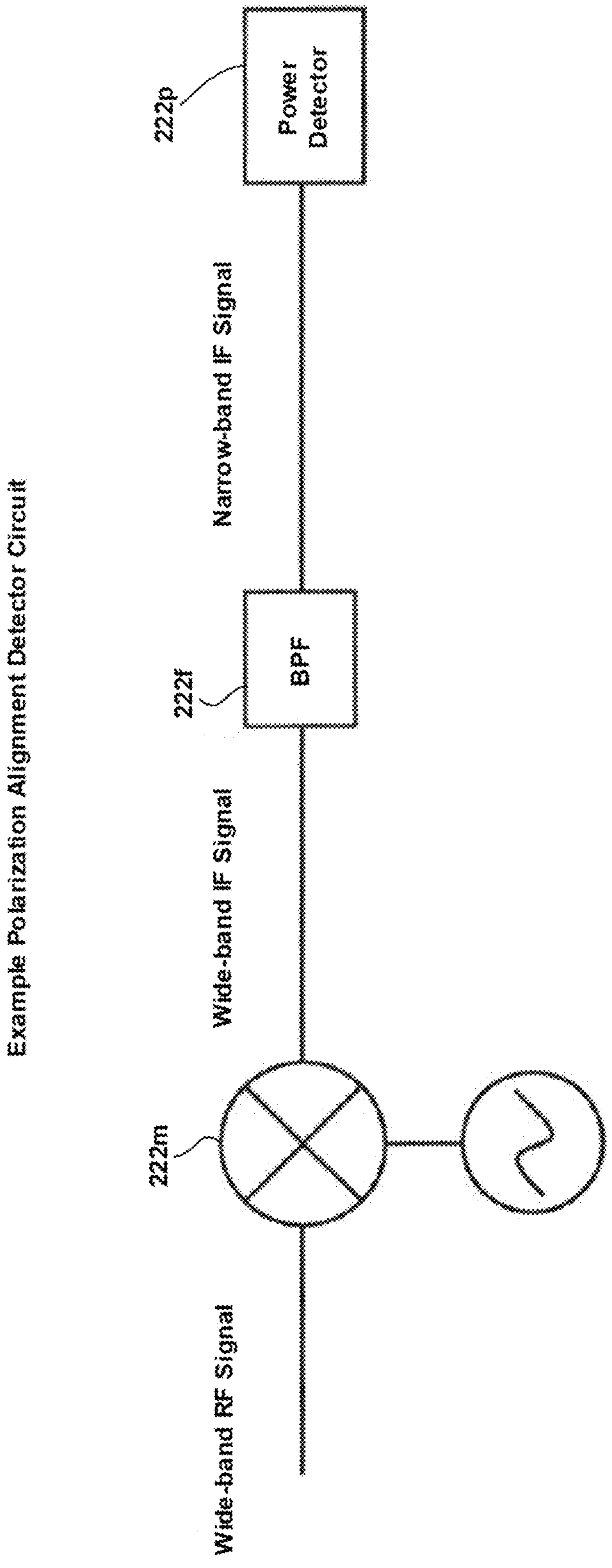
FIG. 5F is a block diagram of an exemplary, non-limiting implementation of a monitoring/detection unit in accordance with various aspects described herein.

FIG. 5F is a block diagram of an exemplary, non-limiting implementation of the monitoring/detection unit 221*d* in accordance with various aspects described herein. In exemplary embodiments, the implementation 222*d* may be a polarization alignment detector system/circuit, or more particularly, a narrow bandwidth power detector 222*d*, that enables differential power measurements to be made for determining the relative polarization angle α.

In various embodiments, the narrow bandwidth power detector 222*d* may include a (e.g., standard commercially available) power detector 222*p* configured to measure power only over a selected, narrow portion of the signal without external interference. Because RF power detectors generally do not discriminate between signals in the frequency spectrum (they detect a very wide range of frequencies, such as several GHz-wide), the implementation 222*d* may include a high rejection, narrow bandwidth band-pass filter 222*f* in front of the power detector 222*p* to provide a narrow detection range. To add frequency selectivity to the system, the narrow bandwidth band-pass filter 222*f* may be designed or chosen to be selective in the intermediate frequency (IF) band, and a down-converter mixer 222*m* may be utilized to translate the RF frequency of interest to the pass-band of the filter 222*f*. Adjustments to the local oscillator (LO) frequency of the down-converter mixer 222*m* may enable narrow bandwidth power measurements to be made at different frequencies. As the power detector 222*p* is configured to operate across the same narrow bandwidth of the band-pass filter 222*f*, the overall system/circuit 222*d* provides suitable stability.

Figure 5G:
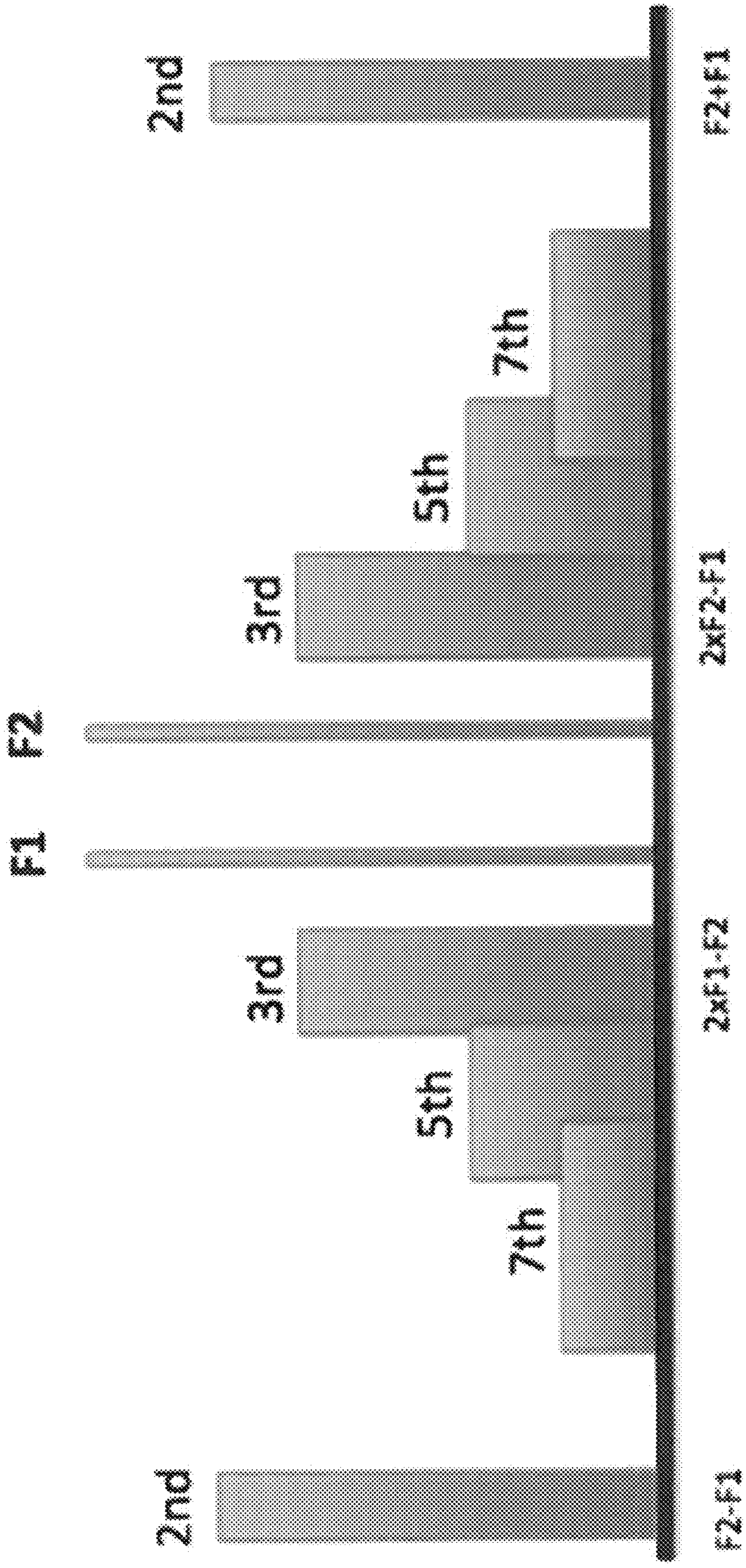
FIGS. 5G and 5H illustrate identification of PIM polarization in accordance with various aspects described herein.
Figure 5H:
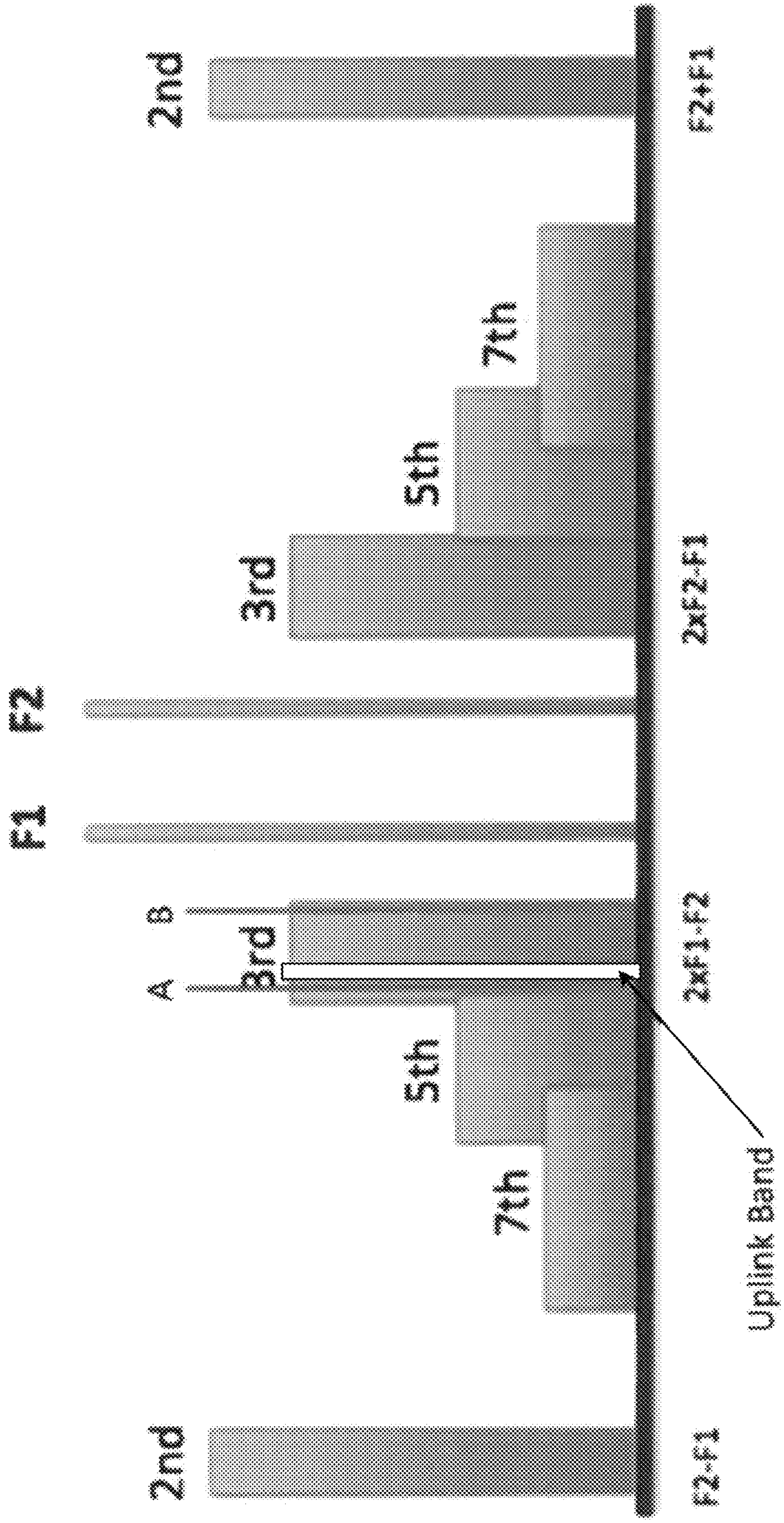

PIM occurs when two or more signals are present in passive (mechanical) components of a wireless system. Some examples of mechanical components include antennas, cables, and connectors. The signals can mix or multiply with each other to generate other signals that impact the original intended signal. This results in degraded cellular receiver performance and can negatively impact voice calls and data transmission quality for end users. The bandwidth of a PIM signal is much larger than the bandwidth of original, intended signals. As an example, for two 10 MHz signals, the third order PIM would be 30 MHz wide. As a result, the interfering PIM signal, created by two high power downlinks, would always have a larger bandwidth than the affected uplink, and there would be regions of the frequency spectrum where only the PIM signal is present, such as the guard bands between assigned communication bands. Performing narrow band measurements in those regions using power detection method(s) described above will provide information regarding the polarization of only the PIM signal. Furthermore, if measurements are performed at two different frequencies A and B within the expected bandwidth of the PIM and outside of the frequency range of other known signals, both results should indicate the same polarization since they represent samples of the same PIM signal. FIGS. 5G and 5H illustrate identification of PIM polarization in accordance with various aspects described herein.

As briefly described above, the motor 243 may control rotation of each radiating element 213 in an array or column of radiating elements 213. In various embodiments, the motor 243 may control rotation of the radiating elements in increments or steps—e.g., 1 degree increments, 3 degree increments, 5.625 degree increments, etc.—corresponding to rotational "positions" of the radiating elements (or column of radiating elements). Radiating element power readings/measurements may then be performed (e.g., in a looped fashion) for such positions. The number of positions may vary depending on reading granularity needed, design parameters, and/or other considerations. For purposes of illustration, measurements for sixteen (16) positions are described below, but it should be appreciated and understood that the position loop may be divided in more or fewer positions, such as 32 positions, 13 positions, 8 positions, etc. In one or more embodiments, the control unit 221*c* may configure the monitoring/detection unit 221*d* with desired settings, such as, for example, base frequency (e.g., Freq. A, B, etc.), attenuation, and/or other pertinent working data, and may then cause the motor 243 to drive the drive assembly 253, such that the radiating elements (or column of radiating elements) rotate to the first of 16 positions. The configuration and/or power reading/measurement process may be initiated or triggered in any suitable manner, such as via external input (e.g., from a user device, base station, etc.) and/or based upon a condition being satisfied (e.g., time of day being reached, power threshold(s) being met, expiration of an initiated timer, etc.).

Voltage(s) of signal(s) received by the radiating elements (or column of radiating elements) may be detected by the monitoring/detection unit 221*d*, and obtained/read by the control unit 221*c*. Here, a particular number of (e.g., substantially) simultaneous readings of voltage may be performed for the first position, and such readings may be repeated (e.g., looped) a certain number of times for the first position. For purposes of illustration, the particular number of (e.g., substantially) simultaneous readings may be set to three (3) and the number of repetitions of such readings may be set to give (5), but it is to be appreciated and understood that the control unit 221*c* may perform any other numbers of (e.g., substantially) simultaneous readings and repetitions of such readings for each position.

In various embodiments, the (e.g., substantially) simultaneous readings may be performed using multiple analog-to-digital (A/D) converters of the control unit 221*c* that may be coupled to the monitoring/detection unit 221*d* and configured to read analog voltage inputs for respective radiating elements in a column of radiating elements. The control unit 221*c* may store the voltage inputs in a data structure—e.g., a table in a memory included in or accessible to the control unit 221*c*. For instance, the control unit 221*c* may store each of five sets of three (e.g., substantially) simultaneous voltage readings in a temporary table, resulting in a 3×5 table. FIG. 51 shows an example radiating element column voltage reading table 520 in accordance with various aspects described herein.

In various embodiments, the control unit 221*c* may cause (via control of the motor) the column of radiating elements to rotate to each position, and may repeat the five sets of three (e.g., substantially) simultaneous voltage readings. The control unit 221*c* may then calculate average power levels based on the sets of (e.g., substantially) simultaneous voltage readings, and store the average power levels in a data structure—e.g., another table in the memory. FIG. 5J shows an example radiating element column position table 522 in accordance with various aspects described herein. Here, the radiating element column position table 522 may include average voltages determined based on the table 520 of FIG. 5I for 16 positions and two different frequencies A and B.

In one or more embodiments, the control unit 221*c* may calculate the averages as follows:

Average (RF_Det_Voltage, position_1)=average of the voltages in row 520*a* in table 520 of FIG. 5I=average (2.6, 2.5, 2.4, 2.6, 2.7)=2.56;

Average (RF_Det_Voltage, position_2)=average of the voltages in row 520*b* in table 520 of FIG. 5I=average (1.2, 1.0, 1.3, 1.1, 1.3)=1.18;

Average (RF_Det_Voltage, position_3)=average of the voltages in row 520*c* in table 520 of FIG. 5I=average (2.3, 2.2, 2.4, 2.4, 2.4)=2.34; and so on.

In various embodiments, the above-described process may be repeated for a different frequency (e.g., Freq. B different from Freq. A). In one or more embodiments, the control unit 221*c* may perform an analysis of the average voltage readings and identify an optimal (or best) rotational position for the radiating elements in the column based on the analysis.

In various embodiments, the control unit 221*c* may calculate, for each position and each frequency (e.g., Freq. A and B), an absolute value "ABS" based on the corresponding measured voltages. Each absolute value may be determined in a variety of manners, such as, for example, the following:

Radiating elements column (position_no, Freq_A_ABS) =(ABS(Radiating elements column (position_no, 1)−Radiating elements column (position_no, 2)+ABS (Radiating elements column (position_no, 3)−2.5)))/2, where, for position 1 and Freq. A in the table 522 of FIG. 5J, the absolute value "ABS"=(ABS(2.56-1.18+ ABS(2.34 −2.5)))/2=0.77;

Radiating elements column (position_no, Freq_B_ABS) =(ABS(Radiating elements column (position_no, 4)−Radiating elements column (position_no, 5)+ABS (Radiating elements column (position_no, 6)−2.5)))/2, where, for position 1 and Freq. B in the table 522 of FIG. 5J, the absolute value "ABS"=(ABS(2.6 −2.5+ ABS(2.4 −2.5)))/2=0.1; and so on.

In various embodiments, the control unit 221*c* may compare the ABS values with those of neighboring positions. For instance, for position 3 (third row of values in the table 522 of FIG. 5J), the control unit 221*c* may compare the ABS value in the third row with the ABS values in the second and fourth rows. In a case where the ABS value in the third row is higher than each of the ABS values in the second and fourth rows, the control unit 221*c* may compare the ABS value in the third row with a predefined threshold, such as, but not limited to, a noise level. If the ABS value in the third row satisfies (e.g., exceeds) the threshold, the control unit 221*c* may identify that ABS value as a candidate peak power value. Since the radiating element (or column) positions are configured rotationally, respective ABS values in "beginning" and "end" positions may be compared with those of rotational neighbor positions. For example, the ABS value of position 1 (first row of values in the table 522 of FIG. 5J) may be compared with the ABS values in the sixteenth and second rows. The comparison may be performed until all of the ABS values have been compared with those of neighboring positions, and all the candidate peak values are identified.

Once the candidate peak values have been identified for both Freq. A and Freq. B, in various embodiments, the control unit 221*c* may identify the optimal (or best) position for the column of radiating elements. This identification may be performed based on comparisons of the candidate peak ABS values for Freq. A and Freq. B. Some example comparisons for identifying the optimal (or best) position are as follows:

If Freq. A and Freq B have the same candidate peak ABS value in a given position, such as, candidate peaks $P_{A2}$, $P_{A9}$, $P_{A14}$, $P_{B5}$, and $P_{B9}$, then the control unit 221*c* may identify position 9 as being the optimal (or best) radiating element (or column) position;

If Freq. A and Freq B have similar candidate peak ABS values (e.g., within a threshold difference from one another), and if the candidate peak values are: $P_{A2}$, $P_{A9}$, $P_{A14}$, $P_{B5}$, and $P_{B10}$, then the control unit 221*c* may identify position 9 as being the optimal (or best) radiating element (or column) position in a case where $P_{A9}>P_{B10}$, or the control unit 221*c* may identify position 10 as being the optimal (or best) radiating element (or column) position in a case where $P_{A9}<P_{B10}$;

If Freq. A and Freq. B do not have similar candidate peak ABS values (e.g., they are not within the threshold difference from one another), and if the candidate peak values are: $P_{A2}$, $P_{A14}$, $P_{B5}$, and $P_{B9}$, then the control unit 221*c* may identify a default position (e.g., position 1 or a current position of the column) as the optimal (or best) radiating element (or column) position; and If Freq. A and Freq. B have more than one qualifying position, then the control unit 221*c* may identify the position with the highest peak ABS value as the optimal (or best) radiating element (or column) position.

Based on the identified optimal (or best) position, the control unit 221*c* may then control the motor 243 to move the column of radiating elements to that position to facilitate mitigation or avoidance of interference/PIM.

Figure 5K:
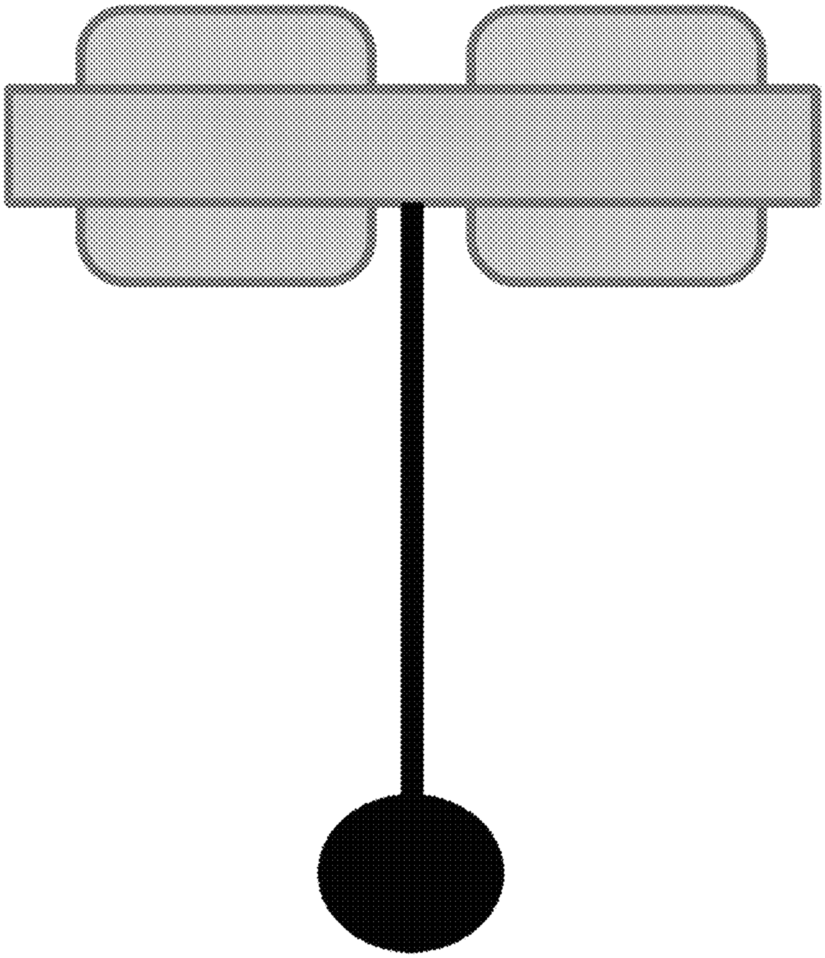
FIGS. 5K and 5L illustrate an example implementation for evaluating polarization shifting in accordance with various aspects described herein.
Figure 5L:
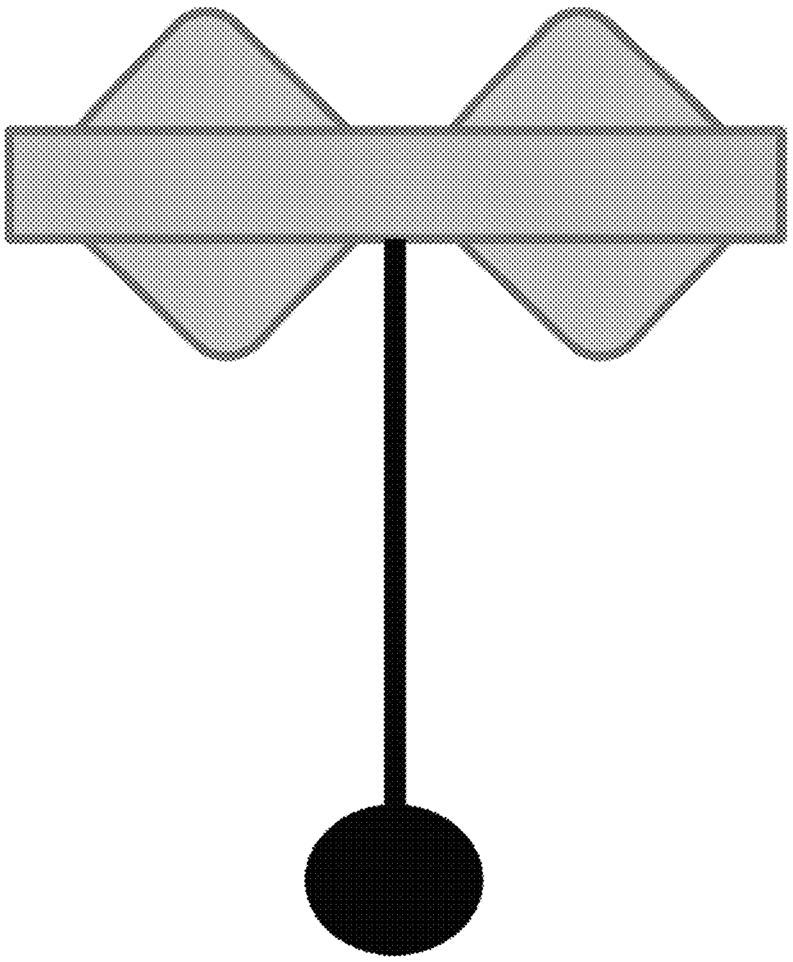
Figure 5M:
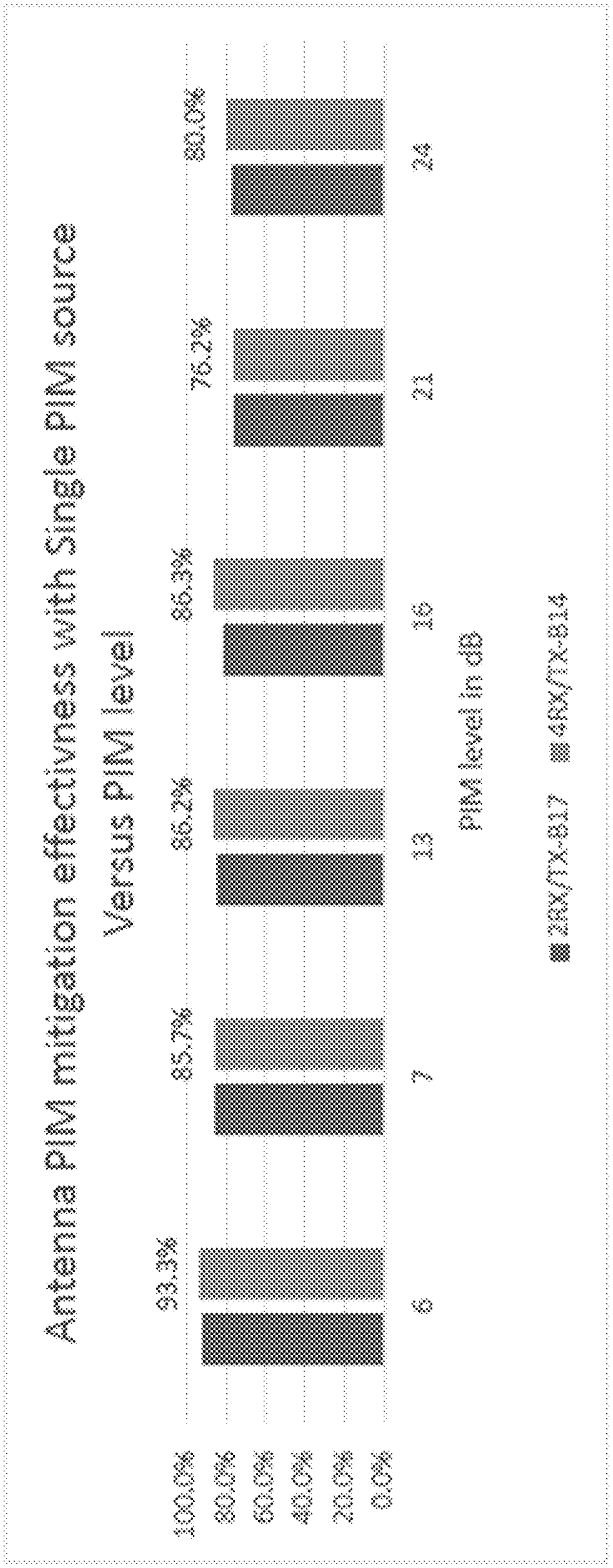
FIGS. 5M and 5N show mitigation results for different sources of PIM in accordance with various aspects described herein.
Figure 5N:
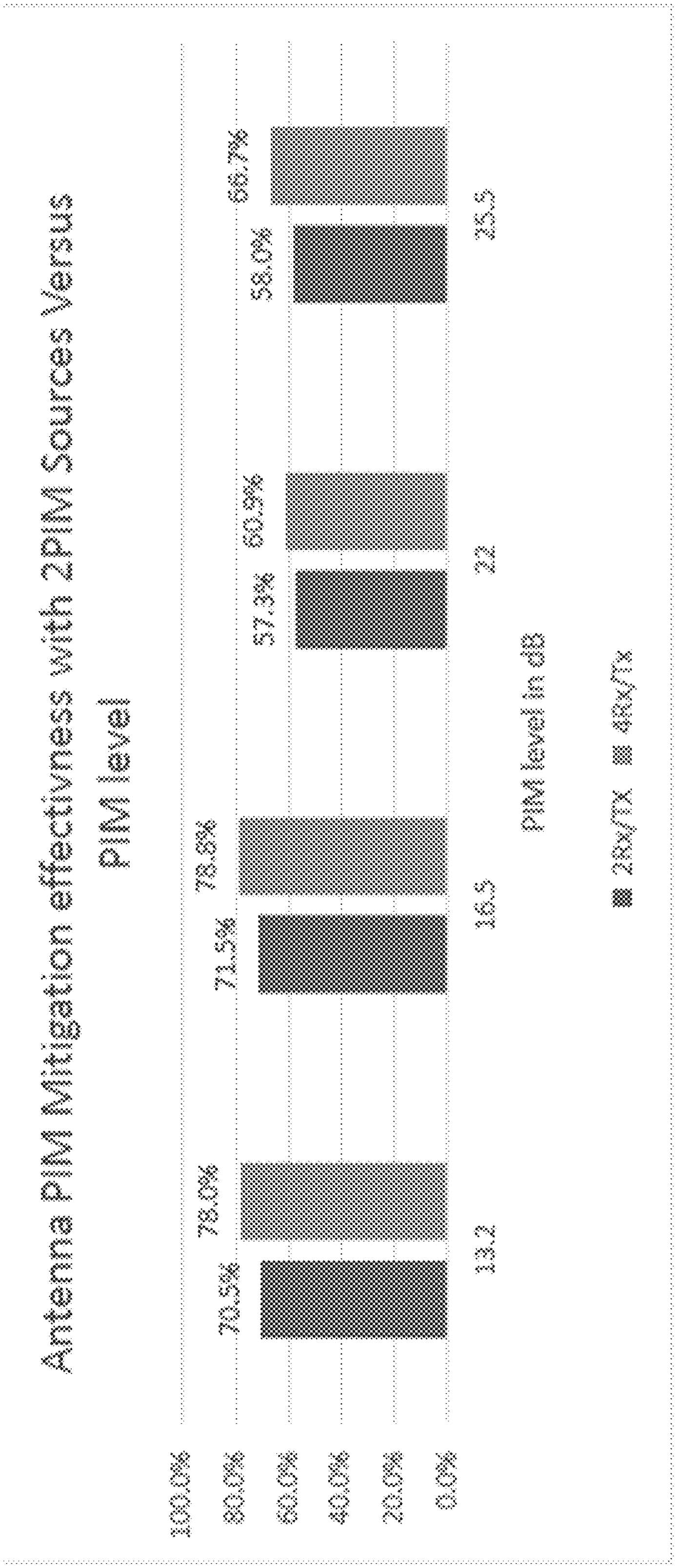

FIGS. 5K and 5L illustrate an example implementation for evaluating polarization shifting in accordance with various aspects described herein. The implementation may include a commercial base station radio having dual band support, with 2 transmit (Tx)/receive (Rx) configured for one of the bands and 4 Tx/Tx for the other band. The radio may have a single (dual-polarized) radiating element in a 2-by-2 implementation and two radiating elements in a 4-by-4 implementation. In evaluating polarization shifting, a PIM source (i.e., vertical steel wool bar) was placed across from the antenna(s) in a known position/orientation. Since the physical rotation of the antenna is equivalent to the rotation of a single radiating element (in the 2-by-2 implementation), such physical rotation was used to simulate or effect rotation of the radiating element. For each rotation, the reflected signal was captured and analyzed with a base band unit and a PIM Common Public Radio Interface (CPRI) analyzer. The PIM level prior to the rotation to an optimum angle/position is compared to the PIM level after such rotation. In order to precisely rotate the antenna by precise amounts, a mounting platform was constructed using a piece of plywood and two panoramic tripod heads. The tripod heads were designed to be used in panoramic photography applications, but work well as a general-purposed rotator with 15-degree stops. Where the PIM source is in a known orientation (e.g., vertically oriented), rotation of the antenna such that a first sub-element of the radiating element is vertically oriented and a second sub-element of the radiating element is horizontally oriented enables a "clean" signal to be picked up from the horizontally oriented sub-element, thereby resulting in mitigation, or avoidance, of the PIM. FIGS. 5M and 5N show mitigation results for different sources of PIM in accordance with various aspects described herein. These results indicate that the techniques employed in various embodiments described herein are highly effective for PIM mitigation or avoidance.

Figure 5O:
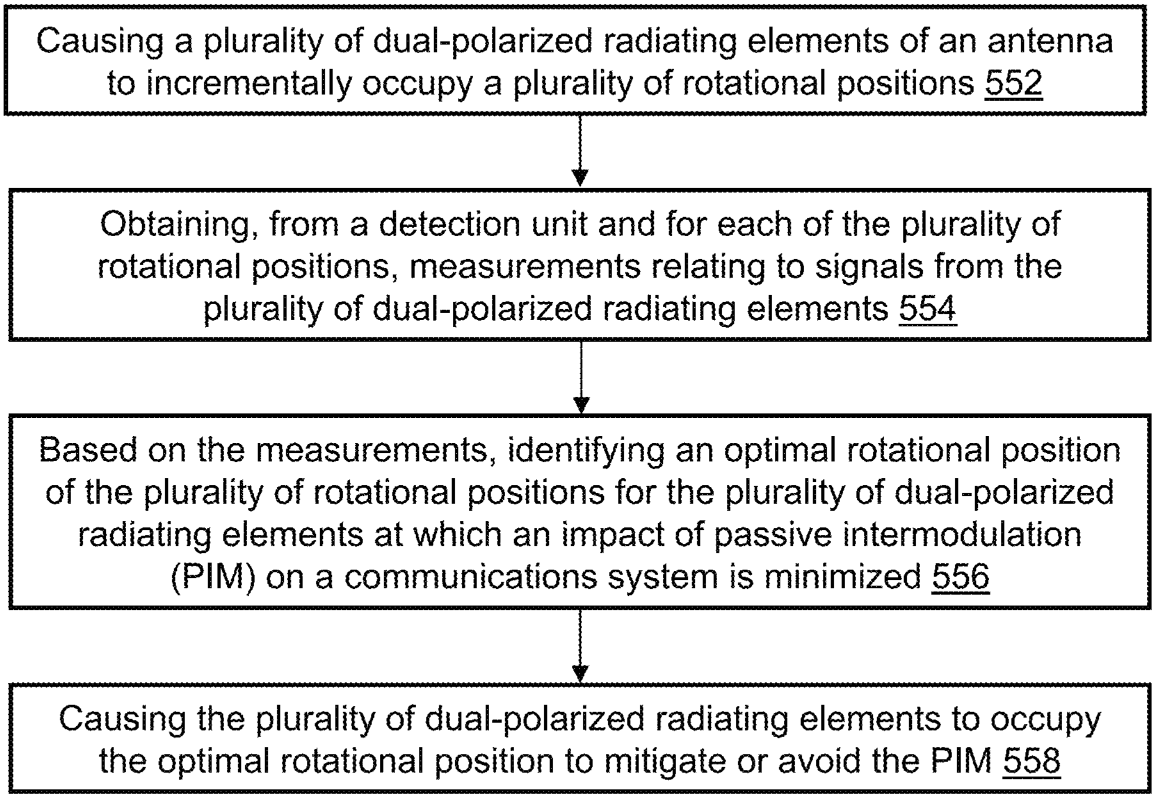
FIG. 5O depicts an illustrative embodiment of a method in accordance with various aspects described herein.

FIG. 5O depicts an illustrative embodiment of a method 550 in accordance with various aspects described herein. In some embodiments, one or more process blocks of FIG. 5O can be performed by a control unit, such as the control unit 201*c* and/or the control unit 221*c*. In some embodiments, one or more process blocks of FIG. 5O may be performed by another device or a group of devices separate from or including the control unit, such as the monitoring/detection unit(s) 201*d* and/or 221*d*, the antennas 201, 201*a*, and/or 201*b*, etc.

At 552, the method can include causing a plurality of dual-polarized radiating elements of an antenna to incrementally occupy a plurality of rotational positions. For example, the control unit 221*c* can, similar to that described elsewhere herein, perform one or more operations that include causing a plurality of dual-polarized radiating elements of an antenna to incrementally occupy a plurality of rotational positions. In various embodiments, the plurality of dual-polarized radiating elements may thus be rotated in increments (e.g., 16 increments of 5.625 degrees each, 32 increments of 2.8125 degrees each, or any other desired incremental steps), such that the plurality of dual-polarized radiating elements incrementally occupies different rotational positions in a continuous or sequential manner, where measurements from signals received at the dual-polarized radiating elements may be made at each of the incremental steps to identify that optimal (or best) angle of rotation for the plurality of dual-polarized radiating elements.

At 554, the method can include obtaining, from a detection unit and for each of the plurality of rotational positions, measurements relating to signals from the plurality of dual-polarized radiating elements. For example, the control unit 221*c* can, similar to that described elsewhere herein, perform one or more operations that include obtaining, from a detection unit and for each of the plurality of rotational positions, measurements relating to signals from the plurality of dual-polarized radiating elements.

At 556, the method can include, based on the measurements, identifying an optimal rotational position of the plurality of rotational positions for the plurality of dual-polarized radiating elements at which an impact of passive intermodulation (PIM) on a communications system is minimized. For example, the control unit 221*c* can, similar to that described elsewhere herein, perform one or more operations that include, based on the measurements, identifying an optimal rotational position of the plurality of rotational positions for the plurality of dual-polarized radiating elements at which an impact of passive intermodulation (PIM) on a communications system is minimized.

At 558, the method can include causing the plurality of dual-polarized radiating elements to occupy the optimal rotational position to mitigate or avoid the PIM. For example, the control unit 221*c* can, similar to that described elsewhere herein, perform one or more operations that include causing the plurality of dual-polarized radiating elements to occupy the optimal rotational position to mitigate or avoid the PIM.

In some implementations of these embodiments, the plurality of dual-polarized radiating elements comprises a column of dual-polarized radiating elements in the antenna.

In some implementations of these embodiments, the measurements comprise peak power, average power, or root mean square (RMS) power.

In some implementations of these embodiments, the measurements include first measurements based on first signals received at dipole elements of the plurality of dual-polarized radiating elements having a first polarization and second measurements based on second signals received at dipole elements of the plurality of dual-polarized radiating elements having a second polarization orthogonal to the first polarization.

In some implementations of these embodiments, the control unit is configured to calculate ratios using the first and second measurements, and the identifying the optimal rotational position of the plurality of rotational positions is further based on the ratios.

In some implementations of these embodiments, the detection unit is further coupled to each radiating element of a second plurality of dual-polarized radiating elements of the antenna, and the detection unit is further configured to receive signals from the second plurality of dual-polarized radiating elements.

While for purposes of simplicity of explanation, the respective processes are shown and described as a series of blocks in FIG. 5O, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

One or more embodiments may include a polarization shifter. The polarization shifter may include a lower substrate having disposed thereon first and second transmission lines for coupling to a feed network. The polarization shifter may further include an upper substrate having disposed thereon third and fourth transmission lines for respective communicative coupling to orthogonally-polarized elements of a radiating element. The upper substrate may be configured to mechanically couple to the radiating element. The polarization shifter may further include a dielectric layer residing between the lower substrate and the upper substrate. The dielectric layer may couple the first transmission line with the third transmission line and may couple the second transmission line with the fourth transmission line. The upper substrate may be rotatable relative to the lower substrate to effect polarization adjusting for the radiating element to facilitate avoidance of interference or passive intermodulation (PIM).

In one or more embodiments, the polarization shifter may further include a ground plane disposed below the upper substrate and above the lower substrate. The ground plane may be rotatable along with the upper substrate when the upper substrate is rotated.

In one or more embodiments, each of the first, second, third, and fourth transmission lines may comprise a curved shape.

In one or more embodiments, the first and second transmission lines may be disposed on a top surface of the lower substrate, and the third and fourth transmission lines may be disposed on a bottom surface of the upper substrate.

In one or more embodiments, for different rotational positions of the upper substrate, the third transmission line may at least partially overlap the first transmission line and the fourth transmission line may at least partially overlap the second transmission line.

In one or more embodiments, the radiating element may be disposed on an element substrate, and the polarization shifter may further include a support structure configured to mechanically couple the upper substrate with the element substrate.

One or more embodiments may include an apparatus. The apparatus may include an element substrate, a dual-polarized pair of elements, and a lower printed circuit board (PCB) including first and second curved lines positioned thereon for coupling to a feed network. The apparatus may further include an upper PCB including third and fourth curved lines positioned thereon and respectively communicatively coupled to the elements in the dual-polarized pair of elements. The apparatus may further include a buffer layer disposed between the lower PCB and the upper PCB. The buffer layer may couple the first curved line with the third curved line and may couple the second curved line with the fourth curved line. The upper PCB may be rotatable relative to the lower PCB to effect polarization shifting for the dual-polarized pair of elements to facilitate mitigation of interference or passive intermodulation (PIM).

In one or more embodiments, the apparatus may further include a plurality of vertical feed boards via which the third and fourth curved lines may be communicatively coupled to the elements in the dual-polarized pair of elements.

In one or more embodiments, the third and fourth curved lines may be communicatively coupled to respective elements in the dual-polarized pair of elements via respective 90 degree PCB junctions.

In one or more embodiments, the upper PCB may be defined with a hole through which an axle may be disposed for facilitating rotation of the upper PCB.

In one or more embodiments, the apparatus may further include a ground line disposed on the upper PCB between the third and fourth curved lines for isolating polarizations of the dual-polarized pair of elements.

In one or more embodiments, a configuration of the first, second, third, and fourth curved lines may enable polarization adjusting for the dual-polarized pair of elements without requiring suspended feeding cables and rotation of the suspended feeding cables.

In one or more embodiments, in a +45-degree rotational position of the upper PCB relative to the lower PCB, the third curved line may minimally overlap the first curved line and the fourth curved line may maximally overlap the second curved line, and, in a −45-degree rotational position of the upper PCB relative to the lower PCB, the third curved line may maximally overlap the first curved line and the fourth curved line may minimally overlap the second curved line.

One or more embodiments may include an antenna that includes a plurality of polarization shifting assemblies. Each polarization shifting assembly of the plurality of polarization shifting assemblies may include a corresponding radiating element comprising dipole elements, and a lower substrate having disposed thereon first and second transmission lines for coupling to a feed network. Each polarization shifting assembly may further include an upper substrate having disposed thereon third and fourth transmission lines for respective communicative coupling to the dipole elements of the corresponding radiating element. The upper substrate may be configured to physically couple to the corresponding radiating element. Each polarization shifting assembly may further include a dielectric layer residing between the lower substrate and the upper substrate, where the dielectric layer may couple the first transmission line with the third transmission line and may couple the second transmission line with the fourth transmission line. The upper substrate may be rotatable relative to the lower substrate to effect polarization adjusting for the corresponding radiating element to facilitate mitigation or avoidance of interference or passive intermodulation (PIM).

In one or more embodiments, the plurality of polarization shifting assemblies may be arranged in multiple arrays.

In one or more embodiments, each polarization shifting assembly of the plurality of polarization shifting assemblies may include a conducting can disposed below the corresponding radiating element.

In one or more embodiments, the antenna may further include a ground plane disposed under the plurality of polarization shifting assemblies.

In one or more embodiments, the lower and upper substrates may include respective printed circuit boards (PCBs).

In one or more embodiments, the dielectric layer may be adhered to the upper substrate.

In one or more embodiments, the dielectric layer may be adhered to the lower substrate.

One or more embodiments may include a device. The device may include a detection unit coupled to each radiating element of a plurality of dual-polarized radiating elements of an antenna. The detection unit may be configured to receive signals from the plurality of dual-polarized radiating elements. The device may further include a control unit communicatively coupled with the detection unit. The control unit may be configured to perform operations. The operations may include causing the plurality of dual-polarized radiating elements to incrementally occupy a plurality of rotational positions. The operations may further include obtaining, from the detection unit and for each of the plurality of rotational positions, measurements relating to signals from the plurality of dual-polarized radiating elements. The operations may further include, based on the measurements, identifying an optimal rotational position of the plurality of rotational positions for the plurality of dual-polarized radiating elements at which an impact of passive intermodulation (PIM) on a communications system is minimized. The operations may further include causing the plurality of dual-polarized radiating elements to occupy the optimal rotational position to mitigate or avoid the PIM.

In one or more embodiments, the obtaining the measurements may include performing measurements at two different frequencies within an expected bandwidth of the PIM and outside of a frequency range of other known signals so as to identify a polarization of the PIM.

In one or more embodiments, the measurements may include peak power, average power, root mean square (RMS) power, or a combination thereof.

In one or more embodiments, the measurements may include first measurements based on first signals received at dipole elements of the plurality of dual-polarized radiating elements having a first polarization, and second measurements based on second signals received at dipole elements of the plurality of dual-polarized radiating elements having a second polarization orthogonal to the first polarization. In one or more embodiments, the control unit may be configured to calculate ratios using the first and second measurements, where the identifying the optimal rotational position of the plurality of rotational positions may be further based on the ratios.

In one or more embodiments, the detection unit may be further coupled to each radiating element of a second plurality of dual-polarized radiating elements of the antenna. In one or more embodiments, the detection unit may be further configured to receive signals from the second plurality of dual-polarized radiating elements. In one or more embodiments, the operations may further include causing the second plurality of dual-polarized radiating elements to incrementally occupy the plurality of rotational positions. In one or more embodiments, the operations may further include obtaining, from the detection unit and for each of the plurality of rotational positions, second measurements relating to signals from the second plurality of dual-polarized radiating elements. In one or more embodiments, the operations may further include, based on the second measurements, identifying a second optimal rotational position of the plurality of rotational positions for the second plurality of dual-polarized radiating elements at which an impact of the PIM on the communications system is minimized. In one or more embodiments, the operations may further include causing the second plurality of dual-polarized radiating elements to occupy the second optimal rotational position to mitigate or avoid the PIM.

One or more embodiments may include a method. The method may include detecting, by a monitoring system associated with a communication system, signals received at an array of orthogonally-polarized radiating elements of an antenna. The method may further include causing, via a motorized drive assembly, the array of orthogonally-polarized radiating elements to sequentially rotate to a plurality of positions. The method may further include obtaining, by a control system from the monitoring system and for each of the plurality of positions, data relating to signals from the array of orthogonally-polarized radiating elements. The method may further include, based on the data, determining, by the control system, an optimal position of the plurality of positions for the array of orthogonally-polarized radiating elements at which an impact of passive intermodulation (PIM) on the communications system is minimized. The method may further include controlling, by the control system, the motorized drive assembly to cause the array of orthogonally-polarized radiating elements to occupy the optimal position.

In one or more embodiments, the data may include first power measurements based on first signals received at dipole elements of the array of orthogonally-polarized radiating elements having a first polarization, and second power measurements based on second signals received at dipole elements of the array of orthogonally-polarized radiating elements having a second polarization orthogonal to the first polarization. In one or more embodiments, the method may further include calculating ratios using the first and second power measurements, where the determining the optimal position of the plurality of positions may be further based on identifying a largest ratio relating to the first and second power measurements, and where the largest ratio may be indicative of a smallest relative polarization angle associated with the PIM.

In one or more embodiments, the causing the array of orthogonally-polarized radiating elements to sequentially rotate may include causing each of the orthogonally-polarized radiating elements to sequentially rotate over a range of 90 degrees in predefined increments.

In one or more embodiments, the causing the array of orthogonally-polarized radiating elements to occupy the optimal position may enable use of only signals, received at certain dipole elements of the array of orthogonally-polarized radiating elements, that include less than a threshold amount of PIM.

In one or more embodiments, the antenna may include one or more additional arrays of orthogonally-polarized radiating elements.

One or more embodiments may include an antenna system. The antenna system may include multiple arrays of dual-polarized radiating elements, a detection unit configured to receive signals from each radiating element in each array of the multiple arrays of dual-polarized radiating elements, and a control unit communicatively coupled with the detection unit. The control unit may be configured to effect control for each array of the multiple arrays of dual-polarized radiating elements by causing the dual-polarized radiating elements in that array to incrementally occupy a plurality of rotational positions, obtaining, from the detection unit and for each of the plurality of rotational positions, measurements relating to signals from the dual-polarized radiating elements in that array, based on the measurements, identifying an optimal rotational position of the plurality of rotational positions for the dual-polarized radiating elements in that array at which an impact of interference or passive intermodulation (PIM) on a communications system is minimized, and causing the dual-polarized radiating elements in that array to occupy the optimal rotational position to mitigate or avoid the interference or PIM.

In one or more embodiments, the antenna system may further include multiple motors respectively coupled with the multiple arrays of dual-polarized radiating elements, where the causing the dual-polarized radiating elements to incrementally occupy the plurality of rotational positions and the causing the dual-polarized radiating elements to occupy the optimal rotational position may be performed by controlling a respective one of the multiple motors.

In one or more embodiments, the measurements may include peak power, average power, root mean square (RMS) power, or a combination thereof.

In one or more embodiments, the measurements may include first measurements based on first signals received at dipole elements of the dual-polarized radiating elements in that array having a first polarization, and second measurements based on second signals received at dipole elements of the dual-polarized radiating elements in that array having a second polarization orthogonal to the first polarization. In one or more embodiments, the control unit may be configured to calculate ratios using the first and second measurements, where the identifying the optimal rotational position of the plurality of rotational positions for the dual-polarized radiating elements in that array may be further based on the ratios.

In one or more embodiments, the detection unit and the control unit may be implemented in a single device or in distinct devices. In one or more embodiments, the control unit may provide an interface for external communications. In one or more embodiments, the control unit may be capable of configuring the detection unit with settings relating to base frequency, peak power limits, motor-related movements, or a combination thereof.

In one or more embodiments, the detection unit, the control unit, or a combination thereof may be configured to measure, for one or more signals, power levels at frequency increments for a plurality of time cycles, determine a baseline average across the frequency increments, calculate a threshold based on the baseline average, and perform interference mitigation based on identifying interference using the threshold.

One or more embodiments may include a motorized drive assembly. The motorized drive assembly may include a motor and a drive assembly. The drive assembly may have an axle configured to be disposed through a rotatable substrate of a polarization shifter for a dual-polarized radiating element. The axle may be further configured to fasten, at a first end of the axle, to a support structure of the polarization shifter. When the motorized drive assembly is assembled to the polarization shifter, the motor is controllable to impart rotational forces, via movement of the axle, to the polarization shifter to effect polarization adjusting for the dual-polarized radiating element.

In one or more embodiments, the rotatable substrate may include a printed circuit board (PCB), where the motorized drive assembly may be communicatively coupled to a controller via a communication interface, and the controller may be configured to provide control signals for driving the motor.

In one or more embodiments, the axle may be further configured to be disposed through a ground plane for the dual-polarized radiating element.

In one or more embodiments, the motorized drive assembly may further include a linkage rod coupled to the motor, a threaded rod drivable by the motor, and a carrier threadably coupled to the threaded rod, where the linkage rod may be coupled to the motor via the carrier.

In one or more embodiments, the motorized drive assembly may further include a bushing configured to interface with the rotatable substrate and receive the axle.

In one or more embodiments, the motorized drive assembly may further include a linkage rod coupled to the motor and a lever configured to secure to a second end of the axle. The lever may be defined with a slot and may be coupled to the linkage rod via the slot. In one or more embodiments, the motorized drive assembly may further include a compression spring configured to interface with the lever and receive the axle.

One or more embodiments may include a linear drive assembly. The linear drive assembly may include a carrier coupled to a motor via a threaded rod, a linkage fastened to the carrier, and an axle disposed through a rotatable substrate of a polarization shifter for an orthogonally-polarized element pair. The axle may be fastened, at a first end of the axle, to a support structure of the polarization shifter, where the motor may provide forces, via the threaded rod, the carrier, the linkage, and the axle, to the polarization shifter to effect polarization shifting for the orthogonally-polarized element pair.

In one or more embodiments, the linkage may be coupled to a plurality of other polarization shifters via respective axles.

In one or more embodiments, the linear drive assembly may further include a slotted lever secured to a second end of the axle, a camming pin for coupling the linkage to the slotted lever, a bushing, and a compression spring disposed between the slotted lever and the rotatable substrate.

In one or more embodiments, the axle may be further disposed through a rotatable ground plane positioned adjacent to the rotatable substrate.

In one or more embodiments, the rotatable substrate may include a printed circuit board (PCB).

In one or more embodiments, the orthogonally-polarized element pair may reside on an element substrate mechanically coupled to the support structure.

In one or more embodiments, the linear drive assembly may be included in an antenna having a plurality of orthogonally-polarized element pairs.

One or more embodiments may include a system. The system may include a polarization shifter comprising a rotatable substrate, an element substrate, a radiating element residing on the element substrate, and an antenna support structure fixedly coupled to the element substrate. The system may further include a motor coupled to a rod, a carriage coupled to the motor via the rod, a linkage secured to the carriage, and an axle disposed through the rotatable substrate. The axle may be secured, at a first end of the axle, to the antenna support structure, where the motor may be configured to drive the rod to effect polarization shifting for the radiating element.

In one or more embodiments, the system may further include a lever fastened to a second end of the axle, a camming pin for coupling the linkage to the lever, and a fixed ground plane disposed between the rotatable substrate and the lever, where the fixed ground plane may be defined with a hole that receives the axle.

In one or more embodiments, the system may further include a plurality of other polarization shifters that each comprises a respective rotatable substrate, a respective element substrate, and a respective radiating element. In one or more embodiments, the linkage may be coupled to each of the plurality of other polarization shifters via respective axles.

In one or more embodiments, the system may further include a rotatable ground plane configured to receive the axle.

In one or more embodiments, the rod may be threaded, where the carriage may be threadably coupled to the rod.

In one or more embodiments, the rotatable substrate may include a printed circuit board (PCB).

Figure 6:
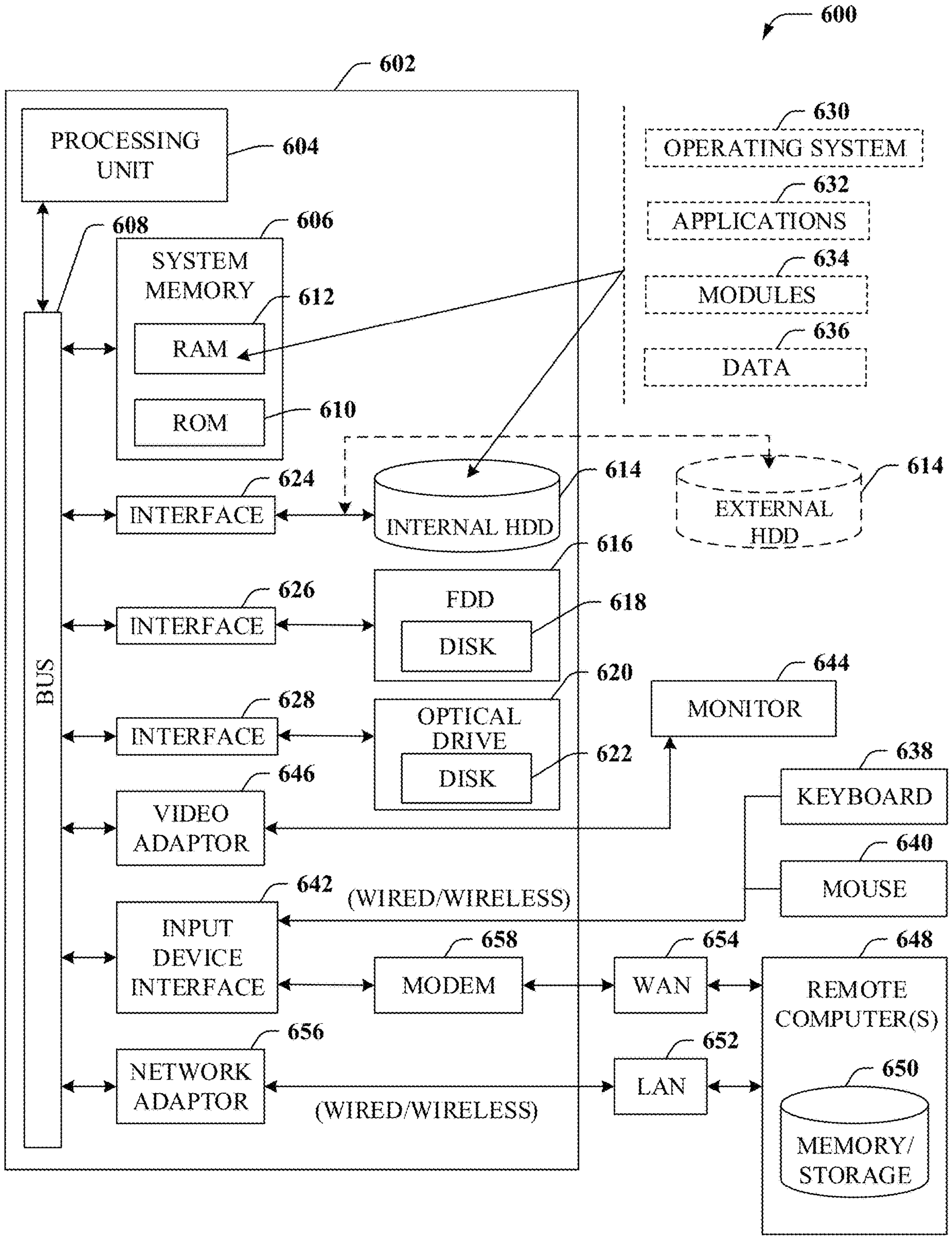
FIG. 6 is a block diagram of an example, non-limiting embodiment of a computing environment in accordance with various aspects described herein.

Turning now to FIG. 6, there is illustrated a block diagram of a computing environment in accordance with various aspects described herein. In order to provide additional context for various embodiments of the embodiments described herein, FIG. 6 and the following discussion are intended to provide a brief, general description of a suitable computing environment 600 in which the various embodiments of the subject disclosure can be implemented. In particular, computing environment 600 can be used in the implementation of network elements 150, 152, 154, 156, access terminal 112, base station or access point 122, switching device 132, media terminal 142, one or more (or a combination) of the control and monitoring/detection units 201*c* and 201*d*, one or more (or a combination) of the control and monitoring/detection units 221*c* and 221*d*, etc. Each of these devices can be implemented via computer-executable instructions that can run on one or more computers, and/or in combination with other program modules and/or as a combination of hardware and software. For example, computing environment 600 can facilitate, in whole or in part, detection of interference/PIM in a communications system and performing of action(s) relating to polarization shifting to enable mitigation or avoidance of the interference/PIM.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 6, the example environment can comprise a computer 602, the computer 602 comprising a processing unit 604, a system memory 606 and a system bus 608. The system bus 608 couples system components including, but not limited to, the system memory 606 to the processing unit 604. The processing unit 604 can be any of various commercially available processors. Dual microprocessors and other multiprocessor architectures can also be employed as the processing unit 604.

The system bus 608 can be any of several types of bus structure that can further interconnect to a memory bus (with or without a memory controller), a peripheral bus, and a local bus using any of a variety of commercially available bus architectures. The system memory 606 comprises ROM 610 and RAM 612. A basic input/output system (BIOS) can be stored in a non-volatile memory such as ROM, erasable programmable read only memory (EPROM), EEPROM, which BIOS contains the basic routines that help to transfer information between elements within the computer 602, such as during startup. The RAM 612 can also comprise a high-speed RAM such as static RAM for caching data.

The computer 602 further comprises an internal hard disk drive (HDD) 614 (e.g., EIDE, SATA), which internal HDD 614 can also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The HDD 614, magnetic FDD 616 and optical disk drive 620 can be connected to the system bus 608 by a hard disk drive interface 624, a magnetic disk drive interface 626 and an optical drive interface 628, respectively. The hard disk drive interface 624 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 602, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 612, comprising an operating system 630, one or more application programs 632, other program modules 634 and program data 636. All or portions of the operating system, applications, modules, and/or data can also be cached in the RAM 612. The systems and methods described herein can be implemented utilizing various commercially available operating systems or combinations of operating systems.

A user can enter commands and information into the computer 602 through one or more wired/wireless input devices, e.g., a keyboard 638 and a pointing device, such as a mouse 640. Other input devices (not shown) can comprise a microphone, an infrared (IR) remote control, a joystick, a game pad, a stylus pen, touch screen or the like. These and other input devices are often connected to the processing unit 604 through an input device interface 642 that can be coupled to the system bus 608, but can be connected by other interfaces, such as a parallel port, an IEEE 1394 serial port, a game port, a universal serial bus (USB) port, an IR interface, etc.

A monitor 644 or other type of display device can be also connected to the system bus 608 via an interface, such as a video adapter 646. It will also be appreciated that in alternative embodiments, a monitor 644 can also be any display device (e.g., another computer having a display, a smart phone, a tablet computer, etc.) for receiving display information associated with computer 602 via any communication means, including via the Internet and cloud-based networks. In addition to the monitor 644, a computer typically comprises other peripheral output devices (not shown), such as speakers, printers, etc.

The computer 602 can operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically comprises many or all of the elements described relative to the computer 602, although, for purposes of brevity, only a remote memory/storage device 650 is illustrated. The logical connections depicted comprise wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which can connect to a global communications network, e.g., the Internet.

When used in a LAN networking environment, the computer 602 can be connected to the LAN 652 through a wired and/or wireless communications network interface or adapter 656. The adapter 656 can facilitate wired or wireless communication to the LAN 652, which can also comprise a wireless AP disposed thereon for communicating with the adapter 656.

When used in a WAN networking environment, the computer 602 can comprise a modem 658 or can be connected to a communications server on the WAN 654 or has other means for establishing communications over the WAN 654, such as by way of the Internet. The modem 658, which can be internal or external and a wired or wireless device, can be connected to the system bus 608 via the input device interface 642. In a networked environment, program modules depicted relative to the computer 602 or portions thereof, can be stored in the remote memory/storage device 650. It will be appreciated that the network connections shown are example and other means of establishing a communications link between the computers can be used.

The computer 602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Embodiments described herein may be configured for, used in conjunction with, or adapted for detecting and mitigating interference in various types of communication systems, such as, e.g., long-term evolution (LTE™) communication systems. For instance, one or more (or a combination) of the control and monitoring/detection units 201*c* (or 221*c*) and 201*d* (or 221*d*) may be configured to detect and mitigate interference (e.g., in general, and not only PIM).

LTE™ utilizes different media access methods for downlink (orthogonal frequency-division multiple access; generally, referred to as OFDMA) and uplink (single carrier frequency-division multiple access; generally, referred to as SC-FDMA). For downlink communications, each RB contains 12 sub-carriers with 15 KHz spacing. Each sub-carrier can be used to transmit individual bit information according to the OFDMA protocol. For uplink communications, LTE™ utilizes a similar RB structure with 12 sub-carriers, but in contrast to downlink, uplink data is pre-coded for spreading across 12 sub-carriers and is transmitted concurrently on all 12 sub-carriers.

The effect of data spreading across multiple sub-carriers yields a transmission with spectral characteristics similar to a CDMA/UMTS signal. Hence, similar principles of narrow band interference detection can be applied within an instance of SC-FDMA transmission from an individual communication device—described herein as user equipment (UE). However, since each transmission consists of unknown RB allocations with unknown durations, such a detection principle can only be applied separately for each individual RB within a frequency and specific time domain. If a particular RB is not used for LTE™ transmission at the time of detection, the RF spectrum will present a thermal noise which adheres to the characteristics of a spread spectrum signal, similar to a CDMA/UMTS signal.

Figure 7:
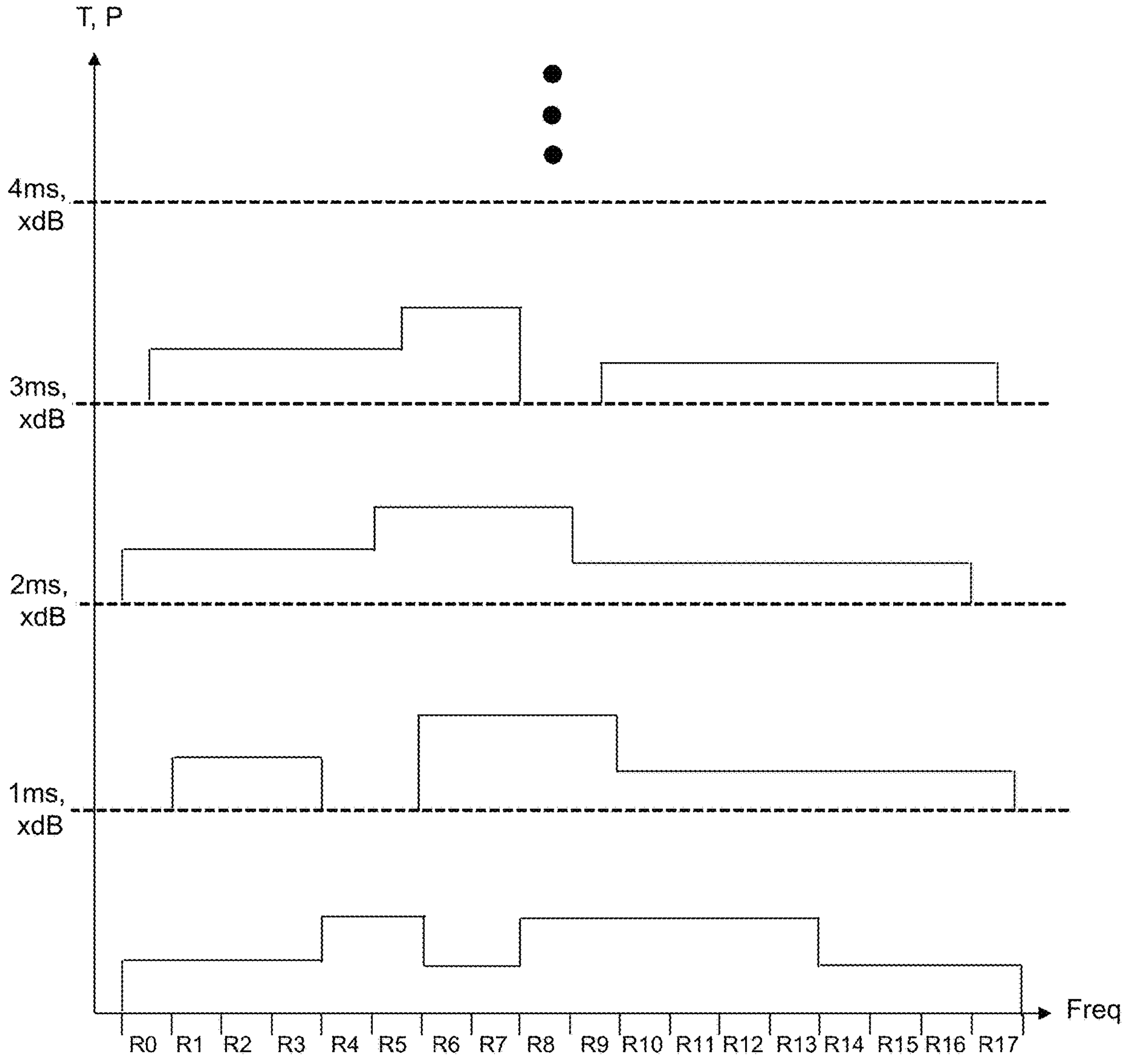
FIG. 7 depicts illustrative embodiments of Long Term Evolution (LTE™) time and frequency signal plots in accordance with various aspects described herein.
Figure 8:
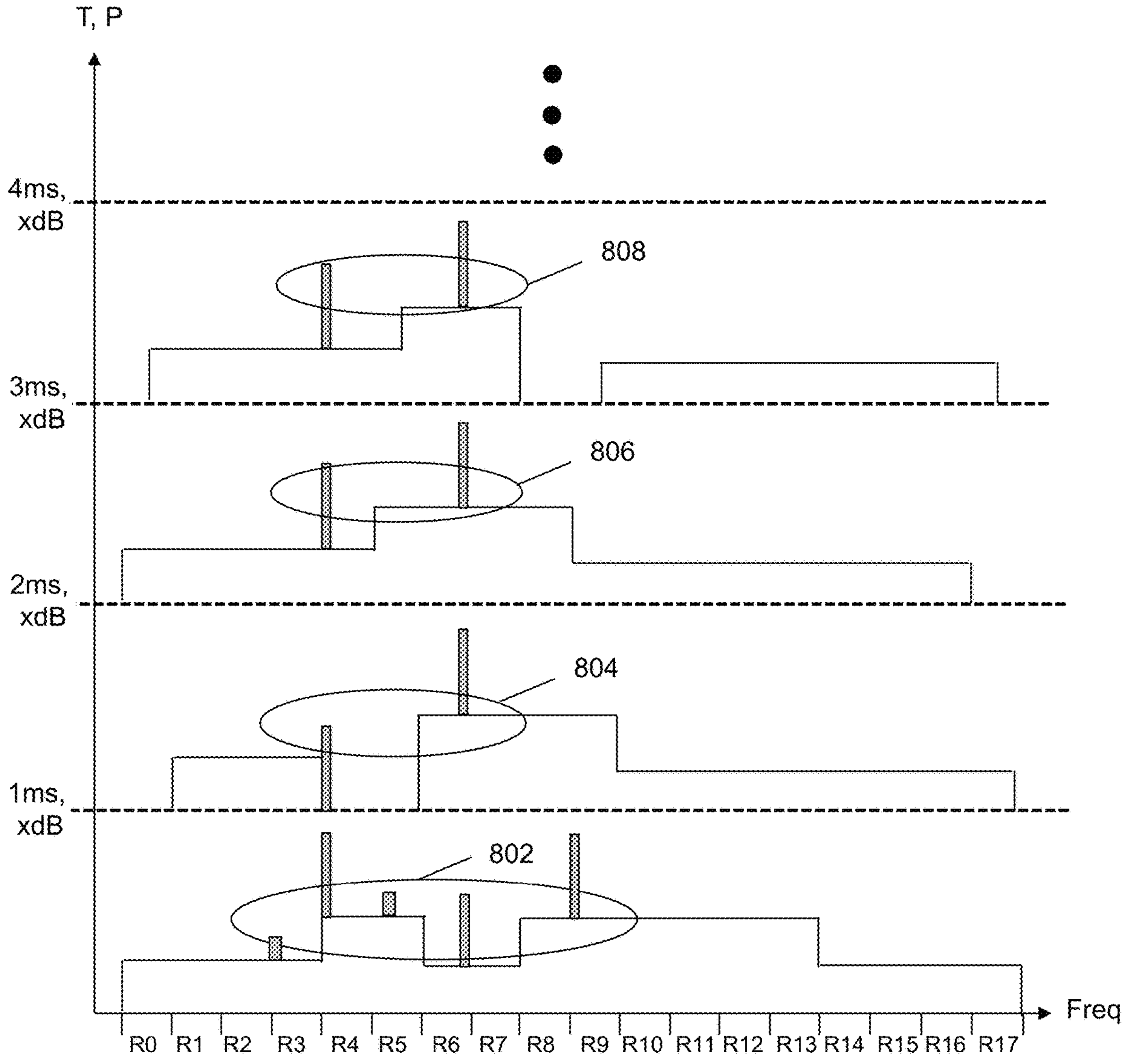
FIG. 8 depicts illustrative embodiments of LTE™ time and frequency signal plots intermixed with interference signals in accordance with various aspects described herein.

Co-channel, as well as other forms of interference, can cause performance degradation to SC-FDMA and OFDMA signals when present. FIG. 8 depicts an illustration of an LTE™ transmission affected by interferers 802, 804, 806 and 808 occurring at different points in time. Since such LTE™ transmissions do not typically have flat power spectral densities (see FIG. 7), identification of interference as shown in FIG. 8 can be a difficult technical problem. The subject disclosure presents a method to improve the detection of narrowband interference in SC-FDMA/OFDM channels through a time-averaging algorithm that isolates interference components in the channel and ignores the underlying signal.

Time averaging system (TAS) can be achieved with a boxcar (rolling) average, in which the TAS is obtained as a linear average of a Q of previous spectrum samples, with Q being a user-settable parameter. The Q value determines the "strength" of the averaging, with higher Q value resulting in a TAS that is more strongly smoothed in time and less dependent on short duration transient signals. Due to the frequency-hopped characteristic of SC-FDMA/OFDMA signals, which are composed of short duration transients, the TAS of such signals is approximately flat. It will be appreciated that TAS can also be accomplished by other methods such as a forgetting factor filter.

Figure 9:
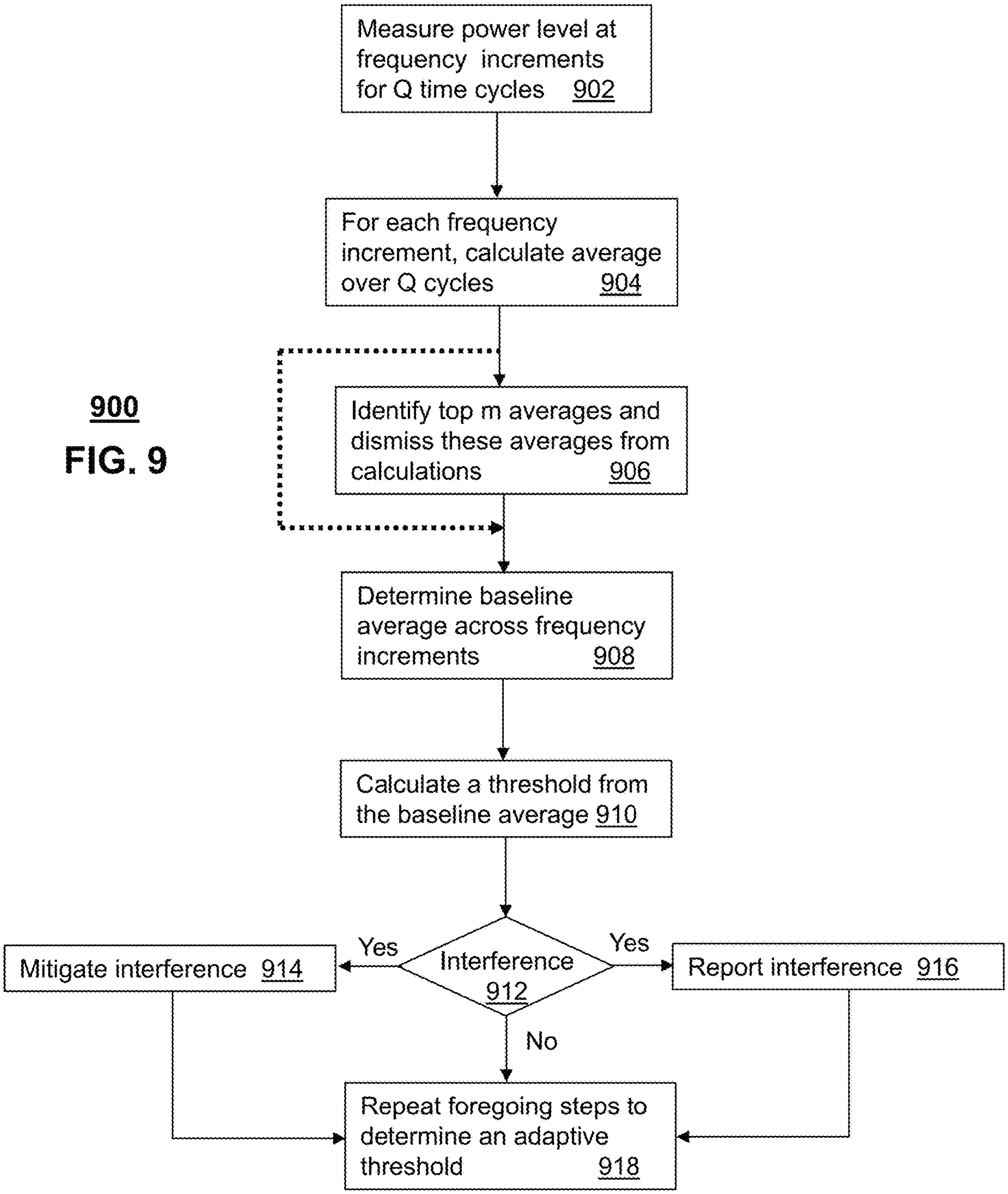
FIG. 9 depicts an illustrative embodiment of a method for detecting and mitigating interference signals shown in FIG. 8 in accordance with various aspects described herein.

In one embodiment, an adaptive threshold can be determined by a method 900 as depicted in FIG. 9. Q defines how many cycles of t, to use (e.g., 100 cycles can be represented by $t_1$ thru $t_{100}$). The control unit 201*c* (or 221*c*) and/or the monitoring/detection unit(s) 201*d* (or 221*d*) can be configured to measure power in 30 KHz increments starting from a particular RB and over multiple time cycles (902). For illustration purposes, the control unit 201*c* (or 221*c*) and/or the monitoring/detection unit(s) 201*d* (or 221*d*) is assumed to measure power across a 5 MHz spectrum. It will be appreciated that the control unit 201*c* (or 221*c*) and/or the monitoring/detection unit(s) 201*d* (or 221*d*) can be configured for other increments (e.g., 15 KHz or 60 KHz), and a different RF spectrum bandwidth. With this in mind, the control unit 201*c* (or 221*c*) and/or the monitoring/detection unit(s) 201*d* (or 221*d*) can be configured at frequency increment f1 to measure power at t1, t2, thru tq (q representing the number of time cycles, i.e., Q). At f1+30 kHz, the control unit 201*c* (or 221*c*) and/or the monitoring/detection unit(s) 201*d* (or 221*d*) measures power at t1, t2, thru tn. The frequency increment can be defined by f0+(z−1)*30 KHz=fz, where f0 is a starting frequency, where z=1 . . . x, and z defines increments of 30 KHz increment, e.g., f1=f (z=1) first 30 KHz increment, f2=f(z=2) second 30 KHz increment, etc.

The control unit 201*c* (or 221*c*) and/or the monitoring/detection unit(s) 201*d* (or 221*d*) repeats these steps until the spectrum of interest has been fully scanned for Q cycles, thereby producing the following power level sample sets:

$$S_{f1\ (t1\ thru\ tq)}: s_{1,t1,f1}, s_{2,t2,f1}, \ldots , s_{q,tq,f1}$$

$$S_{f2\ (t1\ thru\ tq)}: s_{1,t1,f2}, s_{2,t2,f2}, \ldots , s_{q,tq,f2}$$

$$\ldots$$

$$S_{fx\ (t1\ thru\ tq)}: s_{1,t1,fz}, s_{2,t2,fx}, \ldots , s_{q,tq,fx}$$

The control unit 201*c* (or 221*c*) and/or the monitoring/detection unit(s) 201*d* (or 221*d*) in step 904, calculates averages for each of the power level sample sets as provided below:

$$a1(f1) = (s_{1,t1,f1} + s_{2,t2,f1}, \ldots , +s_{q,tq,f1})/q$$

$$a2(f2) = (s_{1,t1,f2} + s_{2,t2,f2}, \ldots , s_{q,tq,f2})/q$$

$$\ldots$$

$$ax(fx) = (s_{1,t1,fx} + s_{2,t2,fx}, \ldots , s_{2,tq,fx})/q$$

In one embodiment, the control unit 201*c* (or 221*c*) and/or the monitoring/detection unit(s) 201*d* (or 221*d*) can be configured to determine at step 906 the top "m" averages (e.g., the top 3 averages) and dismiss these averages from the calculations. The variable "m" can be user-supplied or can be empirically determined from field measurements collected by one or more base stations utilizing the control unit 201*c* (or 221*c*) and/or the monitoring/detection unit(s) 201*d* (or 221*d*). This step can be used to avoid skewing a baseline average across all frequency increments from being too high, resulting in a threshold calculation that may be too conservative. If step 906 is invoked, a baseline average can be determined in step 908 according to the equation: Baseline Avg=(a1+a2+ . . . +az—averages that have been dismissed)/(x−m). If step 906 is skipped, the baseline average can be determined from the equation: Baseline Avg=(a1+a2+ . . . +az)/x. Once the baseline average is determined in step 908, the control unit 201*c* (or 221*c*) and/or the monitoring/detection unit(s) 201*d* (or 221*d*) can proceed to step 910 where it calculates a threshold according to the equation: Threshold=y dB offset+Baseline Avg. The y dB offset can be user defined or empirically determined from field measurements collected by one or more base stations utilizing the control unit 201*c* (or 221*c*) and/or the monitoring/detection unit(s) 201*d* (or 221*d*).

Figure 10:
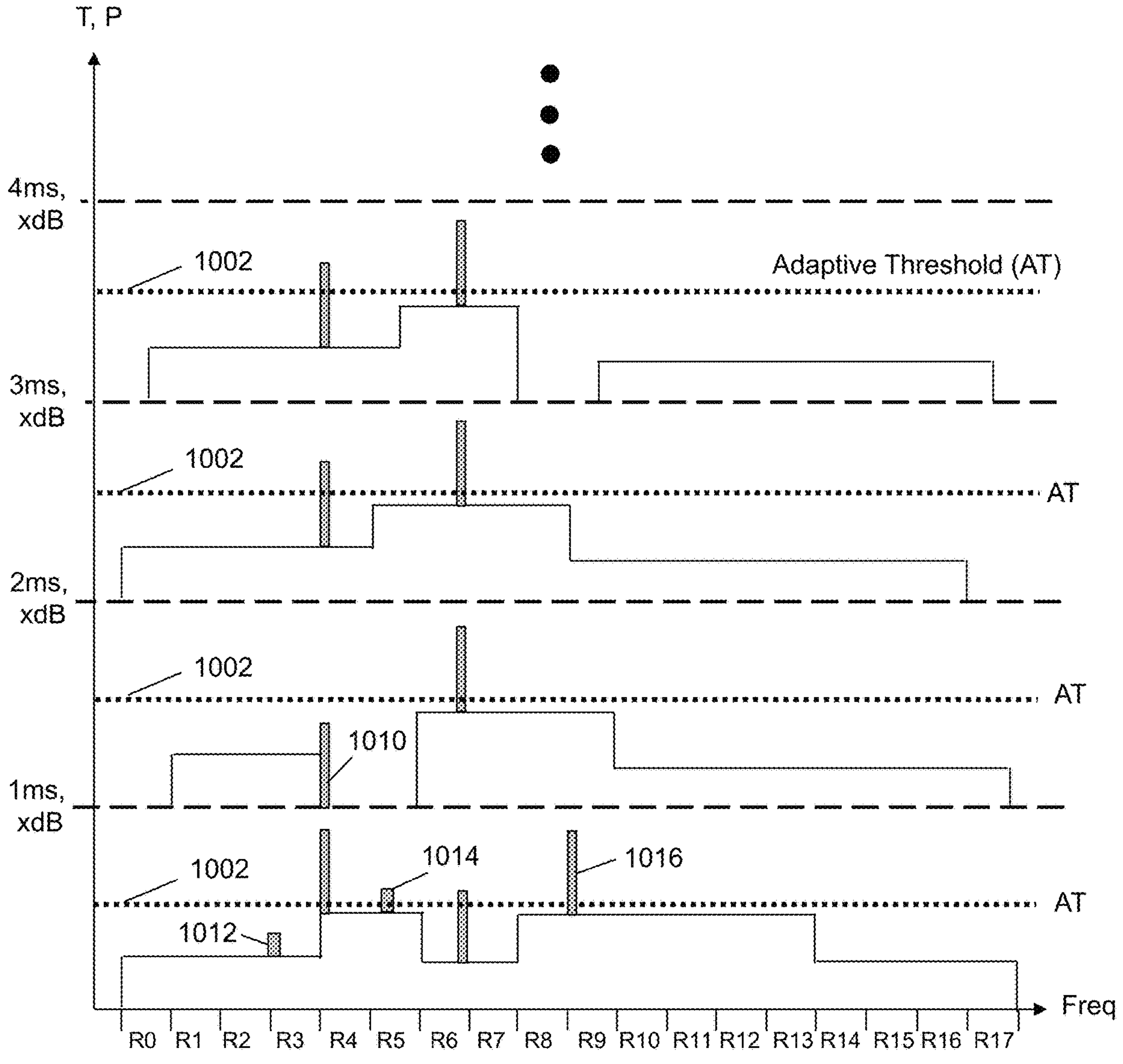
FIG. 10 depicts an illustrative embodiment of adaptive thresholds used for detecting and mitigating interference signals shown in FIG. 8 in accordance with various aspects described herein.

Once a cycle of steps 902 through 910 have been completed, the control unit 201*c* (or 221*c*) and/or the monitoring/detection unit(s) 201*d* (or 221*d*) can monitor at step 912 interference per frequency increment of the spectrum being scanned based on any power levels measured above the threshold 1002 calculated in step 910 as shown in FIG. 10. Not all interferers illustrated in FIG. 10 exceed the threshold, such as the interferer with reference 1010. Although this interferer has a high power signature, it was not detected because it occurred during a resource block (R4) that was not in use. As such, the interferer 1010 fell below the threshold 1002. In another illustration, interferer 1012 also fell below the threshold 1002. This interferer was missed because of its low power signature even though the RB from which it occurred (R3) was active.

In various embodiments, method 900 of FIG. 9 can be adapted to further enhance the interference determination process. For instance, method 900 can be adapted to apply weights to the power levels, and/or perform correlation analysis to achieve a desired confidence level that the proper interferers are addressed. For example, with correlation analysis, the control unit 201*c* (or 221*c*) and/or the monitoring/detection unit(s) 201*d* (or 221*d*) can be configured to ignore interferers 1014 and 1016 of FIG. 10 because their frequency of occurrence is low. Method 900 can also be adapted to prioritize interference mitigation. Prioritization can be based on frequency of occurrence of the interferers, time of day of the interference, the effect the interference has on network traffic, and/or other suitable factors for prioritizing interference to reduce its impact on the network. Prioritization schemes can be especially useful when the filtering resources of the control unit 201*c* (or 221*c*) and/or the monitoring/detection unit(s) 201*d* (or 221*d*) can only support a limited number of filtering events.

Figure 11:
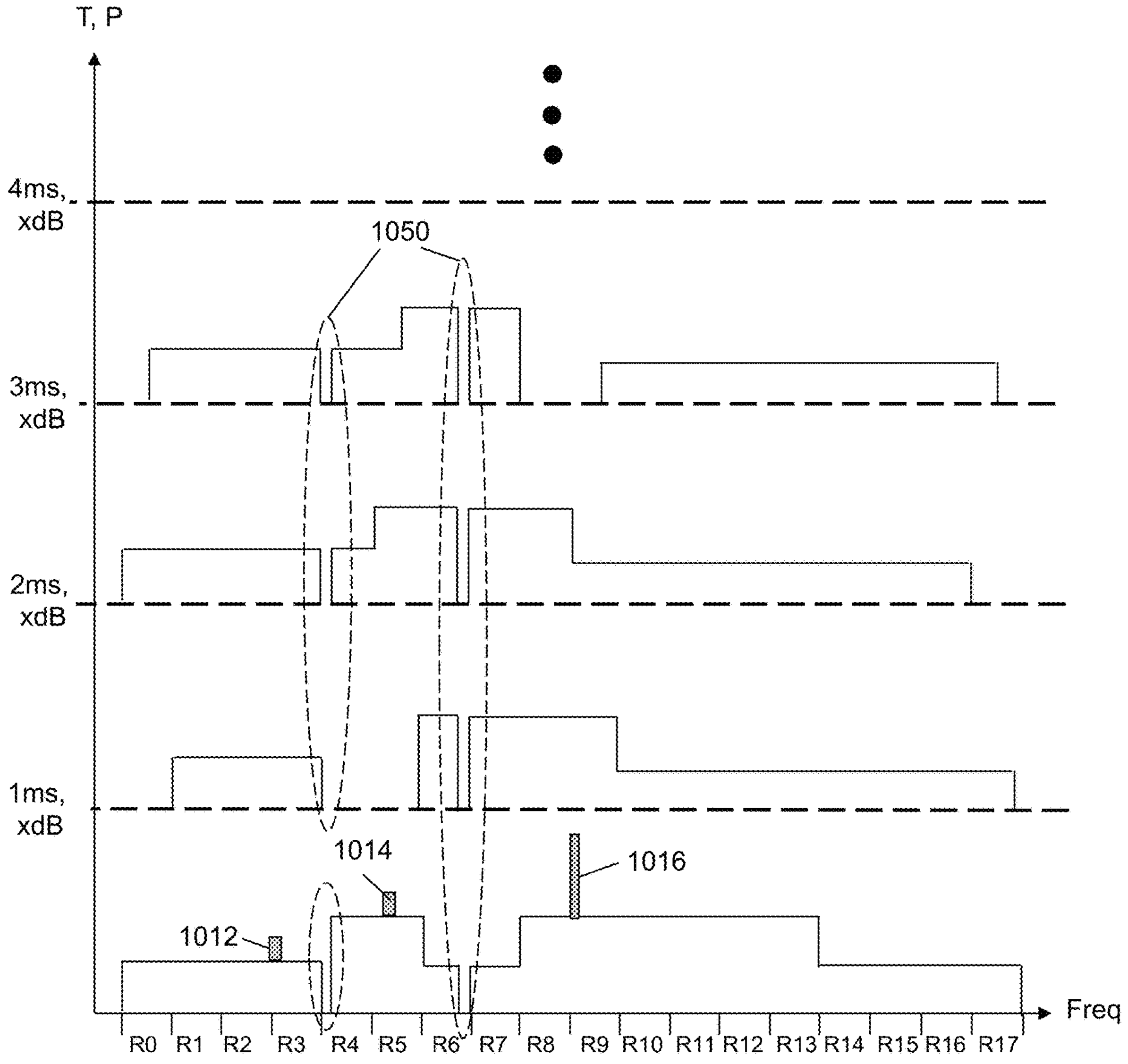
FIG. 11 depicts an illustrative embodiment of resulting LTE™ signals after mitigating interference according to the method of FIG. 9 in accordance with various aspects described herein.

When one or more interferers are detected in step 912, the control unit 201*c* (or 221*c*) and/or the monitoring/detection unit(s) 201*d* (or 221*d*) can mitigate the interference at step 914 by configuring one or more filters to suppress the one or more interferers as described above. When there are limited resources to suppress all interferers, the control unit 201*c* (or 221*c*) and/or the monitoring/detection unit(s) 201*d* (or 221*d*) can use a prioritization scheme to address the most harmful interference as discussed above. FIG. 11 provides an illustration of how the control unit 201*c* (or 221*c*) and/or the monitoring/detection unit(s) 201*d* (or 221*d*) can suppress interferers based on the aforementioned algorithms of the subject disclosure. For example, interferers 1012, 1014 and 1016 can be ignored by the control unit 201*c* (or 221*c*) and/or the monitoring/detection unit(s) 201*d* (or 221*d*) because their correlation may be low, while interference suppression is applied for all other interferers as shown by reference 1050.

In one embodiment, the control unit 201*c* (or 221*c*) and/or the monitoring/detection unit(s) 201*d* (or 221*d*) can submit a report to a diagnostic system that includes information relating to the interferers detected. The report can include among other things, a frequency of occurrence of the interferer, spectral data relating to the interferer, an identification of the base station from which the interferer was detected, a severity analysis of the interferer (e.g., bit error rate, packet loss rate, or other traffic information detected during the interferer), and so on. The diagnostic system can communicate with other base stations with other operable control unit 201*c* (or 221*c*) and/or monitoring/detection unit(s) 201*d* (or 221*d*) to perform macro analysis of interferers such as triangulation to locate interferers, identity analysis of interferers based on a comparison of spectral data and spectral profiles of known interferers, and so on.

In one embodiment, the reports provided by the control unit 201*c* (or 221*c*) and/or the monitoring/detection unit(s) 201*d* (or 221*d*) can be used by the diagnostic system to, in some instances, perform avoidance mitigation. For example, if the interferer is known to be a communication device in the network, the diagnostic system can direct a base station in communication with the communication device to direct the communication device to another channel so as to remove the interference experienced by a neighboring base station. Alternatively, the diagnostic system can direct an affected base station to utilize beam steering and or mechanical steering of antennas to avoid an interferer. When avoidance is performed, the mitigation step 914 can be skipped or may be invoked less as a result of the avoidance steps taken by the diagnostic system.

Once mitigation and/or an interference report has been processed in steps 914 and 916, respectively, the control unit 201*c* (or 221*c*) and/or the monitoring/detection unit(s) 201*d* (or 221*d*) can proceed to step 918. In this step, the control unit 201*c* (or 221*c*) and/or the monitoring/detection unit(s) 201*d* (or 221*d*) can repeat steps 902 thru 910 to calculate a new baseline average and corresponding threshold based on Q cycles of the resource blocks. Each cycle creates a new adaptive threshold that is used for interference detection. It should be noted that when Q is high, changes to the baseline average are smaller, and consequently, the adaptive threshold varies less over Q cycles. In contrast, when Q is low, changes to the baseline average are higher, which results in a more rapidly changing adaptive threshold.

Generally speaking, one can expect that there will be more noise-free resource blocks than resource blocks with substantive noise. Accordingly, if an interferer is present (constant or ad hoc), one can expect the aforementioned algorithm described by method 900 to produce an adaptive threshold (i.e., baseline average+offset) that will be lower than the interferer's power level due to mostly noise-free resource blocks driving down baseline average. Although certain communication devices will have a high initial power level when initiating communications with a base station, it can be further assumed that over time the power levels will be lowered to a nominal operating condition. A reasonably high Q would likely also dampen disparities between RB's based on the above described embodiments.

It is further noted that the aforementioned algorithms can be modified while maintaining an objective of mitigating detected interference. For instance, instead of calculating a baseline average from a combination of averages a1(*f*1) through ax(fx) or subsets thereof, the control unit 201*c* (or 221*c*) and/or the monitoring/detection unit(s) 201*d* (or 221*d*) can be configured to calculate a baseline average for each resource block according to a known average of adjacent resource blocks, an average calculated for the resource block itself, or other information that may be provided by, for example, to a resource block scheduler (e.g., a software application and/or hardware component of the base station) that may be helpful in calculating a desired baseline average for each resource block or groups of resource blocks. For instance, the resource block schedule can inform the control unit 201*c* (or 221*c*) and/or the monitoring/detection unit(s) 201*d* (or 221*d*) as to which resource blocks are active and at what time periods. This information can be used by the control unit 201*c* (or 221*c*) and/or the monitoring/detection unit(s) 201*d* (or 221*d*) determine individualized baseline averages for each of the resource blocks or groups thereof. Since baseline averages can be individualized, each resource block can also have its own threshold applied to the baseline average of the resource block. Accordingly, thresholds can vary between resource blocks for detecting interferers. Additionally, while interference detection and mitigation (e.g., method 900) is described as involving the control unit 201*c* (or 221*c*) and/or the monitoring/detection unit(s) 201*d* (or 221*d*), one or more other systems or devices (such as, for example, an adaptive front end) may additionally, or alternatively, be involved in this process.

It is further noted that the aforementioned mitigation and detection algorithms can be implemented by any communication device including cellular phones, smartphones, tablets, small base stations, macro base stations, femto cells, WIFI™ access points, and so on. Small base stations (commonly referred to as small cells) can represent low-powered radio access nodes that can operate in licensed and/or unlicensed spectrum that have a range of 10 meters to 1 or 2 kilometers, compared to a macrocell (or macro base station) which might have a range of a few tens of kilometers. Small base stations can be used for mobile data offloading as a more efficient use of radio spectrum.

The terms "first," "second," "third," and so forth, which may be used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory"

or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

Some of the embodiments described herein can also employ artificial intelligence (AI) to facilitate automating one or more features described herein. One or more embodiments can employ various AI-based schemes for carrying out various embodiments thereof. Moreover, a classifier can be employed. A classifier is a function that maps an input attribute vector, x=(x1, x2, x3, x4, . . . , xn), to a confidence that the input belongs to a class, that is, f(x)=confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to, training data. Other directed and undirected model classification approaches comprise, e.g., naïve Bayes, Bayesian networks, decision trees, neural networks, fuzzy logic models, and probabilistic classification models providing different patterns of independence. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communications network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

The foregoing embodiments can be combined in whole or in part with the embodiments described in any of U.S. Pat. No. 10,652,835 (issued on May 12, 2020), U.S. Pat. No. 9,313,680 (issued on Apr. 12, 2016), U.S. Pat. No. 9,271,185 (issued on Feb. 23, 2016), and U.S. Patent Publication No. 2022/0069855 (published on Mar. 3, 2022). For instance, embodiments of one or more of the aforementioned U.S. patents and publication can be combined in whole or in part with embodiments of the subject disclosure. For example, one or more features and/or embodiments described in one or more of the aforementioned U.S. patents and publication can be used in conjunction with (or as a substitute for) one or more features and/or embodiments described herein, and vice versa. Accordingly, all sections of the aforementioned U.S. patents and publication are incorporated herein by reference in their entirety.

What is claimed is:

1. A motorized drive assembly, comprising:

a motor; and a drive assembly configured to couple to a polarization shifter for a dual-polarized radiating element, wherein the motor is controllable by a processing system configured to detect an interference signal having a polarization orientation, and wherein, when the motorized drive assembly is coupled to the polarization shifter, the motor is controllable by the processing system to impart rotational forces to the polarization shifter to effect polarization adjusting for the dual-polarized radiating element, thereby mitigating the interference signal according to the polarization orientation of the interference signal.

2. The motorized drive assembly of claim 1, wherein the polarization shifter comprises a rotatable printed circuit board (PCB).

3. The motorized drive assembly of claim 1, wherein the drive assembly comprises an axle.

4. The motorized drive assembly of claim 3, wherein the polarization shifter comprises a rotatable substrate and a ground plane, and wherein the axle is configured to be disposed through the rotatable substrate and the ground plane.

5. The motorized drive assembly of claim 3, further comprising a bushing configured to receive the axle.

6. The motorized drive assembly of claim 1, further comprising a linkage rod coupled to the motor, a threaded rod drivable by the motor, and a carrier threadably coupled to the threaded rod, wherein the linkage rod is coupled to the motor via the carrier.

7. A linear drive assembly, comprising:

a carrier coupled to a motor via a rod; and an axle configured to couple to a polarization shifter for an orthogonally-polarized element pair, wherein the motor provides forces, via the rod, the carrier, and the axle, to the polarization shifter to effect polarization shifting for the orthogonally-polarized element pair, and wherein the polarization shifting facilitates avoidance of interference.

8. The linear drive assembly of claim 7, further comprising a linkage fastened to the carrier, wherein the linkage is coupled to a plurality of other polarization shifters via respective axles.

9. The linear drive assembly of claim 7, further comprising:

a slotted lever secured to the axle;

a camming pin for coupling a linkage to the slotted lever;

a bushing; and a compression spring disposed between the slotted lever and a rotatable substrate of the polarization shifter.

10. The linear drive assembly of claim 7, wherein the axle is configured to be disposed through a rotatable substrate and a rotatable ground plane of the polarization shifter.

11. The linear drive assembly of claim 10, wherein the rotatable substrate comprises a printed circuit board (PCB).

12. The linear drive assembly of claim 7, wherein the orthogonally-polarized element pair resides on an element substrate.

13. The linear drive assembly of claim 7, wherein the linear drive assembly is included in an antenna having a plurality of orthogonally-polarized element pairs.

14. A system, comprising:

a polarization shifter comprising an element substrate, a radiating element residing on the element substrate, and an antenna support structure fixedly coupled to the element substrate;

a motor coupled to a rod; and an axle secured, at a first end of the axle, to the antenna support structure, wherein the motor is controllable by a controller configured to detect an interference signal having a polarization orientation, and wherein the motor is controllable by the controller to drive the rod to effect polarization shifting for the radiating element, thereby mitigating the interference signal according to the polarization orientation of the interference signal.

15. The system of claim 14, further comprising:

a lever fastened to a second end of the axle; and a camming pin for coupling a linkage to the lever.

16. The system of claim 14, further comprising a plurality of other polarization shifters that each comprises a respective element substrate and a respective radiating element.

17. The system of claim 16, further comprising a linkage coupled to the axle and to respective axles of the plurality of other polarization shifters.

18. The system of claim 14, further comprising a rotatable ground plane configured to receive the axle.

19. The system of claim 14, further comprising a carriage coupled to the motor via the rod, wherein the rod is threaded, and wherein the carriage is threadably coupled to the rod.

20. The system of claim 14, wherein the polarization shifter further comprises a rotatable printed circuit board (PCB).

* * * * *